United States Patent
Mehta et al.

(10) Patent No.: US 9,998,507 B2
(45) Date of Patent: Jun. 12, 2018

(54) SYSTEMS AND METHODS FOR ROBUST AND PERSISTENT EMERGENCY COMMUNICATIONS

(71) Applicant: RapidSOS, Inc., New York, NY (US)

(72) Inventors: Anil Mehta, Makanda, IL (US); Michael John Martin, Long Island City, NY (US); Nicholas Edward Horelik, Long Island City, NY (US)

(73) Assignee: RAPIDSOS, INC., New York, NY (US)

( * ) Notice: Subject to any disclaimer, the term of this patent is extended or adjusted under 35 U.S.C. 154(b) by 0 days. days.

(21) Appl. No.: 15/387,363

(22) Filed: Dec. 21, 2016

(65) Prior Publication Data

US 2017/0180486 A1 Jun. 22, 2017

Related U.S. Application Data

(60) Provisional application No. 62/311,714, filed on Mar. 22, 2016, provisional application No. 62/310,153, (Continued)

(51) Int. Cl.
*H04L 29/06* (2006.01)
*H04L 29/14* (2006.01)
(Continued)

(52) U.S. Cl.
CPC ...... *H04L 65/4007* (2013.01); *H04L 41/0654* (2013.01); *H04L 43/16* (2013.01); *H04L 45/28* (2013.01); *H04L 49/552* (2013.01); *H04L 65/80* (2013.01); *H04L 67/141* (2013.01); *H04L 67/142* (2013.01); *H04L 67/146* (2013.01); *H04L 69/14* (2013.01); *H04L 69/16* (2013.01); *H04L 69/40* (2013.01); *H04M 3/5116* (2013.01);
(Continued)

(58) Field of Classification Search
CPC ..... H04L 69/40; H04L 45/28; H04L 65/4007; H04L 41/0654
See application file for complete search history.

(56) References Cited

U.S. PATENT DOCUMENTS 5,379,337 A 1/1995 Castillo et al.
5,479,482 A 12/1995 Grimes
(Continued)

FOREIGN PATENT DOCUMENTS

JP 2012222443 A 11/2012
KR 20090019606 A 2/2009
(Continued)

OTHER PUBLICATIONS

Co-pending U.S. Appl. No. 15/342,093, filed Nov. 2, 2016.
(Continued)

*Primary Examiner* — Aaron Strange
(74) *Attorney, Agent, or Firm* — Wilson, Sonsini, Goodrich & Rosati

(57) ABSTRACT

Described herein are systems, devices, methods, and media for managing emergency communications by using multiple transport layer sessions to ensure robust communications during periods of poor communication quality and/or by providing persistent communication sessions that continue despite poor communication quality or disconnections.

30 Claims, 15 Drawing Sheets

Related U.S. Application Data filed on Mar. 18, 2016, provisional application No. 62/271,140, filed on Dec. 22, 2015.

(51) Int. Cl.
| | |
|---|---|
| *H04L 29/08* | (2006.01) |
| *H04W 4/22* | (2009.01) |
| *H04M 3/51* | (2006.01) |
| *H04M 7/00* | (2006.01) |
| *H04L 12/26* | (2006.01) |
| *H04L 12/939* | (2013.01) |
| *H04L 12/24* | (2006.01) |
| *H04L 12/703* | (2013.01) |

(52) U.S. Cl.
CPC ............ *H04M 7/006* (2013.01); *H04W 4/22* (2013.01); *H04L 69/326* (2013.01)

(56) References Cited

U.S. PATENT DOCUMENTS

| | | |
|---|---|---|
| 5,563,931 A | 10/1996 | Bishop et al. |
| 5,596,625 A | 1/1997 | Leblanc |
| 5,710,803 A | 1/1998 | Kowal et al. |
| 5,742,666 A | 4/1998 | Alpert |
| 6,014,555 A | 1/2000 | Tendler |
| 6,249,674 B1 | 6/2001 | Verdonk |
| 6,252,943 B1 | 6/2001 | Johnson et al. |
| 6,477,362 B1 | 11/2002 | Raith et al. |
| 6,502,030 B2 | 12/2002 | Hilleary |
| 6,510,315 B1 | 1/2003 | Arnson |
| 6,556,816 B1 | 4/2003 | Gafrick et al. |
| 6,571,092 B2 | 5/2003 | Faccin et al. |
| 6,594,666 B1 | 7/2003 | Biswas et al. |
| 6,600,812 B1 | 7/2003 | Gentillin et al. |
| 6,628,933 B1 | 9/2003 | Humes |
| 7,058,385 B2 | 6/2006 | Lauper |
| 7,224,773 B2 | 5/2007 | Croak et al. |
| 7,324,801 B2 | 1/2008 | Droste et al. |
| 7,349,706 B2 | 3/2008 | Kim et al. |
| 7,409,044 B2 | 8/2008 | Leduc |
| 7,436,938 B2 | 10/2008 | Savaglio et al. |
| 7,437,143 B1 | 10/2008 | Williams |
| 7,469,138 B2 | 12/2008 | Dayar et al. |
| 7,483,519 B2 | 1/2009 | Binning |
| 7,519,351 B2 | 4/2009 | Malone, III |
| 7,519,372 B2 | 4/2009 | MacDonald et al. |
| 7,548,158 B2 | 6/2009 | Titus et al. |
| 7,565,131 B2 | 7/2009 | Rollender |
| 7,646,854 B2 | 1/2010 | Anderson |
| 7,676,215 B2 | 3/2010 | Chin et al. |
| 7,684,782 B2 | 3/2010 | Ashley, Jr. et al. |
| 7,848,733 B2 | 12/2010 | Bull et al. |
| 7,949,326 B2 | 5/2011 | Gallagher et al. |
| 8,009,810 B2 | 8/2011 | Seidberg et al. |
| 8,041,335 B2 | 10/2011 | Khetawat et al. |
| 8,041,341 B1 | 10/2011 | Malackowski et al. |
| 8,045,954 B2 | 10/2011 | Barbeau et al. |
| 8,068,881 B2 | 11/2011 | Schrager |
| 8,102,972 B2 | 1/2012 | Poremba |
| 8,126,424 B2 | 2/2012 | Piett et al. |
| 8,150,367 B1 | 4/2012 | Malladi et al. |
| 8,165,560 B2 | 4/2012 | Stenquist |
| 8,165,562 B2 | 4/2012 | Piett et al. |
| 8,185,087 B2 | 5/2012 | Mitchell, Jr. et al. |
| 8,195,121 B2 | 6/2012 | Dunn et al. |
| 8,219,135 B2 | 7/2012 | De Amorim et al. |
| 8,244,205 B2 | 8/2012 | Wu |
| 8,249,546 B1 | 8/2012 | Shah et al. |
| 8,249,547 B1 | 8/2012 | Fellner |
| 8,289,953 B2 | 10/2012 | Ray et al. |
| 8,306,501 B2 | 11/2012 | Moodbidri et al. |
| 8,326,260 B1 | 12/2012 | Bradish et al. |
| 8,369,488 B2 | 2/2013 | Sennett et al. |
| 8,401,565 B2 | 3/2013 | Sandberg et al. |
| 8,417,212 B2 | 4/2013 | Cepuran et al. |
| 8,472,973 B2 | 6/2013 | Lin et al. |
| 8,484,352 B2 | 7/2013 | Piett et al. |
| 8,489,062 B2 | 7/2013 | Ray et al. |
| 8,509,729 B2 | 8/2013 | Shaw |
| 8,516,122 B2 | 8/2013 | Piett et al. |
| 8,538,370 B2 | 9/2013 | Ray et al. |
| 8,538,468 B2 | 9/2013 | Daly |
| 8,594,015 B2 | 11/2013 | Dunn et al. |
| 8,606,218 B2 | 12/2013 | Ray et al. |
| 8,625,578 B2 | 1/2014 | Roy et al. |
| 8,626,112 B2 | 1/2014 | Ray et al. |
| 8,630,609 B2 | 1/2014 | Ray et al. |
| 8,644,301 B2 | 2/2014 | Tamhankar et al. |
| 8,682,279 B2 | 3/2014 | Rudolf et al. |
| 8,682,281 B2 | 3/2014 | Dunn et al. |
| 8,682,286 B2 | 3/2014 | Dickinson et al. |
| 8,712,366 B2 | 4/2014 | Greene et al. |
| 8,747,336 B2 | 6/2014 | Tran |
| 8,751,265 B2 | 6/2014 | Piett et al. |
| 8,760,290 B2 | 6/2014 | Piett et al. |
| 8,811,935 B2 | 8/2014 | Faccin et al. |
| 8,825,687 B2 | 9/2014 | Marceau et al. |
| 8,848,877 B2 | 9/2014 | Seidberg et al. |
| 8,866,606 B1 | 10/2014 | Will et al. |
| 8,868,028 B1 | 10/2014 | Kaltsukis |
| 8,880,021 B2 | 11/2014 | Hawkins |
| 8,890,685 B1 | 11/2014 | Sookman et al. |
| 8,948,732 B1 | 2/2015 | Negahban et al. |
| 8,971,839 B2 | 3/2015 | Hong |
| 8,984,143 B2 | 3/2015 | Serra et al. |
| 9,008,078 B2 | 4/2015 | Kamdar et al. |
| 9,019,870 B2 | 4/2015 | Khan et al. |
| 9,071,643 B2 | 6/2015 | Saito et al. |
| 9,077,676 B2 | 7/2015 | Price et al. |
| 9,078,092 B2 | 7/2015 | Piett et al. |
| 9,094,816 B2 | 7/2015 | Maier et al. |
| 9,167,379 B1 | 10/2015 | Hamilton et al. |
| 9,244,922 B2 | 1/2016 | Marceau et al. |
| 9,258,680 B2 | 2/2016 | Drucker |
| 9,277,389 B2 | 3/2016 | Saito et al. |
| 9,351,142 B2 | 5/2016 | Basore et al. |
| 9,369,847 B2 | 6/2016 | Borghei |
| 9,402,159 B1 | 7/2016 | Self et al. |
| 9,503,876 B2 | 11/2016 | Saito et al. |
| 9,544,750 B1 | 1/2017 | Self et al. |
| 9,591,467 B2 | 3/2017 | Piett et al. |
| 9,635,534 B2 | 4/2017 | Maier et al. |
| 9,693,213 B2 | 6/2017 | Self et al. |
| 9,805,430 B2 | 10/2017 | Miasnik et al. |
| 2002/0001367 A1 | 1/2002 | Lee |
| 2002/0057678 A1* | 5/2002 | Jiang ................ H04L 12/5895 370/353 |
| 2002/0120698 A1 | 8/2002 | Tamargo |
| 2003/0069035 A1* | 4/2003 | Shurvinton ......... H04W 52/267 455/522 |
| 2004/0203572 A1 | 10/2004 | Aerrabotu et al. |
| 2004/0266390 A1 | 12/2004 | Faucher et al. |
| 2005/0085215 A1 | 4/2005 | Kokko et al. |
| 2005/0104745 A1 | 5/2005 | Bachelder et al. |
| 2005/0151642 A1 | 7/2005 | Tupler et al. |
| 2006/0293024 A1 | 12/2006 | Benco et al. |
| 2007/0030144 A1 | 2/2007 | Titus et al. |
| 2007/0033095 A1 | 2/2007 | Hodgin et al. |
| 2007/0049287 A1 | 3/2007 | Dunn |
| 2007/0053308 A1 | 3/2007 | Dumas et al. |
| 2007/0058528 A1* | 3/2007 | Massa ................. G06F 11/2005 370/218 |
| 2007/0060097 A1* | 3/2007 | Edge ................ H04L 29/06027 455/404.1 |
| 2007/0161383 A1 | 7/2007 | Caci |
| 2007/0218895 A1 | 9/2007 | Saito et al. |
| 2008/0019268 A1* | 1/2008 | Rollins ............ H04L 29/06027 370/229 |
| 2008/0063153 A1 | 3/2008 | Krivorot et al. |
| 2008/0081646 A1 | 4/2008 | Morin et al. |
| 2008/0194238 A1 | 8/2008 | Kwon |
| 2008/0294058 A1 | 11/2008 | Shklarski |

(56) References Cited

U.S. PATENT DOCUMENTS

| | | | |
|---|---|---|---|
| 2009/0257345 A1* | 10/2009 | King | H04L 41/22 370/216 |
| 2009/0322513 A1 | 12/2009 | Hwang et al. | |
| 2010/0002846 A1 | 1/2010 | Ray et al. | |
| 2010/0159976 A1 | 6/2010 | Marocchi et al. | |
| 2010/0166153 A1 | 7/2010 | Guleria et al. | |
| 2010/0202368 A1* | 8/2010 | Hans | H04M 3/5116 370/329 |
| 2010/0238018 A1* | 9/2010 | Kelly | G08B 17/10 340/517 |
| 2011/0009086 A1 | 1/2011 | Poremba et al. | |
| 2011/0086607 A1 | 4/2011 | Wang et al. | |
| 2011/0103266 A1 | 5/2011 | Andreasen et al. | |
| 2011/0134897 A1 | 6/2011 | Montemurro et al. | |
| 2011/0153368 A1 | 6/2011 | Pierre et al. | |
| 2011/0201357 A1 | 8/2011 | Garrett et al. | |
| 2011/0263219 A1 | 10/2011 | Hasenfang et al. | |
| 2012/0002792 A1 | 1/2012 | Chang | |
| 2012/0029970 A1 | 2/2012 | Stiles et al. | |
| 2012/0092161 A1 | 4/2012 | West | |
| 2012/0144019 A1 | 6/2012 | Zhu | |
| 2012/0202428 A1 | 8/2012 | Mirbaha et al. | |
| 2012/0210325 A1* | 8/2012 | de Lind van Wijngaarden | H04W 52/0258 718/103 |
| 2012/0218102 A1 | 8/2012 | Bivens et al. | |
| 2012/0257729 A1 | 10/2012 | Piett et al. | |
| 2012/0289243 A1 | 11/2012 | Tarlow et al. | |
| 2012/0295575 A1 | 11/2012 | Nam | |
| 2012/0309341 A1 | 12/2012 | Ward | |
| 2013/0005295 A1 | 1/2013 | Park et al. | |
| 2013/0030825 A1 | 1/2013 | Bagwandeen et al. | |
| 2013/0084824 A1 | 4/2013 | Hursey | |
| 2013/0122932 A1 | 5/2013 | Patel et al. | |
| 2013/0138791 A1* | 5/2013 | Thomas | H04L 67/02 709/223 |
| 2013/0183924 A1 | 7/2013 | Saigh et al. | |
| 2013/0203373 A1 | 8/2013 | Edge | |
| 2013/0203376 A1 | 8/2013 | Maier et al. | |
| 2013/0226369 A1 | 8/2013 | Yorio et al. | |
| 2013/0237175 A1 | 9/2013 | Piett | |
| 2013/0237181 A1 | 9/2013 | Ray | |
| 2013/0331055 A1 | 12/2013 | McKown et al. | |
| 2014/0051379 A1 | 2/2014 | Ganesh et al. | |
| 2014/0086108 A1 | 3/2014 | Dunn et al. | |
| 2014/0087680 A1 | 3/2014 | Luukkala et al. | |
| 2014/0113606 A1 | 4/2014 | Morken et al. | |
| 2014/0126356 A1* | 5/2014 | Lee | H04L 41/0663 370/228 |
| 2014/0148120 A1 | 5/2014 | Buck | |
| 2014/0155018 A1 | 6/2014 | Fan et al. | |
| 2014/0199959 A1 | 7/2014 | Hassan et al. | |
| 2014/0248848 A1* | 9/2014 | Mufti | H04W 76/007 455/404.1 |
| 2014/0324351 A1 | 10/2014 | Dannevik et al. | |
| 2015/0055453 A1* | 2/2015 | Chaki | H04L 45/02 370/225 |
| 2015/0081209 A1 | 3/2015 | Yeh et al. | |
| 2015/0109125 A1 | 4/2015 | Kaib et al. | |
| 2015/0111524 A1 | 4/2015 | South et al. | |
| 2015/0137972 A1 | 5/2015 | Nepo et al. | |
| 2015/0172897 A1 | 6/2015 | Mariathasan et al. | |
| 2015/0289121 A1 | 10/2015 | Lesage et al. | |
| 2015/0304827 A1 | 10/2015 | Price et al. | |
| 2015/0350262 A1 | 12/2015 | Rainisto et al. | |
| 2015/0358794 A1 | 12/2015 | Nokhoudian et al. | |
| 2015/0365319 A1* | 12/2015 | Finn | H04L 45/28 370/221 |
| 2016/0004224 A1 | 1/2016 | Pi | |
| 2016/0026768 A1 | 1/2016 | Singh et al. | |
| 2016/0050550 A1 | 2/2016 | Anand et al. | |
| 2016/0088455 A1 | 3/2016 | Bozik et al. | |
| 2016/0219084 A1* | 7/2016 | AbiEzzi | H04L 65/403 |
| 2016/0219397 A1 | 7/2016 | Mayor et al. | |
| 2016/0269535 A1 | 9/2016 | Balabhadruni et al. | |
| 2016/0307436 A1 | 10/2016 | Nixon | |
| 2016/0337831 A1 | 11/2016 | Piett et al. | |
| 2016/0345171 A1 | 11/2016 | Kulkarni et al. | |
| 2016/0363931 A1 | 12/2016 | Yang et al. | |
| 2017/0004427 A1 | 1/2017 | Bruchal et al. | |
| 2017/0140637 A1 | 5/2017 | Thurlow et al. | |
| 2017/0142568 A1 | 5/2017 | Saito et al. | |
| 2017/0150335 A1 | 5/2017 | Self et al. | |
| 2017/0180963 A1 | 6/2017 | Cavendish et al. | |
| 2017/0180966 A1 | 6/2017 | Piett et al. | |
| 2017/0213251 A1 | 7/2017 | Nunally et al. | |
| 2017/0238129 A1 | 8/2017 | Maier et al. | |
| 2017/0238136 A1 | 8/2017 | Smith | |
| 2017/0245113 A1 | 8/2017 | Hooker | |
| 2018/0020091 A1 | 1/2018 | Self et al. | |

FOREIGN PATENT DOCUMENTS

| | | |
|---|---|---|
| KR | 20090092900 A | 9/2009 |
| KR | 20100055746 A | 5/2010 |
| KR | 101305286 B1 | 9/2013 |
| KR | 20140052780 A | 5/2014 |
| KR | 20150097031 A | 8/2015 |
| KR | 101602482 B1 | 3/2016 |
| KR | 20160097933 A | 8/2016 |
| WO | WO-2012129561 A1 | 9/2012 |
| WO | WO-2014025563 A1 | 2/2014 |
| WO | WO-2014074420 A1 | 5/2014 |
| WO | WO-2014176646 A1 | 11/2014 |
| WO | WO-2015127867 A1 | 9/2015 |
| WO | WO-2016044540 A1 | 3/2016 |
| WO | WO-2017079354 A1 | 5/2017 |
| WO | WO-2017106775 A1 | 6/2017 |
| WO | WO-2017112820 A1 | 6/2017 |
| WO | WO-2017189610 A2 | 11/2017 |
| WO | WO-2017196753 A1 | 11/2017 |

OTHER PUBLICATIONS

Co-pending U.S. Appl. No. 15/371,117, filed Dec. 6, 2016.
Co-pending U.S. Appl. No. 15/382,097, filed Dec. 16, 2016.
PCT/US2015/050609 International Search Report and Written Opinion dated Dec. 16, 2015.
U.S. Appl. No. 14/794,780 Office Action dated Feb. 2, 2016.
U.S. Appl. No. 14/794,780 Office Action dated Nov. 15, 2016.
Co-pending U.S. Appl. No. 15/466,710, filed Mar. 22, 2017.
Co-pending U.S. Appl. No. 15/497,067, filed Apr. 25, 2017.
Co-pending U.S. Appl. No. 15/588,343, filed May 5, 2017.
Co-pending U.S. Appl. No. 15/589,847, filed May 8, 2017.
PCT/US2015/050609 International Preliminary Report on Patentability dated Mar. 30, 2017.
PCT/US2016/067366 International Search Report and Written Opinion dated Mar. 31, 2017.
PCT/US2016/068134 International Search Report and Written Opinion dated Apr. 21, 2017.
Tazaki. Floating Ground: An Architecture for Network Mobility and Ad Hoc Network Convergence. Thesis. Graduate School of Media and Governance Keio University 5322 Endo Fujisawa, Kanagawa, Japan 2520882 (pp. 1-162) (2010).
U.S. Appl. No. 14/856,818 Office Action dated Apr. 12, 2017.
U.S. Appl. No. 15/436,379 Office Action dated Apr. 6, 2017.
U.S. Appl. No. 15/436,484 Office Action dated May 8, 2017.
U.S. Appl. No. 15/444,133 Office Action dated Apr. 4, 2017.
PCT/US2017/047854 International Search Report and Written Opinion dated Nov. 28, 2017.
U.S. Appl. No. 15/589,847 Office Action dated Nov. 30, 2017.
U.S. Appl. No. 15/497,067 Office Action dated Jun. 23, 2017.
U.S. Appl. No. 15/589,847 Office Action dated Jun. 23, 2017.
Co-pending U.S. Appl. No. 15/667,531, filed Aug. 2, 2017.
Co-pending U.S. Appl. No. 15/682,440, filed Aug. 21, 2017.
PCT/US2017/029465 International Search Report and Written Opinion dated Aug. 9, 2017.
PCT/US2017/031605 International Search Report and Written Opinion dated Jul. 31, 2017.

(56) References Cited

OTHER PUBLICATIONS

U.S. Appl. No. 15/436,484 Office Action dated Sep. 14, 2017.
U.S. Appl. No. 15/444,133 Office Action dated Aug. 17, 2017.
Co-pending U.S. Appl. No. 15/880,208, filed Jan. 25, 2018.
Co-pending U.S. Appl. No. 15/436,379, filed Feb. 17, 2017.
Co-pending U.S. Appl. No. 15/436,484, filed Feb. 17, 2017.
Co-pending U.S. Appl. No. 15/444,133, filed Feb. 27, 2017.
PCT/US2016/060189 International Search Report and Written Opinion dated Feb. 24, 2017.
PCT/US2016/065212 International Search Report and Written Opinion dated Feb. 20, 2017.
U.S. Appl. No. 14/794,780 Office Action dated Mar. 7, 2017.
U.S. Appl. No. 15/436,379 Office Action dated Nov. 2, 2017.
U.S. Appl. No. 15/667,531 Office Action dated Nov. 8, 2017.
National Emergency No. Association (Nena) Technical Committee Chairs: NENA Functional and Interface Standards for Next Generation 9-1-1 Version 1.0 (i3). (Dec. 18, 2017). Retrieved from the Internet: URL:https://c.ymcdn.com/sites/nena.site-ym.com/resource/collection/2851C951-69FF-40F0-A6B8-36A714CB085D/NENA_08-002-vl_Functional_Interface_Standards_NG911_i3.pdf [retrieved on Feb. 5, 2018] (121 pgs).
U.S. Appl. No. 15/588,343 Office Action dated Feb. 26, 2018.
U.S. Appl. No. 15/667,531 Office Action dated Apr. 5, 2018.

\* cited by examiner

SYSTEMS AND METHODS FOR ROBUST AND PERSISTENT EMERGENCY COMMUNICATIONS

CROSS-REFERENCE

This application claims the benefit of U.S. Provisional Application No. 62/271,140, filed Dec. 22, 2015, U.S. Provisional Application No. 62/310,153, filed Mar. 18, 2016, and U.S. Provisional Application No. 62/311,714, filed Mar. 22, 2016, which applications are incorporated herein in their entirety by reference.

BACKGROUND

A person in an emergency situation may request help using a mobile communication device such as a cell phone to dial a designated emergency number like 9-1-1 or a direct access phone number for the local emergency service provider. However, these communications are typically limited to audio calls since most emergency service providers that receive emergency calls currently lack the capacity to receive texts, photos, and videos. In addition, emergency calls may suffer from poor communication quality, disconnections, lack of location information, connecting to an emergency service provider located in the wrong jurisdiction, and inefficiency or inability in transferring calls to the appropriate emergency service provider.

SUMMARY

In most countries across the world, designated 3-digit numbers exist to place calls for emergency assistance. These calls for requesting emergency assistance are normally made via analog communication channels such as a public switched telephone network (PSTN) since most emergency service providers such as emergency dispatch centers (EDC) or public-safety access points (PSAP) are generally suited to only receive analog landline based calls. However, a vast number of calls requesting emergency assistance now originate from mobile communication devices such as, for example, mobile phones that are capable of communicating via data communication channels (e.g. Internet Protocol (IP)-based communication sessions). Despite the convenience of mobile communication devices, they are confronted with a number of obstacles when it comes to emergency communications, which may hinder or even thwart an emergency service provider's efforts to send emergency assistance to a person in distress. Indeed, although all communications can benefit from improvements to communication quality to provide users with robust and persistent communications sessions, this need is most dire in emergency situations when communications problems can mean the difference between life and death.

Although mobile communication devices can take advantage of data communication channels to call or communicate with end devices or emergency service providers, they are vulnerable to factors that disrupt the quality of a communication session. For example, session time-outs, ACK failures, re-transmission time-outs, out-of-sequence packets, excessive jitter between consecutive packet reception, CRC or checksum failures, frame errors, bit errors, and SNR fluctuations are some of the factors that negatively impact a given communication session between a communication device and an end communication device or an emergency service provider such as an emergency management system or emergency dispatch center. Moreover, a communication device may lose battery power during an emergency call, resulting in disconnection of the communication session. A user may need to switch to another communication device, for example, because the current device has poor audio quality. In some instances, a user may be moving (e.g. driving down a highway) and eventually enters a geographic area that is the jurisdiction of a different EDC than the one with which the user initiated the emergency communication session. This may result in the communication session being switched to the EDC that has jurisdiction over the geographic area in which the user is currently located. These disconnections, communication session switches, poor communication quality, loss of data, and other issues can hinder or obstruct a timely emergency response.

One advantage of the systems, devices, methods, and media described herein is that they enable robust communication by providing multiple transport layer sessions within a given communication session. In some embodiments, the multiple transport layer sessions utilize different end-to-end routes to send and receive data with an end communication device or system. In some embodiments, the multiple transport layer sessions comprise different session parameters. This enables the analysis and comparison of transport layer sessions to determine which session(s) provide superior communication quality. In some embodiments, a device or system dynamically switches data flow to a session that has superior communication quality.

Another advantage of the systems, devices, methods, and media described herein is that they enable session persistence for a communication session when end devices and/or systems participating in the communication session are dropped or switched. In some embodiments, a communication session is maintained when a user switches communication devices during the session. In some embodiments, a communication session is maintained when it is transferred over to another end device or system, for example, from one EDC to another EDC.

Another advantage of the systems, devices, methods, and media described herein is that they enable session persistence through periods of poor communication quality by managing session parameter values to extend a communication session when normal parameter values would result in termination of the communication session. For example, the session management protocol according to the industry standard will believe a communication session to be non-responsive and disconnect the session when the signal to noise ratio (SNR) is too low. In some embodiments, the session parameter(s) regarding SNR are set so that the SNR threshold needed for disconnection of the session is lower than the industry standard.

In one aspect, provided herein is a communication device comprising at least one processor, a memory, a network element, and a computer program including instructions executable by the at least one processor to create a software application for managing emergency communications comprising: (a) a communication module establishing a communication session at an application layer with an end device or system, the communication session comprising a plurality of transport layer sessions simultaneously connected to the end device or system; (b) a flow evaluation module evaluating data flow transmitted over each of the plurality of transport layer sessions against one or more performance benchmarks; and (c) a flow transfer module dynamically transferring data flow from any transport layer session failing the one or more performance benchmarks to another transport layer session of the plurality of transport layer sessions during the communication session.

In another aspect, provided herein is a communication device comprising at least one processor, a memory, a network element, and a computer program including instructions executable by the at least one processor to create a software application for managing emergency communications comprising: (a) a communication module establishing a communication session with an emergency management system (EMS) or emergency dispatch center (EDC), the communication session comprising a plurality of transport layer sessions simultaneously connected to the EMS or EDC; (b) a flow evaluation module evaluating data flow transmitted over each of the plurality of transport layer sessions against one or more performance benchmarks; and (c) a flow transfer module dynamically transferring data flow from any transport layer session failing the one or more performance benchmarks to another transport layer session of the plurality of transport layer sessions during the communication session. In some embodiments, the one or more performance benchmarks are selected from responsiveness, quality, reliability, or any combination thereof. In further embodiments, the one or more performance benchmarks are determined using one or more factors selected from session time-outs, ACK failures, retransmission time-outs, out-of-sequence packets, excessive jitter between consecutive packet reception, CRC or checksum failures, frame errors, bit errors, SNR fluctuations, or any combination thereof. In some embodiments, the plurality of transport layer sessions comprises at least one TCP transport layer session. In some embodiments, the plurality of transport layer sessions comprises at least one UDP transport layer session. In some embodiments, the plurality of transport layer sessions comprises at least one transport layer session using a transport layer protocol selected from TCP, UDP, ATP, CUDP, DCCP, FCP, IL, MPTCP, RDP, RUDP, SCTP, SPX, and SST. In some embodiments, the communication module transmits audio over at least one transport layer session. In some embodiments, the communication module transmits one or more multi-media messages over at least one transport layer session. In some embodiments, the communication module uses encapsulation to transmit information through at least one transport layer session. In some embodiments, the communication module uses encapsulation to transmit audio through at least one transport layer session. In some embodiments, the communication session is an emergency communication session initiated upon transmission of an emergency request to the EMS or EDC by the communication device. In some embodiments, the communication module transmits user metadata over the plurality of transport layer sessions. In further embodiments, the user metadata comprises information selected from user identification, user login, device location, user medical history, or any combination thereof. In some embodiments, the plurality of transport layer sessions comprise a primary transport layer session and one or more secondary transport layer sessions. In further embodiments, the flow transfer module shifts data flow from the primary transport layer session to the one or more secondary transport layer sessions when the flow evaluation module determines that the primary transport layer session fails the one or more performance benchmarks. In further embodiments, the primary transport layer session uses TCP or UDP. In yet further embodiments, the primary transport layer session uses TCP. In yet further embodiments, the primary transport layer session uses UDP. In further embodiments, the one or more secondary transport layer sessions use TCP or UDP. In yet further embodiments, the one or more secondary transport layer sessions use TCP. In yet further embodiments, the one or more secondary transport layer sessions use UDP. In further embodiments, the primary and the one or more secondary transport layer sessions use different transport protocols. In further embodiments, the primary and one or more secondary transport layer sessions use identical transport protocols. In further embodiments, the flow transfer module directs data flow through the primary transport layer session and the one or more secondary transport layer sessions simultaneously when the flow evaluation module determines data redundancy is needed. In yet further embodiments, the flow evaluation module determines data redundancy is needed when the information being transmitted comprises location information of the robust communication device. In yet further embodiments, the flow evaluation module determines data redundancy is needed when data flow over the primary transport layer session is losing data packets beyond a defined threshold. In still yet further embodiments, the defined threshold is 10% data packet loss. In yet further embodiments, the communication module harmonizes data flow received over the primary transport layer session and the one or more secondary transport layer sessions. In still yet further embodiments, harmonizing data flow comprises harmonizing sequence numbers. In still yet further embodiments, harmonizing data flow comprises harmonizing session parameters comprising window size and time-to-live. In some embodiments, the device further comprises a session-stay-alive (SSA) module modifying one or more session parameters for one or more of the plurality of transport layer sessions to maintain connection with the emergency management system or emergency dispatch center when data flow is degraded sufficiently to result in disconnection under one or more performance benchmarks corresponding to industry standard acceptable limits. In further embodiments, the one or more session parameters are selected from RTT, time-to-live (TTL) for data packets, re-transmission timeouts, clear channel assessment (CCA) delay, re-transmission counts, jitter buffer length, or any combination thereof. In further embodiments, the SSA module modifies the one or more session parameters prior to establishing the communication session. In yet further embodiments, the SSA module uses session parameters from a saved session state associated with the communication session. In further embodiments, the SSA module dynamically modifies the one or more parameters of the communication session during the communication session. In some embodiments, the plurality of transport layer sessions comprises a plurality of TCP transport layer sessions, wherein each of the plurality of TCP transport layer sessions uses a different routing path between the communication device and the EMS or EDC. In some embodiments, the plurality of transport layer sessions comprises a plurality of UDP transport layer sessions, wherein each of the plurality of UDP transport layer sessions uses a different routing path between the communication device and the EMS or EDC. In some embodiments, the device further comprises a session management module that saves a session state of the communication session. In further embodiments, the session state comprises one or more session parameters for at least one transport layer session of the plurality of transport layer sessions. In yet further embodiments, the one or more session parameters are selected from RTT, time-to-live (TTL) for data packets, re-transmission timeouts, clear channel assessment (CCA) delay, re-transmission counts, jitter buffer length, or any combination thereof. In further embodiments, the communication session is assigned a unique session identification number (USIN) by the emergency management system or emergency dispatch center. In yet further embodiments, the communication session is transferred to a new emergency management system or emergency dispatch center, wherein the device obtains authentication to join the communication session from the new emergency management system or emergency dispatch center by providing the USIN assigned to the communication session. In yet further embodiments, the session management module transfers the USIN for the communication session to a new communication device, wherein the new communication device identifies itself as party to the communication session by providing the USIN number to the emergency management system or emergency dispatch center. In yet further embodiments, the session management module transmits the USIN to a new communication device allowing the new communication device to join the communication session by providing the emergency management system or emergency dispatch center with the USIN. In still yet further embodiments, the session management module transmits the saved session state to the new communication device to enable the communication session to continue with the new communication device using the same session state. In still yet further embodiments, the session management module transfers the USIN to the new communication device using Wi-Fi, Bluetooth, a cellular channel, infrared, microwave, radio, or other wireless communication channel. In still yet further embodiments, the USIN number is stored in a USIN server storing a plurality of USIN, each USIN associated with an active communication session. In further embodiments, the session management module sends the saved session state of the communication session to the emergency management system or emergency dispatch center.

In another aspect, provided herein is non-transitory computer-readable storage media encoded with a computer program including instructions executable by at least one processor to create an application for managing emergency communications, the application comprising: (a) a communication module establishing a communication session with an emergency management system (EMS) or emergency dispatch center (EDC), the communication session comprising a plurality of transport layer sessions simultaneously connected to the EMS or EDC; (b) a flow evaluation module evaluating data flow transmitted over each of the plurality of transport layer sessions against one or more performance benchmarks; and (c) a flow transfer module dynamically transferring data flow from any transport layer session failing the one or more performance benchmarks to another transport layer session of the plurality of transport layer sessions during the communication session. In some embodiments, the one or more performance benchmarks are selected from responsiveness, quality, reliability, or any combination thereof. In further embodiments, the one or more performance benchmarks are determined using one or more factors selected from session time-outs, ACK failures, retransmission time-outs, out-of-sequence packets, excessive jitter between consecutive packet reception, CRC or checksum failures, frame errors, bit errors, SNR fluctuations, or any combination thereof. In some embodiments, the plurality of transport layer sessions comprises at least one TCP transport layer session. In some embodiments, the plurality of transport layer sessions comprises at least one UDP transport layer session. In some embodiments, the plurality of transport layer sessions comprises at least one transport layer session using a transport layer protocol selected from TCP, UDP, ATP, CUDP, DCCP, FCP, IL, MPTCP, RDP, RUDP, SCTP, SPX, and SST. In some embodiments, the communication module transmits audio over at least one transport layer session. In some embodiments, the communication module transmits one or more multi-media messages over at least one transport layer session. In some embodiments, the communication module uses encapsulation to transmit information through at least one transport layer session. In some embodiments, the communication module uses encapsulation to transmit audio through at least one transport layer session. In some embodiments, the communication session is an emergency communication session initiated upon transmission of an emergency request to the EMS or EDC by the communication device. In some embodiments, the communication module transmits user metadata over the plurality of transport layer sessions. In further embodiments, the user metadata comprises information selected from user identification, user login, device location, user medical history, or any combination thereof. In some embodiments, the plurality of transport layer sessions comprise a primary transport layer session and one or more secondary transport layer sessions. In further embodiments, the flow transfer module shifts data flow from the primary transport layer session to the one or more secondary transport layer sessions when the flow evaluation module determines that the primary transport layer session fails the one or more performance benchmarks. In further embodiments, the primary transport layer session uses TCP or UDP. In yet further embodiments, the primary transport layer session uses TCP. In yet further embodiments, the primary transport layer session uses UDP. In further embodiments, the one or more secondary transport layer sessions use TCP or UDP. In yet further embodiments, the one or more secondary transport layer sessions use TCP. In yet further embodiments, the one or more secondary transport layer sessions use UDP. In further embodiments, the primary and the one or more secondary transport layer sessions use different transport protocols. In further embodiments, the primary and one or more secondary transport layer sessions use identical transport protocols. In further embodiments, the flow transfer module directs data flow through the primary transport layer session and the one or more secondary transport layer sessions simultaneously when the flow evaluation module determines data redundancy is needed. In yet further embodiments, the flow evaluation module determines data redundancy is needed when the information being transmitted comprises location information of the robust communication device. In yet further embodiments, the flow evaluation module determines data redundancy is needed when data flow over the primary transport layer session is losing data packets beyond a defined threshold. In still yet further embodiments, the defined threshold is 10% data packet loss. In yet further embodiments, the communication module harmonizes data flow received over the primary transport layer session and the one or more secondary transport layer sessions. In still yet further embodiments, harmonizing data flow comprises harmonizing sequence numbers. In still yet further embodiments, harmonizing data flow comprises harmonizing session parameters comprising window size and time-to-live. In some embodiments, the media further comprises a session-stay-alive (SSA) module modifying one or more session parameters for one or more of the plurality of transport layer sessions to maintain connection with the emergency management system or emergency dispatch center when data flow is degraded sufficiently to result in disconnection under one or more performance benchmarks corresponding to industry standard acceptable limits. In further embodiments, the one or more session parameters are selected from RTT, time-to-live (TTL) for data packets, re-transmission timeouts, clear channel assessment (CCA) delay, re-transmission counts, jitter buffer length, or any combination thereof. In further embodiments, the SSA module modifies the one or more session parameters prior to establishing the communication session. In yet further embodiments, the SSA module uses session parameters from a saved session state associated with the communication session. In further embodiments, the SSA module dynamically modifies the one or more parameters of the communication session during the communication session. In some embodiments, the plurality of transport layer sessions comprises a plurality of TCP transport layer sessions, wherein each of the plurality of TCP transport layer sessions uses a different routing path between the communication device and the EMS or EDC. In some embodiments, the plurality of transport layer sessions comprises a plurality of UDP transport layer sessions, wherein each of the plurality of UDP transport layer sessions uses a different routing path between the communication device and the EMS or EDC. In some embodiments, the media further comprises a session management module that saves a session state of the communication session. In further embodiments, the session state comprises one or more session parameters for at least one transport layer session of the plurality of transport layer sessions. In yet further embodiments, the one or more session parameters are selected from RTT, time-to-live (TTL) for data packets, re-transmission timeouts, clear channel assessment (CCA) delay, re-transmission counts, jitter buffer length, or any combination thereof. In further embodiments, the communication session is assigned a unique session identification number (USIN) by the emergency management system or emergency dispatch center. In yet further embodiments, the communication session is transferred to a new emergency management system or emergency dispatch center, wherein the device obtains authentication to join the communication session from the new emergency management system or emergency dispatch center by providing the USIN assigned to the communication session. In yet further embodiments, the session management module transfers the USIN for the communication session to a new communication device, wherein the new communication device identifies itself as party to the communication session by providing the USIN number to the emergency management system or emergency dispatch center. In yet further embodiments, the session management module transmits the USIN to a new communication device allowing the new communication device to join the communication session by providing the emergency management system or emergency dispatch center with the USIN. In still yet further embodiments, the session management module transmits the saved session state to the new communication device to enable the communication session to continue with the new communication device using the same session state. In still yet further embodiments, the session management module transfers the USIN to the new communication device using Wi-Fi, Bluetooth, a cellular channel, infrared, microwave, radio, or other wireless communication channel. In still yet further embodiments, the USIN number is stored in a USIN server storing a plurality of USIN, each USIN associated with an active communication session. In further embodiments, the session management module sends the saved session state of the communication session to the emergency management system or emergency dispatch center.

In another aspect, provided herein is a method for managing emergency communications using a communication device comprising at least one processor, a memory, a network element, and instructions executable by the at least one processor to create an application for managing emergency communications, the method comprising: (a) providing, by the device, a communication module establishing a communication session with an emergency management system (EMS) or emergency dispatch center (EDC), the session comprising a plurality of transport layer sessions simultaneously connected to the EMS or EDC; (b) providing, by the device, a flow evaluation module evaluating data flow transmitted over each of the plurality of transport layer sessions against one or more performance benchmarks; and (c) providing, by the device, a flow transfer module dynamically transferring data flow from any transport layer session failing the one or more performance benchmarks to another transport layer session of the plurality of transport layer sessions during the communication session. In some embodiments, the one or more performance benchmarks are selected from responsiveness, quality, reliability, or any combination thereof. In further embodiments, the one or more performance benchmarks are determined using one or more factors selected from session time-outs, ACK failures, retransmission time-outs, out-of-sequence packets, excessive jitter between consecutive packet reception, CRC or checksum failures, frame errors, bit errors, SNR fluctuations, or any combination thereof. In some embodiments, the plurality of transport layer sessions comprises at least one TCP transport layer session. In some embodiments, the plurality of transport layer sessions comprises at least one UDP transport layer session. In some embodiments, the plurality of transport layer sessions comprises at least one transport layer session using a transport layer protocol selected from TCP, UDP, ATP, CUDP, DCCP, FCP, IL, MPTCP, RDP, RUDP, SCTP, SPX, and SST. In some embodiments, the communication module transmits audio over at least one transport layer session. In some embodiments, the communication module transmits one or more multi-media messages over at least one transport layer session. In some embodiments, the communication module uses encapsulation to transmit information through at least one transport layer session. In some embodiments, the communication module uses encapsulation to transmit audio through at least one transport layer session. In some embodiments, the communication session is an emergency communication session initiated upon transmission of an emergency request to the EMS or EDC by the communication device. In some embodiments, the communication module transmits user metadata over the plurality of transport layer sessions. In further embodiments, the user metadata comprises information selected from user identification, user login, device location, user medical history, or any combination thereof. In some embodiments, the plurality of transport layer sessions comprise a primary transport layer session and one or more secondary transport layer sessions. In further embodiments, the flow transfer module shifts data flow from the primary transport layer session to the one or more secondary transport layer sessions when the flow evaluation module determines that the primary transport layer session fails the one or more performance benchmarks. In further embodiments, the primary transport layer session uses TCP or UDP. In yet further embodiments, the primary transport layer session uses TCP. In yet further embodiments, the primary transport layer session uses UDP. In further embodiments, the one or more secondary transport layer sessions use TCP or UDP. In yet further embodiments, the one or more secondary transport layer sessions use TCP. In yet further embodiments, the one or more secondary transport layer sessions use UDP. In further embodiments, the primary and the one or more secondary transport layer sessions use different transport protocols. In further embodiments, the primary and one or more secondary transport layer sessions use identical transport protocols. In further embodiments, the flow transfer module directs data flow through the primary transport layer session and the one or more secondary transport layer sessions simultaneously when the flow evaluation module determines data redundancy is needed. In yet further embodiments, the flow evaluation module determines data redundancy is needed when the information being transmitted comprises location information of the robust communication device. In yet further embodiments, the flow evaluation module determines data redundancy is needed when data flow over the primary transport layer session is losing data packets beyond a defined threshold. In still yet further embodiments, the defined threshold is 10% data packet loss. In yet further embodiments, the communication module harmonizes data flow received over the primary transport layer session and the one or more secondary transport layer sessions. In still yet further embodiments, harmonizing data flow comprises harmonizing sequence numbers. In still yet further embodiments, harmonizing data flow comprises harmonizing session parameters comprising window size and time-to-live. In some embodiments, the method further comprises providing, by the device, a session-stay-alive (SSA) module modifying one or more session parameters for one or more of the plurality of transport layer sessions to maintain connection with the emergency management system or emergency dispatch center when data flow is degraded sufficiently to result in disconnection under one or more performance benchmarks corresponding to industry standard acceptable limits. In further embodiments, the one or more session parameters are selected from RTT, time-to-live (TTL) for data packets, re-transmission timeouts, clear channel assessment (CCA) delay, re-transmission counts, jitter buffer length, or any combination thereof. In further embodiments, the SSA module modifies the one or more session parameters prior to establishing the communication session. In yet further embodiments, the SSA module uses session parameters from a saved session state associated with the communication session. In further embodiments, the SSA module dynamically modifies the one or more parameters of the communication session during the communication session. In some embodiments, the plurality of transport layer sessions comprises a plurality of TCP transport layer sessions, wherein each of the plurality of TCP transport layer sessions uses a different routing path between the communication device and the EMS or EDC. In some embodiments, the plurality of transport layer sessions comprises a plurality of UDP transport layer sessions, wherein each of the plurality of UDP transport layer sessions uses a different routing path between the communication device and the EMS or EDC. In some embodiments, the method further comprises providing, by the device, a session management module that saves a session state of the communication session. In further embodiments, the session state comprises one or more session parameters for at least one transport layer session of the plurality of transport layer sessions. In yet further embodiments, the one or more session parameters are selected from RTT, time-to-live (TTL) for data packets, re-transmission timeouts, clear channel assessment (CCA) delay, re-transmission counts, jitter buffer length, or any combination thereof. In further embodiments, the communication session is assigned a unique session identification number (USIN) by the emergency management system or emergency dispatch center. In yet further embodiments, the communication session is transferred to a new emergency management system or emergency dispatch center, wherein the device obtains authentication to join the communication session from the new emergency management system or emergency dispatch center by providing the USIN assigned to the communication session. In yet further embodiments, the session management module transfers the USIN for the communication session to a new communication device, wherein the new communication device identifies itself as party to the communication session by providing the USIN number to the emergency management system or emergency dispatch center. In yet further embodiments, the session management module transmits the USIN to a new communication device allowing the new communication device to join the communication session by providing the emergency management system or emergency dispatch center with the USIN. In still yet further embodiments, the session management module transmits the saved session state to the new communication device to enable the communication session to continue with the new communication device using the same session state. In still yet further embodiments, the session management module transfers the USIN to the new communication device using Wi-Fi, Bluetooth, a cellular channel, infrared, microwave, radio, or other wireless communication channel. In still yet further embodiments, the USIN number is stored in a USIN server storing a plurality of USIN, each USIN associated with an active communication session. In further embodiments, the session management module sends the saved session state of the communication session to the emergency management system or emergency dispatch center.

In another aspect, provided herein is an emergency management system comprising at least one processor, a memory, a network element, and a computer program including instructions executable by the at least one processor to create a server software application for managing emergency communication sessions comprising: (a) a communication module establishing an emergency communication session at an application layer with a first communication device upon receiving an user emergency request from the first device, the communication session comprising a plurality of transport layer sessions simultaneously connected to the first device; (b) a flow evaluation module evaluating data flow transmitted over each of the plurality of transport layer sessions against one or more performance benchmarks; (c) a flow transfer module dynamically transferring data flow from any transport layer session failing the one or more performance benchmarks to another transport layer session of the plurality of transport layer sessions during the communication session; (d) a device management module associating a new communication device with the communication session when provided with authentication to join the communication session and detecting when the first communication device is dropped from the communication session; and (e) a session management module maintaining the emergency communication session when the first communication device is dropped by relocating data flow to the new communication device, wherein the communication session at the application layer continues with the new communication device replacing the dropped first communication device. In some embodiments, the one or more performance benchmarks are selected from responsiveness, quality, reliability, or any combination thereof. In further embodiments, the one or more performance benchmarks are determined using one or more factors selected from session time-outs, ACK failures, retransmission time-outs, out-of-sequence packets, excessive jitter between consecutive packet reception, CRC or checksum failures, frame errors, bit errors, SNR fluctuations, or any combination thereof. In some embodiments, the plurality of transport layer sessions comprises at least one TCP transport layer session. In some embodiments, the plurality of transport layer sessions comprises at least one UDP transport layer session. In some embodiments, the plurality of transport layer sessions comprises at least one transport layer session using a transport layer protocol selected from TCP, UDP, ATP, CUDP, DCCP, FCP, IL, MPTCP, RDP, RUDP, SCTP, SPX, and SST. In some embodiments, the communication module transmits audio over at least one transport layer session. In some embodiments, the communication module transmits one or more multi-media messages over at least one transport layer session. In some embodiments, the communication module uses encapsulation to transmit information through at least one transport layer session. In some embodiments, the communication module uses encapsulation to transmit audio through at least one transport layer session. In some embodiments, the communication module receives user metadata over the plurality of transport layer sessions. In further embodiments, the user metadata comprises information selected from user identification, user login, device location, user medical history, or any combination thereof. In some embodiments, the plurality of transport layer sessions comprise a primary transport layer session and one or more secondary transport layer sessions. In further embodiments, the flow transfer module shifts data flow from the primary transport layer session to the one or more secondary transport layer sessions when the flow evaluation module determines that the primary transport layer session fails the one or more performance benchmarks. In further embodiments, the primary transport layer session uses TCP or UDP. In yet further embodiments, the primary transport layer session uses TCP. In yet further embodiments, the primary transport layer session uses UDP. In further embodiments, the one or more secondary transport layer sessions use TCP or UDP. In yet further embodiments, the one or more secondary transport layer sessions use TCP. In yet further embodiments, the one or more secondary transport layer sessions use UDP. In further embodiments, the primary and the one or more secondary transport layer sessions use different transport protocols. In further embodiments, the primary and one or more secondary transport layer sessions use identical transport protocols. In further embodiments, the flow transfer module directs data flow through the primary transport layer session and the one or more secondary transport layer sessions simultaneously when the flow evaluation module determines data redundancy is needed. In yet further embodiments, the flow evaluation module determines data redundancy is needed when the information being transmitted comprises location information of the robust communication device. In yet further embodiments, the flow evaluation module determines data redundancy is needed when data flow over the primary transport layer session is losing data packets beyond a defined threshold. In still yet further embodiments, the defined threshold is 10% data packet loss. In yet further embodiments, the communication module harmonizes data flow received over the primary transport layer session and the one or more secondary transport layer sessions. In still yet further embodiments, harmonizing data flow comprises harmonizing sequence numbers. In still yet further embodiments, harmonizing data flow comprises harmonizing session parameters comprising window size and time-to-live. In some embodiments, the first communication device is dropped from the emergency communication session due to poor signal, device shutdown, user switching devices, running out of batteries, or any combination thereof. In some embodiments, the new communication device obtains authentication by providing user login information identical to user login information for the first communication device, wherein the first and new communication devices are associated with a user account. In some embodiments, the communication module assigns a USIN to the communication session. In further embodiments, the USIN number is stored in a USIN server storing a plurality of USIN, each USIN associated with an active communication session. In further embodiments, the new communication device obtains authentication by providing the USIN assigned to the communication session. In yet further embodiments, first communication device transmits the USIN to the new communication device. In some embodiments, the session management module saves a session state of the communication session. In further embodiments, the session state comprises one or more session parameters for at least one transport layer session of the plurality of transport layer sessions. In yet further embodiments, the one or more session parameters are selected from RTT, time-to-live (TTL) for data packets, re-transmission timeouts, clear channel assessment (CCA) delay, re-transmission counts, jitter buffer length, or any combination thereof. In further embodiments, the session management module transmits the saved session state to the new communication device to enable the communication session to continue with the new communication device using the same session state. In further embodiments, the system further comprises a session transfer module transferring the emergency communication session to a new emergency management system or emergency dispatch center. In yet further embodiments, transferring the emergency communication session comprises transferring the session state. In yet further embodiments, the new emergency management system or emergency dispatch center has jurisdiction over the active communication device based on current location data of the active communication device. In some embodiments, the system sends authentication information needed to authenticate the active communication device to join the communication session. In further embodiments, the authentication information comprises user login information or USIN. In some embodiments, the system further comprises a session-stay-alive (SSA) module modifying one or more session parameters for one or more of the plurality of transport layer sessions to maintain connection with the first or new communication device when data flow is degraded sufficiently to result in disconnection under one or more performance benchmarks corresponding to industry standard acceptable limits. In further embodiments, the one or more session parameters are selected from RTT, time-to-live (TTL) for data packets, re-transmission timeouts, clear channel assessment (CCA) delay, re-transmission counts, jitter buffer length, or any combination thereof. In further embodiments, the SSA module modifies the one or more session parameters prior to establishing the communication session. In yet further embodiments, the EMS SSA module uses session parameters from a saved session state associated with the communication session. In further embodiments, the SSA module dynamically modifies the one or more parameters of the communication session during the communication session. In some embodiments, the plurality of transport layer sessions comprises a plurality of TCP transport layer sessions, wherein each of the plurality of TCP transport layer sessions uses a different routing path between the communication device and the EMS. In some embodiments, the plurality of transport layer sessions comprises a plurality of UDP transport layer sessions, wherein each of the plurality of UDP transport layer sessions uses a different routing path between the communication device and the EMS.

In another aspect, provided herein is non-transitory computer-readable storage media encoded with a computer program including instructions executable by at least one processor to create a server application for managing emergency communications, the application comprising: (a) a communication module establishing an emergency communication session at an application layer with a first communication device upon receiving an user emergency request from the first device, the communication session comprising a plurality of transport layer sessions simultaneously connected to the first device; (b) a flow evaluation module evaluating data flow transmitted over each of the plurality of transport layer sessions against one or more performance benchmarks; (c) a flow transfer module dynamically transferring data flow from any transport layer session failing the one or more performance benchmarks to another transport layer session of the plurality of transport layer sessions during the communication session; (d) a device management module associating a new communication device with the communication session when provided with authentication to join the communication session and detecting when the first communication device is dropped from the communication session; and (e) a session management module maintaining the emergency communication session when the first communication device is dropped by relocating data flow to the new communication device, wherein the communication session at the application layer continues with the new communication device replacing the dropped first communication device. In some embodiments, the one or more performance benchmarks are selected from responsiveness, quality, reliability, or any combination thereof. In further embodiments, the one or more performance benchmarks are determined using one or more factors selected from session time-outs, ACK failures, retransmission time-outs, out-of-sequence packets, excessive jitter between consecutive packet reception, CRC or checksum failures, frame errors, bit errors, SNR fluctuations, or any combination thereof. In some embodiments, the plurality of transport layer sessions comprises at least one TCP transport layer session. In some embodiments, the plurality of transport layer sessions comprises at least one UDP transport layer session. In some embodiments, the plurality of transport layer sessions comprises at least one transport layer session using a transport layer protocol selected from TCP, UDP, ATP, CUDP, DCCP, FCP, IL, MPTCP, RDP, RUDP, SCTP, SPX, and SST. In some embodiments, the communication module transmits audio over at least one transport layer session. In some embodiments, the communication module transmits one or more multi-media messages over at least one transport layer session. In some embodiments, the communication module uses encapsulation to transmit information through at least one transport layer session. In some embodiments, the communication module uses encapsulation to transmit audio through at least one transport layer session. In some embodiments, the communication module receives user metadata over the plurality of transport layer sessions. In further embodiments, the user metadata comprises information selected from user identification, user login, device location, user medical history, or any combination thereof. In some embodiments, the plurality of transport layer sessions comprise a primary transport layer session and one or more secondary transport layer sessions. In further embodiments, the flow transfer module shifts data flow from the primary transport layer session to the one or more secondary transport layer sessions when the flow evaluation module determines that the primary transport layer session fails the one or more performance benchmarks. In further embodiments, the primary transport layer session uses TCP or UDP. In yet further embodiments, the primary transport layer session uses TCP. In yet further embodiments, the primary transport layer session uses UDP. In further embodiments, the one or more secondary transport layer sessions use TCP or UDP. In yet further embodiments, the one or more secondary transport layer sessions use TCP. In yet further embodiments, the one or more secondary transport layer sessions use UDP. In further embodiments, the primary and the one or more secondary transport layer sessions use different transport protocols. In further embodiments, the primary and one or more secondary transport layer sessions use identical transport protocols. In further embodiments, the flow transfer module directs data flow through the primary transport layer session and the one or more secondary transport layer sessions simultaneously when the flow evaluation module determines data redundancy is needed. In yet further embodiments, the flow evaluation module determines data redundancy is needed when the information being transmitted comprises location information of the robust communication device. In yet further embodiments, the flow evaluation module determines data redundancy is needed when data flow over the primary transport layer session is losing data packets beyond a defined threshold. In still yet further embodiments, the defined threshold is 10% data packet loss. In yet further embodiments, the communication module harmonizes data flow received over the primary transport layer session and the one or more secondary transport layer sessions. In still yet further embodiments, harmonizing data flow comprises harmonizing sequence numbers. In still yet further embodiments, harmonizing data flow comprises harmonizing session parameters comprising window size and time-to-live. In some embodiments, the first communication device is dropped from the emergency communication session due to poor signal, device shutdown, user switching devices, running out of batteries, or any combination thereof. In some embodiments, the new communication device obtains authentication by providing user login information identical to user login information for the first communication device, wherein the first and new communication devices are associated with a user account. In some embodiments, the communication module assigns a USIN to the communication session. In further embodiments, the USIN number is stored in a USIN server storing a plurality of USIN, each USIN associated with an active communication session. In further embodiments, the new communication device obtains authentication by providing the USIN assigned to the communication session. In yet further embodiments, first communication device transmits the USIN to the new communication device. In some embodiments, the session management module saves a session state of the communication session. In further embodiments, the session state comprises one or more session parameters for at least one transport layer session of the plurality of transport layer sessions. In yet further embodiments, the one or more session parameters are selected from RTT, time-to-live (TTL) for data packets, re-transmission timeouts, clear channel assessment (CCA) delay, re-transmission counts, jitter buffer length, or any combination thereof. In further embodiments, the session management module transmits the saved session state to the new communication device to enable the communication session to continue with the new communication device using the same session state. In further embodiments, the media further comprises a session transfer module transferring the emergency communication session to a new emergency management system or emergency dispatch center. In yet further embodiments, transferring the emergency communication session comprises transferring the session state. In yet further embodiments, the new emergency management system or emergency dispatch center has jurisdiction over the active communication device based on current location data of the active communication device. In some embodiments, the system sends authentication information needed to authenticate the active communication device to join the communication session. In further embodiments, the authentication information comprises user login information or USIN. In some embodiments, the media further comprises a session-stay-alive (SSA) module modifying one or more session parameters for one or more of the plurality of transport layer sessions to maintain connection with the first or new communication device when data flow is degraded sufficiently to result in disconnection under one or more performance benchmarks corresponding to industry standard acceptable limits. In further embodiments, the one or more session parameters are selected from RTT, time-to-live (TTL) for data packets, re-transmission timeouts, clear channel assessment (CCA) delay, re-transmission counts, jitter buffer length, or any combination thereof. In further embodiments, the SSA module modifies the one or more session parameters prior to establishing the communication session. In yet further embodiments, the SSA module uses session parameters from a saved session state associated with the communication session. In further embodiments, the SSA module dynamically modifies the one or more parameters of the communication session during the communication session. In some embodiments, the plurality of transport layer sessions comprises a plurality of TCP transport layer sessions, wherein each of the plurality of TCP transport layer sessions uses a different routing path between the communication device and the EMS. In some embodiments, the plurality of transport layer sessions comprises a plurality of UDP transport layer sessions, wherein each of the plurality of UDP transport layer sessions uses a different routing path between the communication device and the EMS.

In another aspect, provided herein is a method for managing emergency communications using an emergency management system comprising at least one processor, a memory, a network element, and instructions executable by the at least one processor to create a server application for managing emergency communications, the method comprising: (a) providing, by the system, a communication module establishing an emergency communication session at an application layer with a first communication device upon receiving an user emergency request from the first device, the communication session comprising a plurality of transport layer sessions simultaneously connected to the first device; (b) providing, by the system, a flow evaluation module evaluating data flow transmitted over each of the plurality of transport layer sessions against one or more performance benchmarks; (c) providing, by the system, a flow transfer module dynamically transferring data flow from any transport layer session failing the one or more performance benchmarks to another transport layer session of the plurality of transport layer sessions during the communication session; (d) providing, by the system, a device management module associating a new communication device with the communication session when provided with authentication to join the communication session and detecting when the first communication device is dropped from the communication session; and (e) providing, by the system, a session management module maintaining the emergency communication session when the first communication device is dropped by relocating data flow to the new communication device, wherein the communication session at the application layer continues with the new communication device replacing the dropped first communication device. In some embodiments, the one or more performance benchmarks are selected from responsiveness, quality, reliability, or any combination thereof. In further embodiments, the one or more performance benchmarks are determined using one or more factors selected from session time-outs, ACK failures, retransmission time-outs, out-of-sequence packets, excessive jitter between consecutive packet reception, CRC or checksum failures, frame errors, bit errors, SNR fluctuations, or any combination thereof. In some embodiments, the plurality of transport layer sessions comprises at least one TCP transport layer session. In some embodiments, the plurality of transport layer sessions comprises at least one UDP transport layer session. In some embodiments, the plurality of transport layer sessions comprises at least one transport layer session using a transport layer protocol selected from TCP, UDP, ATP, CUDP, DCCP, FCP, IL, MPTCP, RDP, RUDP, SCTP, SPX, and SST. In some embodiments, the communication module transmits audio over at least one transport layer session. In some embodiments, the communication module transmits one or more multi-media messages over at least one transport layer session. In some embodiments, the communication module uses encapsulation to transmit information through at least one transport layer session. In some embodiments, the communication module uses encapsulation to transmit audio through at least one transport layer session. In some embodiments, the communication module receives user metadata over the plurality of transport layer sessions. In further embodiments, the user metadata comprises information selected from user identification, user login, device location, user medical history, or any combination thereof. In some embodiments, the plurality of transport layer sessions comprise a primary transport layer session and one or more secondary transport layer sessions. In further embodiments, the flow transfer module shifts data flow from the primary transport layer session to the one or more secondary transport layer sessions when the flow evaluation module determines that the primary transport layer session fails the one or more performance benchmarks. In further embodiments, the primary transport layer session uses TCP or UDP. In yet further embodiments, the primary transport layer session uses TCP. In yet further embodiments, the primary transport layer session uses UDP. In further embodiments, the one or more secondary transport layer sessions use TCP or UDP. In yet further embodiments, the one or more secondary transport layer sessions use TCP. In yet further embodiments, the one or more secondary transport layer sessions use UDP. In further embodiments, the primary and the one or more secondary transport layer sessions use different transport protocols. In further embodiments, the primary and one or more secondary transport layer sessions use identical transport protocols. In further embodiments, the flow transfer module directs data flow through the primary transport layer session and the one or more secondary transport layer sessions simultaneously when the flow evaluation module determines data redundancy is needed. In yet further embodiments, the flow evaluation module determines data redundancy is needed when the information being transmitted comprises location information of the robust communication device. In yet further embodiments, the flow evaluation module determines data redundancy is needed when data flow over the primary transport layer session is losing data packets beyond a defined threshold. In still yet further embodiments, the defined threshold is 10% data packet loss. In yet further embodiments, the communication module harmonizes data flow received over the primary transport layer session and the one or more secondary transport layer sessions. In still yet further embodiments, harmonizing data flow comprises harmonizing sequence numbers. In still yet further embodiments, harmonizing data flow comprises harmonizing session parameters comprising window size and time-to-live. In some embodiments, the first communication device is dropped from the emergency communication session due to poor signal, device shutdown, user switching devices, running out of batteries, or any combination thereof. In some embodiments, the new communication device obtains authentication by providing user login information identical to user login information for the first communication device, wherein the first and new communication devices are associated with a user account. In some embodiments, the communication module assigns a USIN to the communication session. In further embodiments, the USIN number is stored in a USIN server storing a plurality of USIN, each USIN associated with an active communication session. In further embodiments, the new communication device obtains authentication by providing the USIN assigned to the communication session. In yet further embodiments, first communication device transmits the USIN to the new communication device. In some embodiments, the session management module saves a session state of the communication session. In further embodiments, the session state comprises one or more session parameters for at least one transport layer session of the plurality of transport layer sessions. In yet further embodiments, the one or more session parameters are selected from RTT, time-to-live (TTL) for data packets, re-transmission timeouts, clear channel assessment (CCA) delay, re-transmission counts, jitter buffer length, or any combination thereof. In further embodiments, the session management module transmits the saved session state to the new communication device to enable the communication session to continue with the new communication device using the same session state. In further embodiments, the method further comprises providing, by the system, a session transfer module transferring the emergency communication session to a new emergency management system or emergency dispatch center. In yet further embodiments, transferring the emergency communication session comprises transferring the session state. In yet further embodiments, the new emergency management system or emergency dispatch center has jurisdiction over the active communication device based on current location data of the active communication device. In some embodiments, the system sends authentication information needed to authenticate the active communication device to join the communication session. In further embodiments, the authentication information comprises user login information or USIN. In some embodiments, the method further comprises providing, by the system, a session-stay-alive (SSA) module modifying one or more session parameters for one or more of the plurality of transport layer sessions to maintain connection with the first or new communication device when data flow is degraded sufficiently to result in disconnection under one or more performance benchmarks corresponding to industry standard acceptable limits. In further embodiments, the one or more session parameters are selected from RTT, time-to-live (TTL) for data packets, re-transmission timeouts, clear channel assessment (CCA) delay, re-transmission counts, jitter buffer length, or any combination thereof. In further embodiments, the SSA module modifies the one or more session parameters prior to establishing the communication session. In yet further embodiments, the SSA module uses session parameters from a saved session state associated with the communication session. In further embodiments, the SSA module dynamically modifies the one or more parameters of the communication session during the communication session. In some embodiments, the plurality of transport layer sessions comprises a plurality of TCP transport layer sessions, wherein each of the plurality of TCP transport layer sessions uses a different routing path between the communication device and the EMS. In some embodiments, the plurality of transport layer sessions comprises a plurality of UDP transport layer sessions, wherein each of the plurality of UDP transport layer sessions uses a different routing path between the communication device and the EMS.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
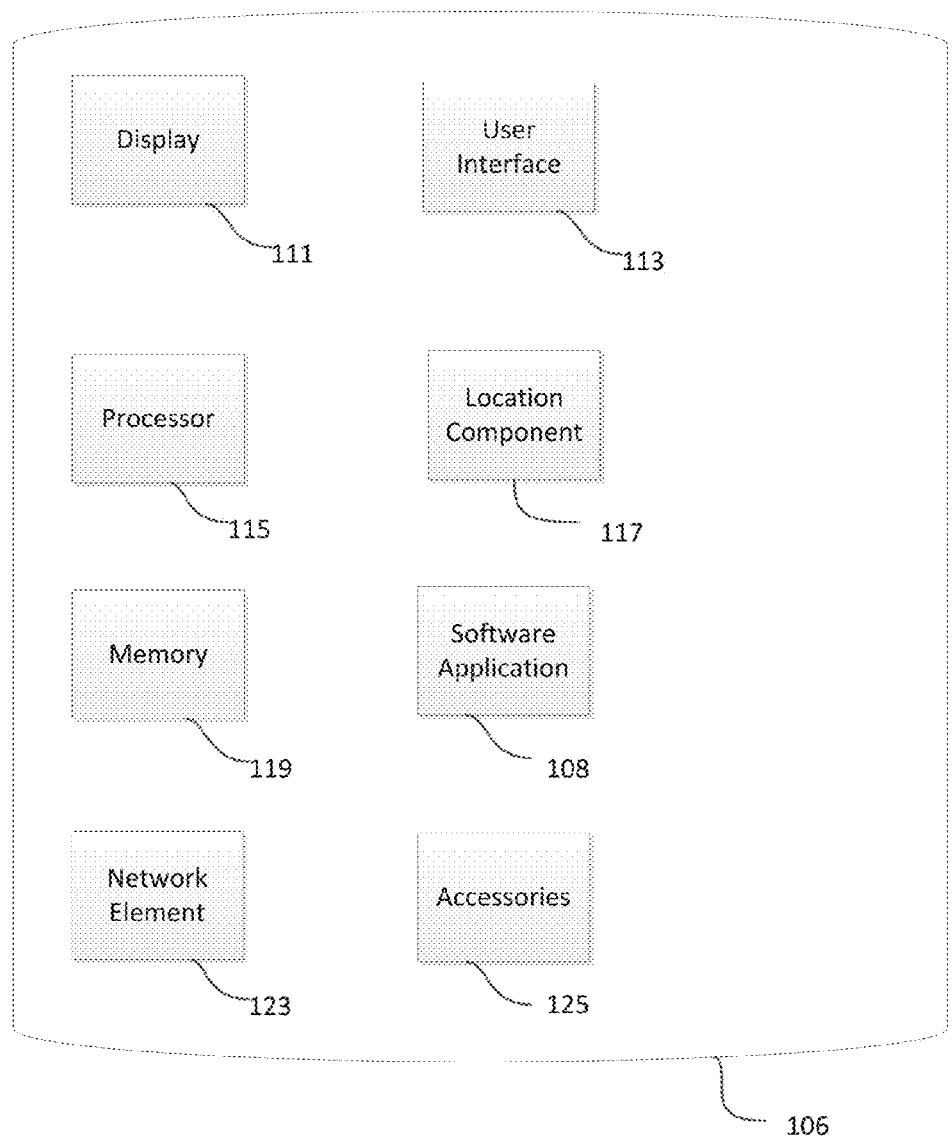
FIG. 1A is a schematic diagram of one embodiment of a device comprising hardware components and a software application.

Data communication channels are increasingly used in VoIP communications by allowing users to communicate via their cellular phones using packet switched networks instead of circuit switched networks. In some embodiments, the systems, devices, methods, and media enable users to effectively use a multitude of transport layer sessions, each session representing an end-to-end data channel between two communication devices, to establish a robust communication session with an EMS or EDC. In some embodiments, the systems, devices, methods, and media described herein provide for an ability to switch from a first transport layer session to another in case the first transport layer session becomes unresponsive to transmitting VoIP packets for purpose of completing the emergency call.

Described herein, in some embodiments, are communication devices comprising at least one processor, a memory, a network element, and a computer program including instructions executable by the at least one processor to create a software application for managing emergency communications comprising: (a) a communication module establishing a communication session at an application layer with an end device or system, the communication session comprising a plurality of transport layer sessions simultaneously connected to the end device or system; (b) a flow evaluation module evaluating data flow transmitted over each of the plurality of transport layer sessions against one or more performance benchmarks; and (c) a flow transfer module dynamically transferring data flow from any transport layer session failing the one or more performance benchmarks to another transport layer session of the plurality of transport layer sessions during the communication session.

Also described herein, in some embodiments, are communication devices comprising at least one processor, a memory, a network element, and a computer program including instructions executable by the at least one processor to create a software application for managing emergency communications comprising: (a) a communication module establishing a communication session with an emergency management system (EMS) or emergency dispatch center (EDC), the communication session comprising a plurality of transport layer sessions simultaneously connected to the or EDC; (b) a flow evaluation module evaluating data flow transmitted over each of the plurality of transport layer sessions against one or more performance benchmarks; and (c) a flow transfer module dynamically transferring data flow from any transport layer session failing the one or more performance benchmarks to another transport layer session of the plurality of transport layer sessions during the communication session.

Also described herein, in some embodiments, are non-transitory computer-readable storage media encoded with a computer program including instructions executable by at least one processor to create an application for managing emergency communications, the application comprising: (a) a communication module establishing a communication session with an emergency management system (EMS) or emergency dispatch center (EDC), the communication session comprising a plurality of transport layer sessions simultaneously connected to the or EDC; (b) a flow evaluation module evaluating data flow transmitted over each of the plurality of transport layer sessions against one or more performance benchmarks; and (c) a flow transfer module dynamically transferring data flow from any transport layer session failing the one or more performance benchmarks to another transport layer session of the plurality of transport layer sessions during the communication session.

Also described herein, in some embodiments, are methods for managing emergency communications using a communication device comprising at least one processor, a memory, a network element, and instructions executable by the at least one processor to create an application for managing emergency communications, the method comprising: (a) providing, by the device, a communication module establishing a communication session with an emergency management system (EMS) or emergency dispatch center (EDC), the communication session comprising a plurality of transport layer sessions simultaneously connected to the or EDC; (b) providing, by the device, a flow evaluation module evaluating data flow transmitted over each of the plurality of transport layer sessions against one or more performance benchmarks; and (c) providing, by the device, a flow transfer module dynamically transferring data flow from any transport layer session failing the one or more performance benchmarks to another transport layer session of the plurality of transport layer sessions during the communication session.

Also described herein, in some embodiments, are emergency management systems comprising at least one processor, a memory, a network element, and a computer program including instructions executable by the at least one processor to create a server software application for managing emergency communication sessions comprising: (a) a communication module establishing an emergency communication session at an application layer with a first communication device upon receiving an user emergency request from the first device, the communication session comprising a plurality of transport layer sessions simultaneously connected to the first device; (b) a flow evaluation module evaluating data flow transmitted over each of the plurality of transport layer sessions against one or more performance benchmarks; (c) a flow transfer module dynamically transferring data flow from any transport layer session failing the one or more performance benchmarks to another transport layer session of the plurality of transport layer sessions during the communication session; (d) a device management module associating a new communication device with the communication session when provided with authentication to join the communication session and detecting when the first communication device is dropped from the communication session; and (e) a session management module maintaining the emergency communication session when the first communication device is dropped by relocating data flow to the new communication device, wherein the communication session at the application layer continues with the new communication device replacing the dropped first communication device.

Also described herein, in some embodiments, are non-transitory computer-readable storage media encoded with a computer program including instructions executable by at least one processor to create a server application for managing emergency communications, the application comprising: (a) a communication module establishing an emergency communication session at an application layer with a first communication device upon receiving an user emergency request from the first device, the communication session comprising a plurality of transport layer sessions simultaneously connected to the first device; (b) a flow evaluation module evaluating data flow transmitted over each of the plurality of transport layer sessions against one or more performance benchmarks; (c) a flow transfer module dynamically transferring data flow from any transport layer session failing the one or more performance benchmarks to another transport layer session of the plurality of transport layer sessions during the communication session; (d) a device management module associating a new communication device with the communication session when provided with authentication to join the communication session and detecting when the first communication device is dropped from the communication session; and (e) a session management module maintaining the emergency communication session when the first communication device is dropped by relocating data flow to the new communication device, wherein the communication session at the application layer continues with the new communication device replacing the dropped first communication device.

Also described herein, in some embodiments, are methods for managing emergency communications using an emergency management system comprising at least one processor, a memory, a network element, and instructions executable by the at least one processor to create a server application for managing emergency communications, the method comprising: (a) providing, by the system, a communication module establishing an emergency communication session at an application layer with a first communication device upon receiving an user emergency request from the first device, the communication session comprising a plurality of transport layer sessions simultaneously connected to the first device; (b) providing, by the system, a flow evaluation module evaluating data flow transmitted over each of the plurality of transport layer sessions against one or more performance benchmarks; (c) providing, by the system, a flow transfer module dynamically transferring data flow from any transport layer session failing the one or more performance benchmarks to another transport layer session of the plurality of transport layer sessions during the communication session; (d) providing, by the system, a device management module associating a new communication device with the communication session when provided with authentication to join the communication session and detecting when the first communication device is dropped from the communication session; and (e) providing, by the system, a session management module maintaining the emergency communication session when the first communication device is dropped by relocating data flow to the new communication device, wherein the communication session at the application layer continues with the new communication device replacing the dropped first communication device.

Also described herein, in some embodiments, are emergency management systems comprising at least one processor, a memory, a network element, and a computer program including instructions executable by the at least one processor to create a server software application for managing emergency communication sessions comprising: (a) a communication module establishing an emergency communication session at an application layer with a first communication device upon receiving an user emergency request from the first device, the communication session comprising a plurality of transport layer sessions simultaneously connected to the first device; (b) a flow evaluation module evaluating data flow transmitted over each of the plurality of transport layer sessions against one or more performance benchmarks; and (c) a flow transfer module dynamically transferring data flow from any transport layer session failing the one or more performance benchmarks to another transport layer session of the plurality of transport layer sessions during the communication session. In further embodiments, the system comprises a device management module associating a new communication device with the communication session when provided with authentication to join the communication session and detecting when the first communication device is dropped from the communication session. In yet further embodiments, the system comprises a session management module maintaining the emergency communication session when the first communication device is dropped by relocating data flow to the new communication device, wherein the communication session at the application layer continues with the new communication device replacing the dropped first communication device.

Also described herein, in some embodiments, are non-transitory computer-readable storage media encoded with a computer program including instructions executable by at least one processor to create a server application for managing emergency communications, the application comprising: (a) a communication module establishing an emergency communication session at an application layer with a first communication device upon receiving an user emergency request from the first device, the communication session comprising a plurality of transport layer sessions simultaneously connected to the first device; (b) a flow evaluation module evaluating data flow transmitted over each of the plurality of transport layer sessions against one or more performance benchmarks; and (c) a flow transfer module dynamically transferring data flow from any transport layer session failing the one or more performance benchmarks to another transport layer session of the plurality of transport layer sessions during the communication session. In further embodiments, the media comprises a device management module associating a new communication device with the communication session when provided with authentication to join the communication session and detecting when the first communication device is dropped from the communication session. In yet further embodiments, the system comprises a session management module maintaining the emergency communication session when the first communication device is dropped by relocating data flow to the new communication device, wherein the communication session at the application layer continues with the new communication device replacing the dropped first communication device.

Also described herein, in some embodiments, are methods for managing emergency communications using an emergency management system comprising at least one processor, a memory, a network element, and instructions executable by the at least one processor to create a server application for managing emergency communications, the method comprising: (a) providing, by the system, a communication module establishing an emergency communication session at an application layer with a first communication device upon receiving an user emergency request from the first device, the communication session comprising a plurality of transport layer sessions simultaneously connected to the first device; (b) providing, by the system, a flow evaluation module evaluating data flow transmitted over each of the plurality of transport layer sessions against one or more performance benchmarks; and (c) providing, by the system, a flow transfer module dynamically transferring data flow from any transport layer session failing the one or more performance benchmarks to another transport layer session of the plurality of transport layer sessions during the communication session. In further embodiments, the methods comprise providing, by the system, a device management module associating a new communication device with the communication session when provided with authentication to join the communication session and detecting when the first communication device is dropped from the communication session. In yet further embodiments, the methods comprise providing, by the system, a session management module maintaining the emergency communication session when the first communication device is dropped by relocating data flow to the new communication device, wherein the communication session at the application layer continues with the new communication device replacing the dropped first communication device.

Also described herein, in some embodiments, are emergency management systems comprising at least one processor, a memory, a network element, and a computer program including instructions executable by the at least one processor to create a server software application for managing emergency communication sessions comprising: (a) a communication module establishing an emergency communication session at an application layer with a first communication device upon receiving an user emergency request from the first device, the communication session comprising a plurality of transport layer sessions simultaneously connected to the first device; (b) a device management module associating a new communication device with the communication session when provided with authentication to join the communication session and detecting when the first communication device is dropped from the communication session; and (c) a session management module maintaining the emergency communication session when the first communication device is dropped by relocating data flow to the new communication device, wherein the communication session at the application layer continues with the new communication device replacing the dropped first communication device.

Also described herein, in some embodiments, are non-transitory computer-readable storage media encoded with a computer program including instructions executable by at least one processor to create a server application for managing emergency communications, the application comprising: (a) a communication module establishing an emergency communication session at an application layer with a first communication device upon receiving an user emergency request from the first device, the communication session comprising a plurality of transport layer sessions simultaneously connected to the first device; (b) a device management module associating a new communication device with the communication session when provided with authentication to join the communication session and detecting when the first communication device is dropped from the communication session; and (c) a session management module maintaining the emergency communication session when the first communication device is dropped by relocating data flow to the new communication device, wherein the communication session at the application layer continues with the new communication device replacing the dropped first communication device.

Also described herein, in some embodiments, are methods for managing emergency communications using an emergency management system comprising at least one processor, a memory, a network element, and instructions executable by the at least one processor to create a server application for managing emergency communications, the method comprising: (a) providing, by the system, a communication module establishing an emergency communication session at an application layer with a first communication device upon receiving an user emergency request from the first device, the communication session comprising a plurality of transport layer sessions simultaneously connected to the first device; (b) providing, by the system, a device management module associating a new communication device with the communication session when provided with authentication to join the communication session and detecting when the first communication device is dropped from the communication session; and (c) providing, by the system, a session management module maintaining the emergency communication session when the first communication device is dropped by relocating data flow to the new communication device, wherein the communication session at the application layer continues with the new communication device replacing the dropped first communication device.

In some embodiments, described herein are emergency management systems comprising at least one processor, a memory, a network element, and a computer program including instructions executable by the at least one processor to create a server software application comprising: (a) an emergency module establishing an emergency communication session with a first communication device upon receiving an user emergency request from the first device, the session comprising a first set of one or more communication channels connected to the first device, wherein the first communication device is an active communication device; (b) a session monitoring module detecting quality of the communication session and whether the first communication device is dropped from the communication session; and (c) a relocation module relocating data flow from the first set of one or more communication channels to a second set of one or more communication channels connected to a second communication device, wherein the communication session continues uninterrupted with the second communication device in place of the dropped communication device as the active communication device. In some embodiments, the systems further comprise a session data module storing session data comprising information transmitted during the emergency communication session.

Also described herein, in certain embodiments, are systems, devices, methods, and media providing a communication session comprising multiple transport layer sessions for reliably maintaining an emergency call in an active state and allowing for bi-directional flow of packets from a calling user communication device to an EMS or EDC server and from EMS or EDC server back to the user communication device, despite poor communication quality for some of the transport layer sessions. In certain embodiments, the systems, devices, methods, and media described herein enable users to utilize communication sessions comprising multiple transport layer sessions to initiate voice and non-voice data sessions for requesting emergency response, including sending and receiving of multi-media messages, confirmation of reception of request for emergency help, status of certain response provided, and conveying metadata relating to the user, for example, location, pre-stored health record and health information, and other relevant information about the user of the user communication device.

Certain Terminologies

As described herein, a "device" is a digital processing device. In some embodiments, a device is a piece of electronic equipment designed with one or more functionalities. In some embodiments, a "communication device" is any device with a communication component (e.g., network element, network component, or any other network or communication component), which allows it to send and receive information over a wireless channel, a wired channel, or a combination thereof. In some embodiments, a communication device makes an emergency call or request over a communication network such as, for example, a cellular network or the Internet. In some embodiments, a communication device sends and receives information over a cellular network or the Internet. In some embodiments, a communication device is a mobile phone, a smart phone, a laptop, a desktop, or a tablet. In some embodiments, a communication device is a wearable device with a communication component. As used herein, "mobile wireless device" refers to devices that are portable. In some embodiments, a user wears or carries the mobile wireless device on his or her person or in a vehicle. Exemplary mobile wireless devices include mobile or cellular phones, wearable devices, etc. In some embodiments, a communication device is a walkie-talkie or a two-way radio.

As described herein, "transmits" or "transmission" refers to sending information (e.g., data) over one or more communication sessions, channels, connections, or transport layer sessions. In some embodiments, transmits or transmission comprises wireless transmission of information. In some embodiments, transmits or transmission comprises wired transmission of information.

As described herein, an "emergency alert" refers to contacting an emergency service over one or more communication channels or links regarding an emergency situation. In some embodiments, an emergency alert comprises an "emergency call" in which a user calls an emergency service. In some embodiments, an emergency alert comprises an "emergency request" which a user requests emergency assistance from an emergency service. In some embodiments, the emergency service is an emergency management system ("EMS"). In some embodiments, the emergency service is an emergency dispatch center ("EDC") or public-safety answering point ("PSAP"). In some embodiments, the emergency service is an EMS that acts as an intermediary between the user caller and an EDC or PSAP, whereby the EMS processes an emergency alert received from the user and forwards the request along with relevant information to the appropriate EDC or PSAP. In some embodiments, an "appropriate" EDC or PSAP is one that is located in the same jurisdiction as the location of the user communication device sending the emergency alert.

As referenced herein, an "Emergency Management System" (EMS) refers to a system that receives and processes emergency alerts from users and forwards them to the appropriate EDC, for example, the EDC for the jurisdiction from which the emergency call or request was made. Various embodiments of the EMS are described in U.S. patent application Ser. No. 14/856,818, and incorporated herein by reference. In some embodiments, an EMS is a server (e.g., an EMS server). In other embodiments, an EMS comprises a plurality of servers. In further embodiments, the plurality of servers is geographically distributed, wherein each server is assigned to a geographic jurisdiction. In yet further embodiments, each server is assigned to a geographic jurisdiction matching the jurisdiction of an EDC, wherein an EMS server is associated with an EDC for all emergency communications within that jurisdiction. The "Emergency Dispatch Center" (EDC) refers to the entity that receives the emergency alert and coordinates the emergency assistance. In some embodiments, the EDC is a public organization run by the municipality, county or city. In other embodiments, the EDC is a private organization. In some embodiments, emergency assistance is selected from medical, caregivers, firefighting, police, military, paramilitary, border patrol, lifeguard, security services, or any combination thereof. A "public-safety answering point" (PSAP) refers to a call center that answers calls to emergency numbers for police, firefighting, ambulance services, etc.

As used herein, "user data" refers to information or data obtained from one or more communication devices. In some embodiments, user data comprises one or more information selected from emergency alert indication, location information, GPS coordinates, user identity, user health history, messages, videos, photos, audio messages, or any combination thereof. In some embodiments, an EMS or EDC stores user data obtained from one or more communication devices, wherein the user data is associated with an emergency communication session.

As used herein, "alternate" and "secondary" transport layer sessions are synonymous and used interchangeably.

In some embodiments, the methods for providing a robust communication session are implemented on the device side (e.g., communication device like a cell phone). However, because modifying the transport layer of a communication session can be difficult due to the need to obtain access to the operating system, it may be easier to implement the methods for providing a robust communication session on the system or server side (e.g., EDC, EDC server, EMS or EMS server). Accordingly, in some embodiments, the methods for providing a robust communication session are implemented on the system side. Accordingly, software modules providing robust communication operate on the same principles as described herein, and they are distinguished between the device side and the system side by appending "device" or "system" before the module name. For example, a communication module implemented on the device side is also referred to as a "device communication module," while a communication module implemented on the system side is also referred to as an "system communication module." When a module is referenced in the context of a device, then it refers to a "device" module. For example, if one embodiment comprises a device comprising a communication module, then the communication module is a "device communication module." When a module is referenced in the context of a system, then it refers to a "system" module. For example, if one embodiment comprises an EMS or EMS server comprising a communication module, then the communication module is a "system communication module" or an "EMS communication module." As used herein, a system module within an EMS is referred to as an EMS module. Thus, any EMS software module can be called an "EMS" module. For example, a system communication module inside of an EMS application can be called an EMS communication module. In some embodiments, two or more modules and their respective functions are merged. For example, in some embodiments, a device comprises a session management module that also performs the functions of a device management module. In some embodiments, a module and its functions are divided into two or more modules.

Existing filings, for example, U.S. patent application Ser. No. 14/856,818, titled "METHOD AND SYSTEM FOR EMERGENCY CALL MANAGEMENT," filed on Sep. 17, 2015 and incorporated herein by reference, take advantage of Voice over Internet Protocol (VoIP) technology to make emergency calls, including multi-media messaging, from communication devices such as cellular phones to EDCs.

Communication Module

The communication module establishes a communication session between end-to-end devices, systems, or a combination thereof. In some embodiments, a device or device application comprises a device communication module. In some embodiments, a system or system server or server application comprises a system (e.g., EMS) communication module. For example, in some embodiments, a device communication module establishes a communication session between a user communication device and an EMS or EDC. In some embodiments, a communication module comprises a communication session comprising one or more communication channels. In some embodiments, a communication module is a device communication module, wherein the module is part of an application or software installed and/or running on a device. In some embodiments, a communication module is a system communication module, wherein the module is part of an application or software installed and/or running on a server (e.g., EMS or EDC server). However, both device and system communication modules carry out functions according to the same principles described herein for communication modules in general, for example, generating a communication session with an end device or system, the session comprising a plurality of transport layer sessions. In some embodiments, a transport layer session uses a protocol selected from TCP, UDP, ATP, CUDP, DCCP, FCP, IL, MPTCP, RDP, RUDP, SCTP, SPX, and SST. In some embodiments, a transport layer session is a TCP, UDP, ATP, CUDP, DCCP, FCP, IL, MPTCP, RDP, RUDP, SCTP, SPX, or SST transport layer session. In some embodiments, a communication session comprises one or more transport layer sessions using a protocol selected from TCP, UDP, ATP, CUDP, DCCP, FCP, IL, MPTCP, RDP, RUDP, SCTP, SPX, and SST. In some embodiments, the communication session is an emergency communication session initiated after a user communication device sends an emergency alert or request to an EMS or EDC. In some embodiments, the communication session comprises a plurality of transport layer sessions. In further embodiments, the plurality of transport layer sessions is simultaneously connected to an end device or system. As used herein, being simultaneously connected does not require active data flow between end devices and/or systems. In some embodiments, being simultaneously connected comprises opening a socket connection between a client (e.g., device) and a server (e.g., EMS or EMS server). In some embodiments, the communication module transmits data packets over one or more transport layer sessions. In some embodiments, the communication module transmits audio, multi-media message, video, photo, GPS coordinates, location information, user information, user health information, emergency indication, or any combination thereof. In some embodiments, the communication module transmits one or more multi-media messages over one or more transport layer sessions. In some embodiments, the communication module transmits video over one or more transport layer sessions. In some embodiments, the communication module transmits one or more photos over one or more transport layer sessions. In some embodiments, the communication module transmits data or metadata over one or more transport layer sessions. In further embodiments, the data or metadata comprises GPS coordinates, location information, user information, user health information, emergency indication, or any combination thereof.

In some embodiments, the communication module uses encapsulation to transmit information through one or more transport layer sessions. Encapsulation enables a device to convert information into a data format and transmit it over a data socket connection (e.g., a transport layer session). One reason encapsulation is useful because it enables the transmission of audio (e.g., voice) over an IP-based data channel (e.g., VoIP) rather than over a cellular network. The use of such data channels to transmit and receive information such as audio provides many advantages as described herein.

In some embodiments, a communication session comprises one or more secondary transport layer sessions. In further embodiments, the one or more secondary transport layer sessions are backup or redundant transport layer sessions for a primary transport layer session. For example, in some embodiments, a communication module switches data flow from a primary transport layer session to one or more secondary transport layer sessions when the primary transport layer session fails one or more performance benchmarks. In some embodiments, a communication session comprises a primary transport layer session. In further embodiments, the primary transport layer session is a transport layer session that is actively sending and/or receiving data.

In some embodiments, the communication module harmonizes data flow received over redundant transport layer sessions. Redundant transport layer sessions refer to transport layer sessions that send and/or receive the same information or data. In some embodiments, redundant transport layer sessions are used when there is no single transport layer session that is able to send and/or receive data of sufficiently high quality. Quality is determined using one or more performance benchmarks. For example, in one embodiment, a transport layer session is unable to send data of sufficiently high quality if at least 10% of data packets are lost in the first transmission attempt. In an exemplar embodiment, redundant transport layer sessions comprise TCP transport layer sessions. When redundant TCP transport layer sessions send the same information (e.g., a photo), the information is broken up into segments with certain session parameter values (e.g., window size, number of retries, packet or segment size, TTL, time-out, etc.).

When a segment or packet sent to an end device or system does not result in an acknowledgement (ACK) within a set time window (e.g., a time-out of 100 milliseconds), a standard TCP setting is to re-transmit the segment or packet. However, when multiple redundant TCP transport layer sessions are sending the same set of segments in sequence, then depending on latency, lost packets, and other factors influencing connection quality, some transport layer sessions will get an ACK while others do not. As an illustrative example of one particular embodiment, a communication session comprises two redundant TCP transport layer sessions, session 1 and session 2. The two sessions are being used to send segments 1001, 1002, and 1003 for an SMS message. The TCP session 1 sends segment 1001 and receives an ACK from the end device or system for segment/sequence 1001, indicating the end device/system has received the information. TCP session 1 then proceeds to send segment 1002 and receives an ACK for this as well. Meanwhile, TCP session 2 has failed to get an ACK for segment 1001, indicating the packet was not received. The communication module harmonizes the two TCP sessions, in this example, by updating TCP session 2 to instead send segment 1003 because segments 1001 and 1002 have already been received by the end device or system. Normally, a TCP transport layer session must send segments/sequences in order and will not proceed without receiving an ACK from an end device or system. However, when redundant TCP transport layer sessions are provided, this session parameter or requirement is not needed to guarantee reliability of data transmission. Thus, the systems, methods, devices, and media described herein both provide a solution for robust communication via the use of multiple transport layer sessions for a communication session and mitigate data congestion by harmonizing data flow amongst the multiple transport layer sessions.

In some embodiments, each of the multiple transport layer sessions utilizes a different routing path from the other transport layer sessions. This results in diversity of routing paths amongst the transport layer sessions and enhances the likelihood that one of the transport layer sessions will have a higher quality data flow. For example, if there is a router that is experiencing heavy traffic congestion, then transport layer sessions that go through this router will experience a deterioration of communication quality, but a transport layer session that utilizes a different routing path bypassing this router will avoid the congestion and is likely to have better communication quality than the other transport layer sessions. In some embodiments, a transport layer session comprises a data flow from a communication device to an EMS or EDC that takes a different route than a data flow from the EMS or EDC to the communication device. In other embodiments, a transport layer session comprises a data flow from a communication device to an EMS or EDC that takes the same route as a data flow from the EMS or EDC to the communication device.

Flow Evaluation Module

The flow evaluation module monitors data flow (e.g., data packets, segments, or bytes sent between devices and/or systems). In some embodiments, a device or device application comprises a device flow evaluation module. In some embodiments, a system or system server or server application comprises a system (e.g., EMS) flow evaluation module. In some embodiments, the flow evaluation module evaluates data flow against one or more performance benchmarks. In some embodiments, performance benchmarks comprise threshold requirements for responsiveness, quality, reliability or any combination thereof for data flow. In further embodiments, the threshold requirements are applied to performance factors such as session time-outs, ACK failures, retransmission time-outs, out-of-sequence packets, excessive jitter between consecutive packet reception, CRC or checksum failures, frame errors, bit errors, signal-to-noise (SNR) fluctuations, or any combination thereof. In some embodiments, a flow evaluation channel detects communication session quality and whether a communication device is dropped or disconnected from a communication session.

In some embodiments, a performance benchmark comprises a threshold percentage for a performance factor, wherein any value that exceeds the threshold percentage fails the performance benchmark. For example, given a performance benchmark comprising a checksum failure threshold of 10%, a checksum failure in excess of 10% of data packets or segments constitutes a failed performance benchmark. In various embodiments, a performance benchmark comprises a checksum failure threshold of about 1%, 2%, 3%, 4%, 5%, 6%, 7%, 8%, 9%, 10%, 15%, 20%, 25%, 30%, 35%, 40%, 45%, or 50%, including increments therein, for at least 100, 200, 300, 400, 500, 600, 700, 800, 900, 1000, 2000, 3000, 4000, 5000, 6000, 7000, 8000, 9000, or 10000 or more segments or packets, including increments therein. In various embodiments, a performance benchmark comprises a checksum failure threshold rate of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 or more checksum failures for at least 100, 200, 300, 400, 500, 600, 700, 800, 900, 1000, 2000, 3000, 4000, 5000, 6000, 7000, 8000, 9000, or 10000 or more segments or packets, including increments therein. In various embodiments, a performance benchmark comprises a frame error threshold of about 1%, 2%, 3%, 4%, 5%, 6%, 7%, 8%, 9%, 10%, 15%, 20%, 25%, 30%, 35%, 40%, 45%, or 50%, including increments therein, for at least 100, 200, 300, 400, 500, 600, 700, 800, 900, 1000, 2000, 3000, 4000, 5000, 6000, 7000, 8000, 9000, or 10000 or more segments or packets, including increments therein. In various embodiments, a performance benchmark comprises a frame error threshold rate of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 or more frame errors for at least 100, 200, 300, 400, 500, 600, 700, 800, 900, 1000, 2000, 3000, 4000, 5000, 6000, 7000, 8000, 9000, or 10000 or more segments or packets including increments therein. In various embodiments, a performance benchmark comprises a bit error threshold of about 1%, 2%, 3%, 4%, 5%, 6%, 7%, 8%, 9%, 10%, 15%, 20%, 25%, 30%, 35%, 40%, 45%, or 50%, including increments therein, for at least 100, 200, 300, 400, 500, 600, 700, 800, 900, 1000, 2000, 3000, 4000, 5000, 6000, 7000, 8000, 9000, or 10000 or more segments or packets, including increments therein. In various embodiments, a performance benchmark comprises a bit error threshold rate of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 or more bit errors for at least 100, 200, 300, 400, 500, 600, 700, 800, 900, 1000, 2000, 3000, 4000, 5000, 6000, 7000, 8000, 9000, or 10000 or more segments or packets, including increments therein. In various embodiments, a performance benchmark comprises an ACK failure threshold of about 1%, 2%, 3%, 4%, 5%, 6%, 7%, 8%, 9%, 10%, 15%, 20%, 25%, 30%, 35%, 40%, 45%, or 50%, including increments therein, for at least 100, 200, 300, 400, 500, 600, 700, 800, 900, 1000, 2000, 3000, 4000, 5000, 6000, 7000, 8000, 9000, or 10000 or more segments or packets, including increments therein. In various embodiments, a performance benchmark comprises an ACK failure threshold rate of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 or more ACK failures for at least 100, 200, 300, 400, 500, 600, 700, 800, 900, 1000, 2000, 3000, 4000, 5000, 6000, 7000, 8000, 9000, or 10000 or more segments or packets, including increments therein. In various embodiments, a performance benchmark comprises a retransmission timeout threshold of about 1%, 2%, 3%, 4%, 5%, 6%, 7%, 8%, 9%, 10%, 15%, 20%, 25%, 30%, 35%, 40%, 45%, or 50%, including increments therein, for at least 100, 200, 300, 400, 500, 600, 700, 800, 900, 1000, 2000, 3000, 4000, 5000, 6000, 7000, 8000, 9000, or 10000 or more segments or packets, including increments therein. In various embodiments, a performance benchmark comprises a retransmission timeout threshold rate of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 or more retransmission timeouts for at least 100, 200, 300, 400, 500, 600, 700, 800, 900, 1000, 2000, 3000, 4000, 5000, 6000, 7000, 8000, 9000, or 10000 or more segments or packets, including increments therein.

In a particular embodiment, a performance benchmark for a TCP transport layer session comprises a retransmission time-out (RTO) threshold of 5 timeouts. This means that if a packet or segment sent using the TCP transport layer session does not get an acknowledgement (ACK) response after 5 attempts, then the transport has failed the performance benchmark. In some embodiments, an RTO for a packet or segment comprises a timer or wait time during which the transport layer session waits to receive an acknowledgement after sending the packet or segment. In various embodiments, the timer or wait time is no more than 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 seconds. In various embodiments, the timer or wait time is about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 seconds. Once the timer lapses without the transport layer session receiving an acknowledgement, then that packet or segment is determined to have experienced a timeout. In some embodiments, the transport layer session then re-transmits the timed out packet or segment. In various embodiments, a transport layer session fails a retransmission timeout performance benchmark when it has exceeded a retransmission time-out threshold of at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 or more retransmission time-outs. In various embodiments, a transport layer session fails a retransmission timeout performance benchmark when it has exceeded a retransmission time-out threshold of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99 or 100 or more retransmission time-outs for at least 100, 200, 300, 400, 500, 600, 700, 800, 900, 1000, 2000, 3000, 4000, 5000, 6000, 7000, 8000, 9000, or 10000 or more segments or packets, including increments therein. In various embodiments, a performance benchmark comprises an retransmission time-out threshold of about 1%, 2%, 3%, 4%, 5%, 6%, 7%, 8%, 9%, 10%, 15%, 20%, 25%, 30%, 35%, 40%, 45%, or 50%, including increments therein, for at least 100, 200, 300, 400, 500, 600, 700, 800, 900, 1000, 2000, 3000, 4000, 5000, 6000, 7000, 8000, 9000, or 10000 or more segments or packets, including increments therein. In some embodiments, performance benchmarks are defined according to industry standards. In a particular embodiment, a retransmission timeout threshold defined according to industry standards comprises a threshold of about 5.

In some embodiments, performance benchmarks are defined on the device side (e.g., defined by the device, by a user of the device, and/or by the media on the device). In some embodiments, performance benchmarks are defined on the system side (e.g., defined by the EMS, by an EMS server, by server application on the EMS/EMS server, and/or by the EDC). In some embodiments, performance benchmarks are defined by a user of the device. In some embodiments, the flow evaluation module evaluates data flow continuously. In other embodiments, the flow evaluation module evaluates data flow periodically.

In some embodiments, the flow evaluation module determines whether data redundancy is needed. In further embodiments, the flow evaluation module determines data redundancy is needed when data flow over a transport layer session fails one or more performance benchmarks (as described above). For example, in one particular embodiment, the flow evaluation module determines data redundancy is needed when data flow over a transport layer session (e.g., a TCP transport layer session) comprises retransmission time-outs of over 10% for at least about 1000 data segments/sequences. In some embodiments, the flow evaluation module determines data redundancy is needed when the information being transmitted comprises important information. In some embodiments, important information comprises location information (e.g., GPS coordinates of a user communication device requesting emergency assistance), user identity, health information (e.g., user health history), emergency indication (e.g., the type of emergency indicated in the emergency request sent from the user communication device to an EMS), or any combination thereof. Location information is especially important because an error, for example, in GPS coordinates is likely to have a large impact on the geographical location to which emergency response personnel are sent, which would delay help or rescue.

Flow Transfer Module

A flow transfer module transfers data flow between transport layer sessions. In some embodiments, a flow transfer module dynamically transfers data flow between transport layer sessions. As used herein, dynamically transferring data flow comprises transferring data flow during a communication session. In some embodiments, a device or device application comprises a device flow transfer module. In some embodiments, a system or system server or server application comprises a system (e.g., EMS) flow transfer module. In some embodiments, a flow transfer module transfers data flow from any transport layer session failing one or more performance benchmarks to another transport layer session. In some embodiments, a flow transfer module transfers data flow from any transport layer session failing one or more performance benchmarks to another transport layer session that is not failing the one or more performance benchmarks. In other embodiments, a flow transfer module transfers data flow from any transport layer session failing one or more performance benchmarks to another transport layer session that has superior performance according to the one or more performance benchmarks. For example, in one particular embodiment, a flow transfer module transfers data flow from a first transport layer session failing one or more performance benchmarks to a second transport layer session that is also failing the one or more performance benchmarks but is still performing better than the first transport layer session according to the one or more performance benchmarks. In yet other embodiments, a flow transfer module transfers data flow from a transport layer session to another transport layer session that is performing better according to the one or more performance benchmarks, wherein neither transport layer session is failing the one or more performance benchmarks. In some embodiments, a flow transfer module transfers data flow from a transport layer session to another transport layer session that is performing better by a certain margin according to one or more performance benchmarks. For example, in a particular embodiment, a flow transfer module transfers data flow from a transport layer session with about 10% ACK failures for 1000 data segments/sequences to another transport layer session with about 5% ACK failures for 1000 data segments/sequences because the 5% difference in ACK failures exceeds a predefined 3% margin.

In some embodiments, a flow transfer module directs data flow through two or more redundant transport layer sessions when the flow evaluation module determines data redundancy is needed. In further embodiments, the flow evaluation module determines data redundancy is needed when data flow over the primary transport layer session is losing data packets beyond a defined threshold. In some embodiments, losing data packets comprises timeout, packet loss, retransmission timeout, session timeout, ACK failure, or any combination thereof. In some embodiments, a flow transfer module directs data flow through a primary transport layer session and one or more secondary transport layer sessions simultaneously when the flow evaluation module determines data redundancy is needed. In some embodiments, a flow transfer module directs data flow through at least 2, 3, 4, 5, 6, 7, 8, 9, 10, 11, 12, 13, 14, 15, 16, 17, 18, 19, or 20 or more redundant transport layer sessions simultaneously. In some embodiments, the flow transfer module directs data flow through redundant transport layer sessions using the same transport layer protocol. In some embodiments, the redundant transport layer sessions comprise TCP transport layer sessions. In further embodiments, the redundant transport layer sessions comprise at least 2, 3, 4, 5, 6, 7, 8, 9, 10, 11, 12, 13, 14, 15, 16, 17, 18, 19, or 20 TCP transport layer sessions. In other embodiments, the redundant transport layer sessions comprise UDP transport layer sessions. In further embodiments, the redundant transport layer sessions comprise at least 2, 3, 4, 5, 6, 7, 8, 9, 10, 11, 12, 13, 14, 15, 16, 17, 18, 19, or 20 UDP transport layer sessions. In yet other embodiments, the redundant transport layer sessions comprise different transport layer protocols. In some embodiments, the redundant transport layer sessions comprise a combination of TCP and UDP transport layer sessions. In further embodiments, the redundant transport layer sessions comprise a combination of at least 2, 3, 4, 5, 6, 7, 8, 9, 10, 11, 12, 13, 14, 15, 16, 17, 18, 19, or 20 TCP and UDP transport layer sessions. In the case of redundant transport layer sessions comprising a combination of TCP and USP transport layer sessions, the data segments/sequences sent and/or received over the transport layer sessions are not harmonized.

Session Stay Alive (SSA) Module

A session stay alive (SSA) module modifies one or more session parameters for one or more transport layer sessions to maintain a connection with an end device or system. In some embodiments, a device (e.g., a communication device such as a smart phone) or device application comprises an SSA module. In other embodiments, a system or server (e.g., an EMS or EMS server) or server application comprises an SSA module. The principle remains the same in both cases. Normally, a communication session utilizes a transport layer session such as TCP to send and receive data. When the data quality deteriorates, for example, due to data congestion along the routing network between end devices and/or systems, then the TCP transport layer session may fail certain performance benchmarks. In fact, the TCP transport layer session is disconnected under standard TCP transport layer session parameters once performance drops below a certain threshold. As an example, in one embodiment, an industry standard TCP transport layer session parameter sets the limit for retransmission timeouts at 5 attempts before disconnecting the session. Therefore, when the TCP transport layer session reaches this limit, the session is disconnected, and a user will have to re-establish communications, for example, by calling or initiating a communication session again. The SSA module is able to prolong the communication session through periods of low communication quality (e.g., low or failing performance according to performance benchmarks) by modifying one or more default session parameters to prevent disconnection that would normally occur under standard industry default session parameter settings. For example, in one embodiment, the SSA module modifies the retransmission timeout limit from 5 to 50 for a data segment or packet. As a result, the transport layer session is not disconnected until 50 timeouts are reached.

In some embodiments, one or more session parameters are selected from RTT, time-to-live (TTL) for data packets, retransmission timeouts, clear channel assessment (CCA) delay, retransmission counts, jitter buffer length, or any combination thereof. In some embodiments, the SSA module modifies the session parameter settings such as, for example, such as the limit or threshold at which a transport layer session is disconnected. In some embodiments, the SSA module modifies one or more session parameters before establishing a communication session. For example, if the communication session is an emergency communication (e.g., a user presses an emergency alert or request button on his communication device emergency application), then the information sent and/or received during the communication session will be extremely important. In such circumstances, it is important to ensure that the information is sent without risking disconnection due to poor communication quality (e.g., high traffic congestion or poor cellular signal). Accordingly, in some embodiments, the SSA module modifies one or more session parameters before establishing an emergency communication session. In other circumstances, the device or system already recognizes the communication quality is poor (e.g., from an earlier communication session). As a result, in some embodiments, the SSA module modifies one or more session parameters before establishing a communication session when communication quality or data flow quality or performance according to one or more performance benchmarks is poor or likely to be poor. In some embodiments, the SSA module dynamically modifies one or more session parameters during a communication session. For example, a communication session that starts off with high quality data flow may then encounter data flow deterioration, for example, as a router along the routing path between end devices and/or systems experiences heavy traffic congestion (e.g., from a DDoS attack). As a result, performance benchmarks suffer, and the transport layer session is at risk of being disconnected under standard industry session parameter settings. Accordingly, in some embodiments, the SSA module dynamically modifies one or more session parameters during a communication session to prevent disconnection (e.g., during an emergency communication session).

In some embodiments, the SSA module uses session parameters from a saved session state associated with the communication session. For example, in some embodiments, a user switches communication devices during a communication session with an EMS, wherein the EMS saves one or more session states comprising session parameters (e.g., parameter settings, thresholds, limits, etc.). In further embodiments, when the user switches to a new communication device during the communication session, the EMS sends the session state to the new communication device. This allows the new communication device to continue the communication session with the EMS using the session parameters from the session state of the previous communication device. The advantage of this process is that the previous device has modified the session parameters during the course of the communication session. For example, when data flow quality is good, in some embodiments, the transport layer session parameter settings are dynamically adjusted during the communication session to increase window size so that ACK is not required as frequently. This allows more bandwidth to be devoted to sending and/or receiving important information, for example, emergency indication or user location during an emergency communication session.

Session Management Module

A session management module saves one or more session states of a communication session. In some embodiments, a session state comprises one or more session parameters. In some embodiments, a session parameter is selected from RTT, time-to-live (TTL) for data packets, retransmission timeouts, clear channel assessment (CCA) delay, retransmission counts, and jitter buffer length. In some embodiments, a device or device application comprises a device session management module. In some embodiments, a system or system server or server application comprises a system session management module. In some embodiments, an EDC or EMS receives user data and/or metadata from a user communication device during the course of an emergency communication session. In further embodiments, user data comprises multimedia information, location information, videos, images, MIMS, voice recordings, text-messages or any combination thereof. In further embodiments, the EDC or EMS stores the user data in a database. In further embodiments, the user data in the database is associated with a specific communication session during which the user data was received by the EDC or EMS. In some embodiments, a communication device is in an emergency communication session with an EMS or EDC.

In some embodiments, a communication session is assigned a unique session identification number (USIN) by an EMS or EDC. A USIN is a unique identifier that is linked to a specific communication session for the duration of that communication session. In certain embodiments, an EDC and/or EMS assigns a unique session identification number (USIN) to the data communication session between the EDC and/or EMS and a user communication device such that the USIN can uniquely and over various EDCs and/or EMSs identify the communication session. In further embodiments, an EDC or EMS that receives USIN-associated data packets from a new communication device is able to continue the communication session without having to re-authenticate or re-associate with the new communication device. In some embodiments, an EDC or EMS comprises a USIN server storing a plurality of USIN, each USIN associated with an active communication session. In other embodiments, a USIN server is separate from an EDC or EMS. In some embodiments, an EDC or EMS communicates with a USIN server to obtain information for an active communication session associated with a USIN by providing the USIN.

In some embodiments, a communication device is disconnected from the communication session. In further embodiments, a new communication device joins or connects to the communication session. In some embodiments, a communication device is disconnected from a communication session due to session time-outs, ACK failures, retransmission time-outs, out-of-sequence packets, excessive jitter between consecutive packet reception, CRC or checksum failures, frame errors, bit errors, SNR fluctuations, or other factors. In some embodiments, a communication device is dropped from a communication session due to poor signal, device shutdown, user switching devices, device running out of batteries, or any combination thereof. In some embodiments, a second communication device replacing a first communication device that is disconnected from a communication session obtains authentication from an EMS or EDC by providing user login information identical to user login information for the first communication device.

For example, in a particular embodiment, a user having a first communication device presses an emergency button (via his emergency alert application that he is logged into on his device) to send an emergency alert or request to an EMS. The device establishes an emergency communication session with the EMS, but the device runs out of battery power during the emergency communication session. The user then switches to a backup communication device that is associated with his user login account, which also has him logged in on the emergency alert application. The user presses the emergency button to send an emergency alert or request to an EMS for the second time. Now, however, the EMS determines that an emergency alert was sent from a device associated with his login account (first device) within the past 15 minutes. As a result, the EMS determines that this second device is likely to be calling regarding the same emergency situation as the first device. Therefore, the EMS automatically authenticates the second device to join the same emergency communication session established by the first device. In this example, the EMS comprises a system session management module that sends the session state for the emergency communication session to the second device. The first device session state comprises session parameters that have been altered through the course of the communication session (e.g., reduced window size to decrease the number of acknowledgement requests because the data flow quality was good). Now the second device can pick up where the first device left off using the optimized session parameters. Moreover, the EMS has stored all relevant information or data (e.g., emergency alert indication, location information/GPS coordinates, user identity, user health history, messages, videos, photos, etc.) sent by the first device, wherein the information or data is associated with the communication session. After the second device is automatically authenticated (via USIN or user login), the EMS continues the communication session with the same information provided before without requiring the second device to establish a new communication session.

In some embodiments, a device session management module transfers a USIN assigned to a communication session to a new communication device. In further embodiments, a device session management module transfers a saved session state for the communication session to a new communication device. In some embodiments, an EMS or EDC requires authentication from a new communication device that attempts to join a communication session. In further embodiments, a USIN provides authentication for a communication device to join a communication session to which the USIN is assigned.

In some embodiments, a system session management module requires a new communication device that attempts to join a communication session to provide authentication. In further embodiments, a new communication device provides authentication comprising a USIN assigned to the communication session. In further embodiments, a new communication device provides authentication comprising a user login associated with the previous communication device in the communication session.

Session Transfer Module

In some embodiments, an EMS or EDC comprises a system session transfer module. In some embodiments, a session transfer module transfers an emergency communication session to a new EMS or EDC. In further embodiments, a session transfer module transfers an emergency communication session to a new EMS or EDC when an active communication device in the communication session moves to a new location that is within a jurisdiction of the new EMS or EDC. As used herein, an "active" communication device is a communication device that is in active communication with an EMS or EDC. For example, in some embodiments, there are multiple devices associated with a communication session. However, the user who is communicating with the EMS or EDC is using only one of the devices, which is the "active" device. If that device runs out of power and shuts down, the user will transfer to another device, which now becomes the "active" device. In some embodiments, the transfer of an emergency communication session comprises transferring a session state of the communication session to the new EMS or EDC. In further embodiments, the session transfer module sends authentication information needed to authenticate the active communication device to join the communication session with the new EMS or EDC. In yet further embodiments, authentication information comprises a USIN associated with the communication session or a user login associated with a previous communication device that was part of the communication session. In some embodiments, the transfer of an emergency session comprises user data obtained by the EMS or EDC.

Device Management Module

In some embodiments, an EMS or EDC comprises a device management module associating a new communication device with a communication session when provided with authentication to join the communication session and detecting when a current communication device is dropped from the communication session. In further embodiments, authentication information comprises a USIN associated with the communication session or a user login associated with a previous communication device that was part of the communication session. In some embodiments, a device management module adds one or more communication devices to a communication session when provided with authentication. In some embodiments, a device management module removes one or more communication devices from a communication session when the one or more communication devices is disconnected from the communication session.

Miscellaneous Modules

In some embodiments, an EMS comprises a session data module storing session data comprising information received during an emergency communication session. In further embodiments, the information received during the emergency session comprises user information, emergency indication, location information, user health history, user login, sensor information, photo(s), video(s), text message(s), audio message(s), or any combination thereof.

Detailed Description of the Figures

FIG. 1A is a schematic diagram of one embodiment of a device described herein. In some embodiments, the device 102 is an electronic device such as a communication device (e.g., mobile or cellular phone, computer, laptop, etc.). In some embodiments, a communication device is a wearable device. In some embodiments, a communication device is a wireless mobile device or a smart phone. In some embodiments, a communication device is a walkie-talkie or a two-way radio. In some embodiments, a user 100 is selected from one or more persons who are the primary users of the device 102.

In some embodiments, the device 102 comprises at least one processor 115, a memory 119 (e.g., an EPROM memory, a RAM, a solid-state memory), a display 111, a user interface 113, a network component 123 (e.g., an antenna and associated components, Wi-Fi adapters, Bluetooth® adapters, etc.) and a software application 108 (e.g., mobile application, server application, computer program, application). In some embodiments, the wearable device is equipped with a location component 117, for example, a global positioning system (GPS).

In some embodiments, the device 102 has several components including a display 111 and user interface 113, which allow the user 100 to interact with the device 102. In some embodiments, the display 111 is a part of the user interface 113 (e.g., a touchscreen is both a display and provides an interface to accept user interactions). In some embodiments, the display 111 and/or the user interface 113 comprises a touch screen (e.g., a capacitive touch screen), which is capable of displaying information and receiving user input. In some embodiments, the device 102 comprises hardware components not including a display 111 and a user interface 113, wherein the device functions autonomously without requiring active user guidance or interaction.

In some embodiments, a device 102 includes various accessories 125 that allow additional functionality. In some embodiments, the accessories 125 include one or more of the following: microphone (e.g., for user voice interaction), a camera (e.g., for input of gestures commands or pictures from the user 100), speakers, one or more sensors such as a fingerprint reader or scanner, USB/micro-USB port, headphone jack, a card reader, SIM card slot, and any combination thereof.

Figure 1B:
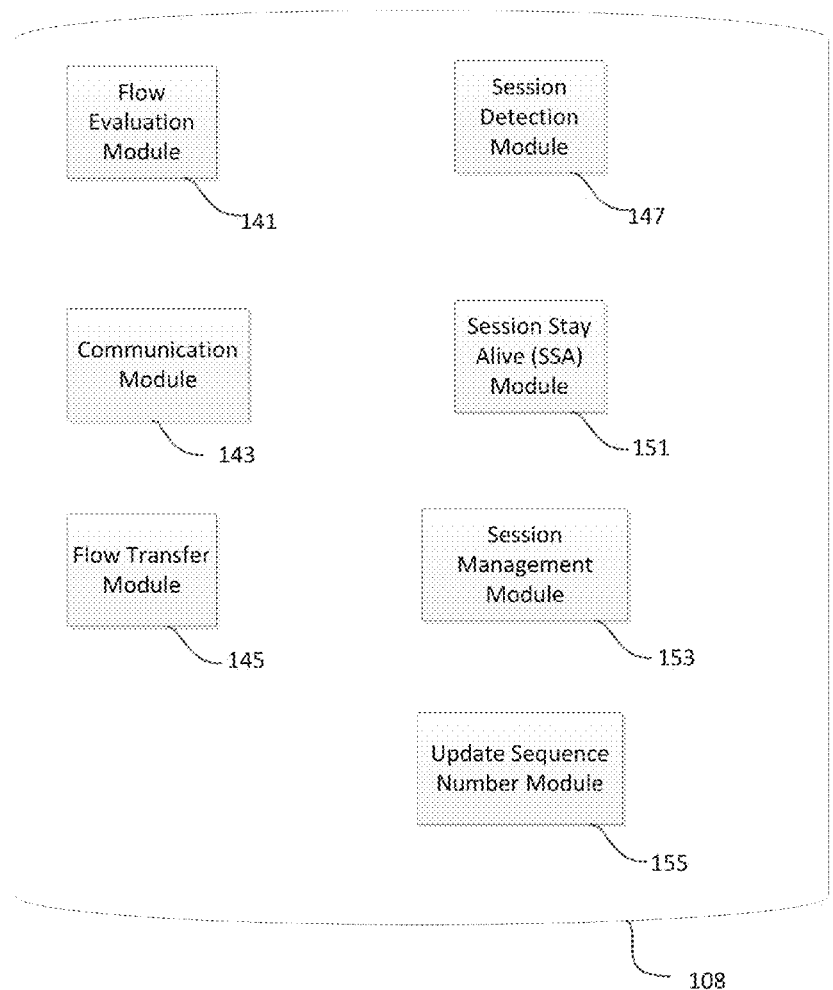
FIG. 1B is a schematic diagram of one embodiment of an application on a device.

FIG. 1B is a schematic diagram of one embodiment of a software application 108 installed on a device. In some embodiments, the software application 108 comprises one or more device software modules selected from a flow evaluation module 141, a communication module 143, a flow transfer module 145, a session detection module 147, a session-stay-alive (SSA) module 151, a session management module 153, or any combination thereof.

Figure 1C:
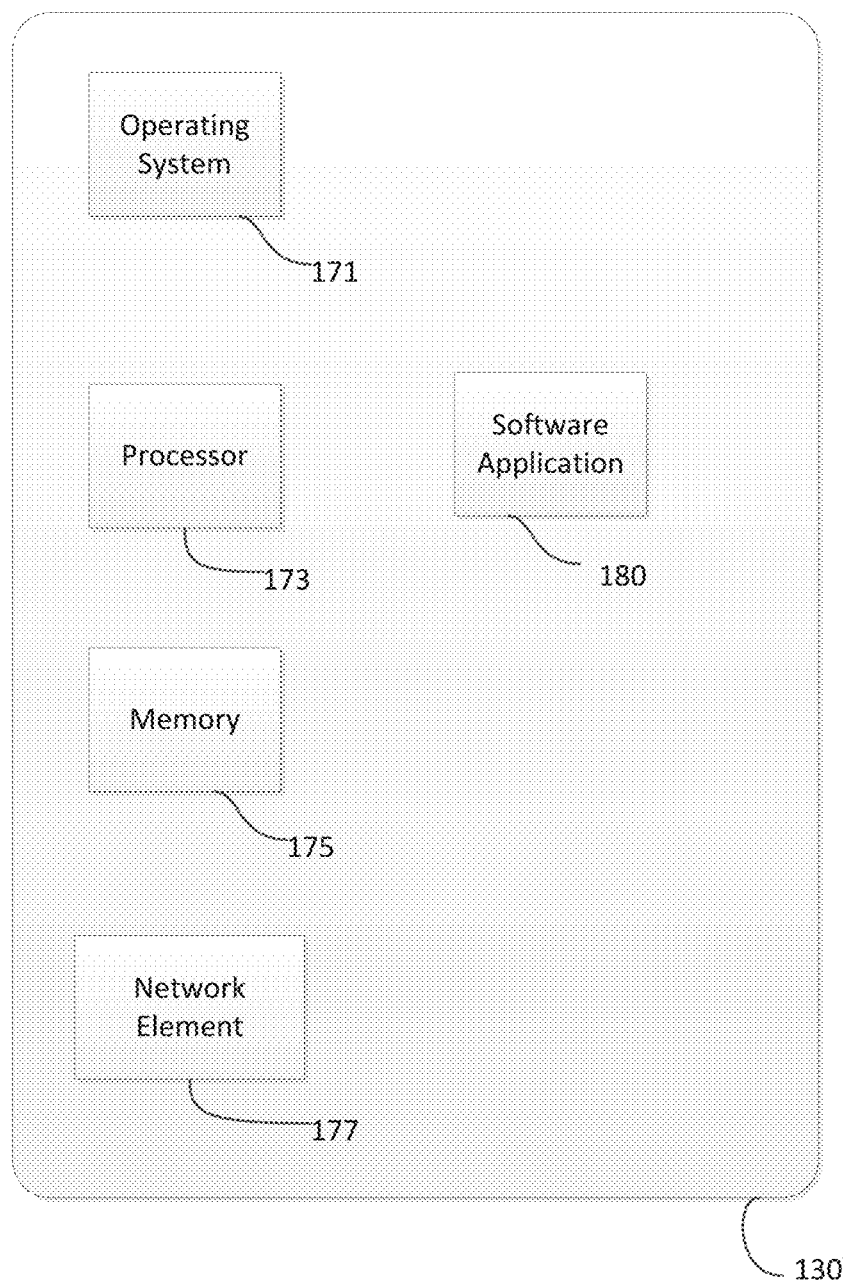
FIG. 1C is a schematic diagram of one embodiment of an emergency management system comprising hardware components and a software application.

FIG. 1C is a schematic diagram of one embodiment of an emergency management system (EMS) 130 described herein. In some embodiments, the EMS 130 is an EMS server. In some embodiments, the EMS 130 comprises one or more EMS servers. In some embodiments, the EMS 130 comprises a plurality of EMS servers.

In some embodiments, the EMS 130 comprises at least one processor 173, a memory 175 (e.g., an EPROM memory, a RAM, a solid-state memory), a network element 177 (e.g., a server network card, network interface card, etc.), an operating system 171, and a software application 180 (e.g., mobile application, server application, computer program, application). In some embodiments, the EMS functions autonomously without requiring active user guidance or interaction.

Figure 1D:
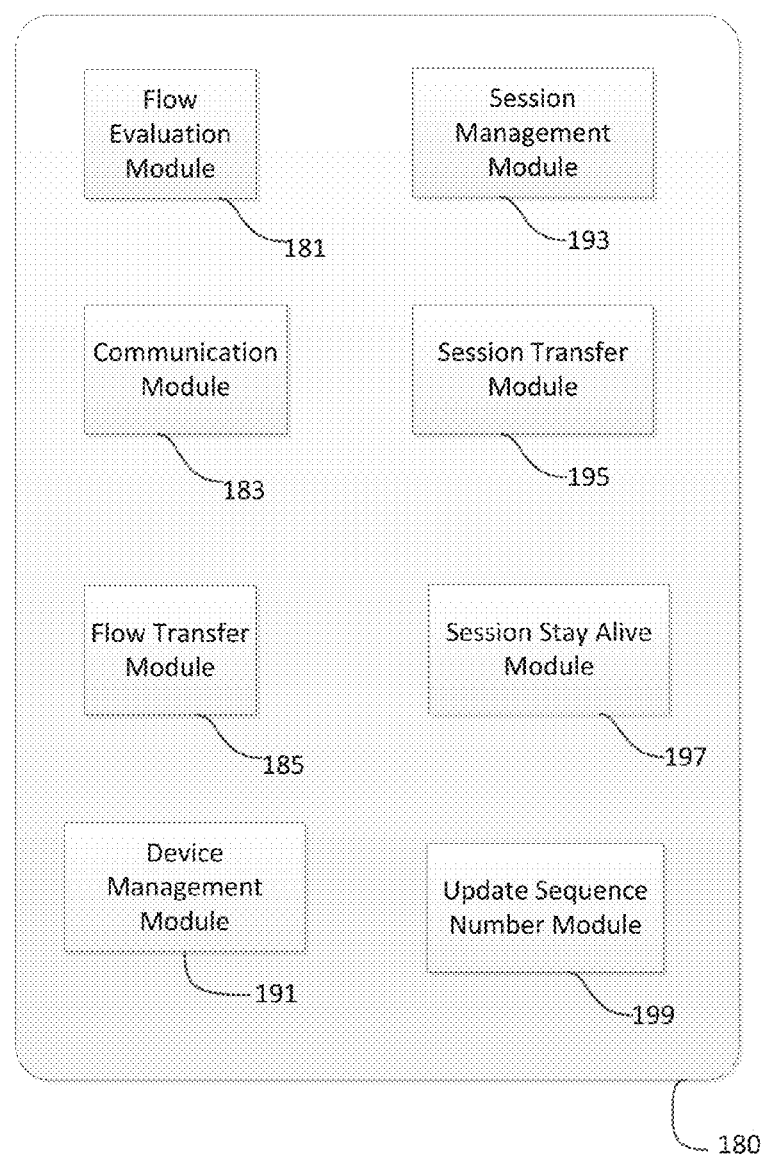
FIG. 1D is a schematic diagram of one embodiment of an application on an EMS or EMS server.

FIG. 1D is a schematic diagram of one embodiment of a software application 180 (e.g. server application) installed on an EMS 130. In this particular embodiment, the software application 180 comprises a flow evaluation module 181, a communication module 183, a flow transfer module 185, a device management module 191, a session management module 193, a session transfer module 195, and a session stay alive (SSA) module 197. In some embodiments, the modules are system or EMS modules. In this particular embodiment, the modules are EMS modules. In some embodiments, the software application 180 comprises one or more EMS software modules selected from a flow evaluation module 181, a communication module 183, a flow transfer module 185, or any combination thereof. In some embodiments, the software application 180 comprises a flow evaluation module 181, a communication module 183, and a flow transfer module 185 in order to provide for robust communication via a plurality of transport layer sessions. Depending on what functions an EMS carries out, the software application will not comprise every EMS software module described herein. For example, in some embodiments, an EMS that provides robust communication via multiple transport layer sessions comprises a flow evaluation module, a communication module, and a flow transfer module, but not software modules for providing a persistent communication session.

In some embodiments, the software application 180 comprises one or more system software modules selected from a device management module 191, a session management module 193, a session transfer module 195, a session stay alive (SSA) module 197, or any combination thereof. In some embodiments, the software application 180 comprises a device management module 191, a session management module 193, a session transfer module 195, and a session stay alive (SSA) module 197. Depending on what functions an EMS carries out, the software application will not comprise every system software module described herein. For example, in some embodiments, an EMS that provides a persistent communication session comprises a device management module 191, a session management module 193, a session transfer module 195, and a session stay alive (SSA) module, but not software modules for providing robust communication. In some embodiments, a software application 180 comprises software modules for providing robust communication and a persistent communication session.

Figure 1E:
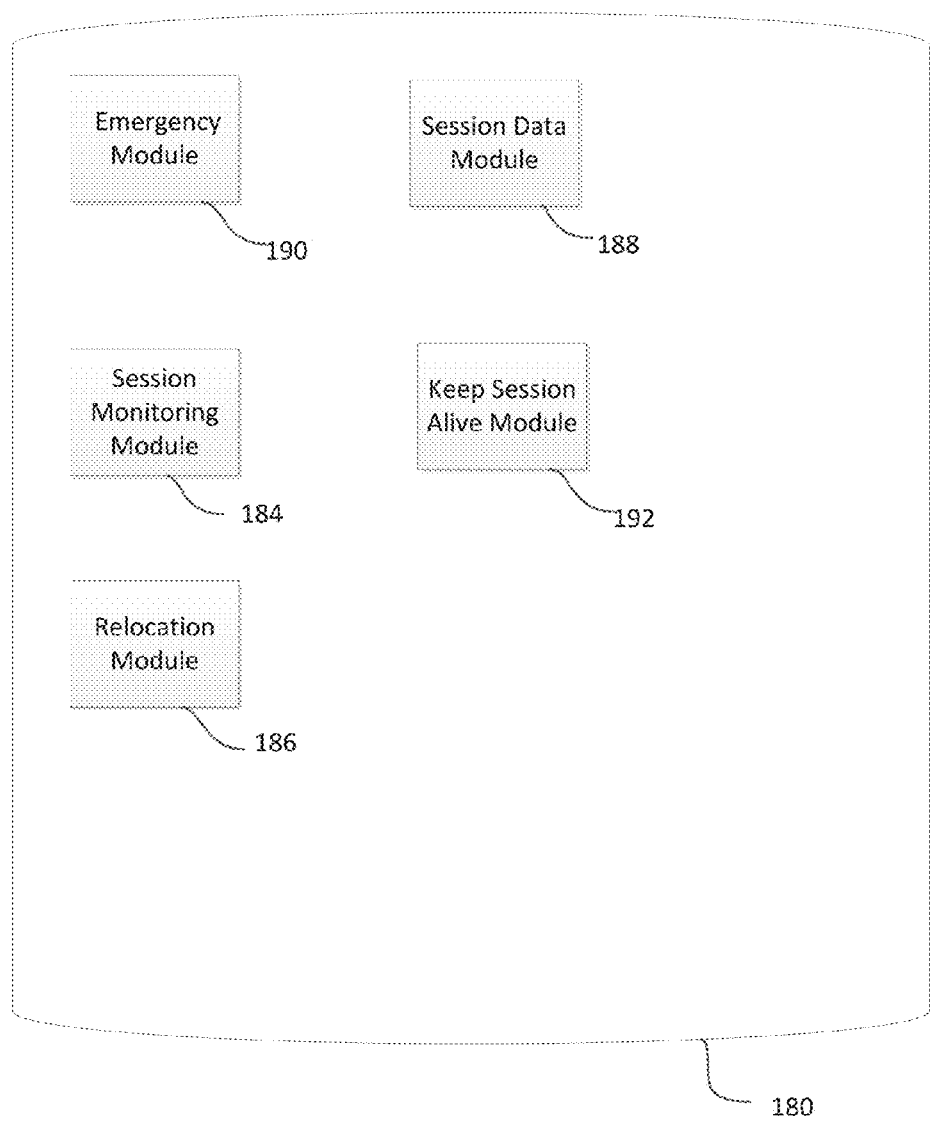
FIG. 1E is a schematic diagram of one embodiment of a software application installed on an EMS.

FIG. 1E is a schematic diagram of one embodiment of a software application 180 (e.g. server application) installed on an EMS 130. In this particular embodiment, the software application 180 comprises an emergency module 190, a session monitoring module 184, a relocation module 186, a session data module 188, and a keep session alive module 192.

Figure 2:
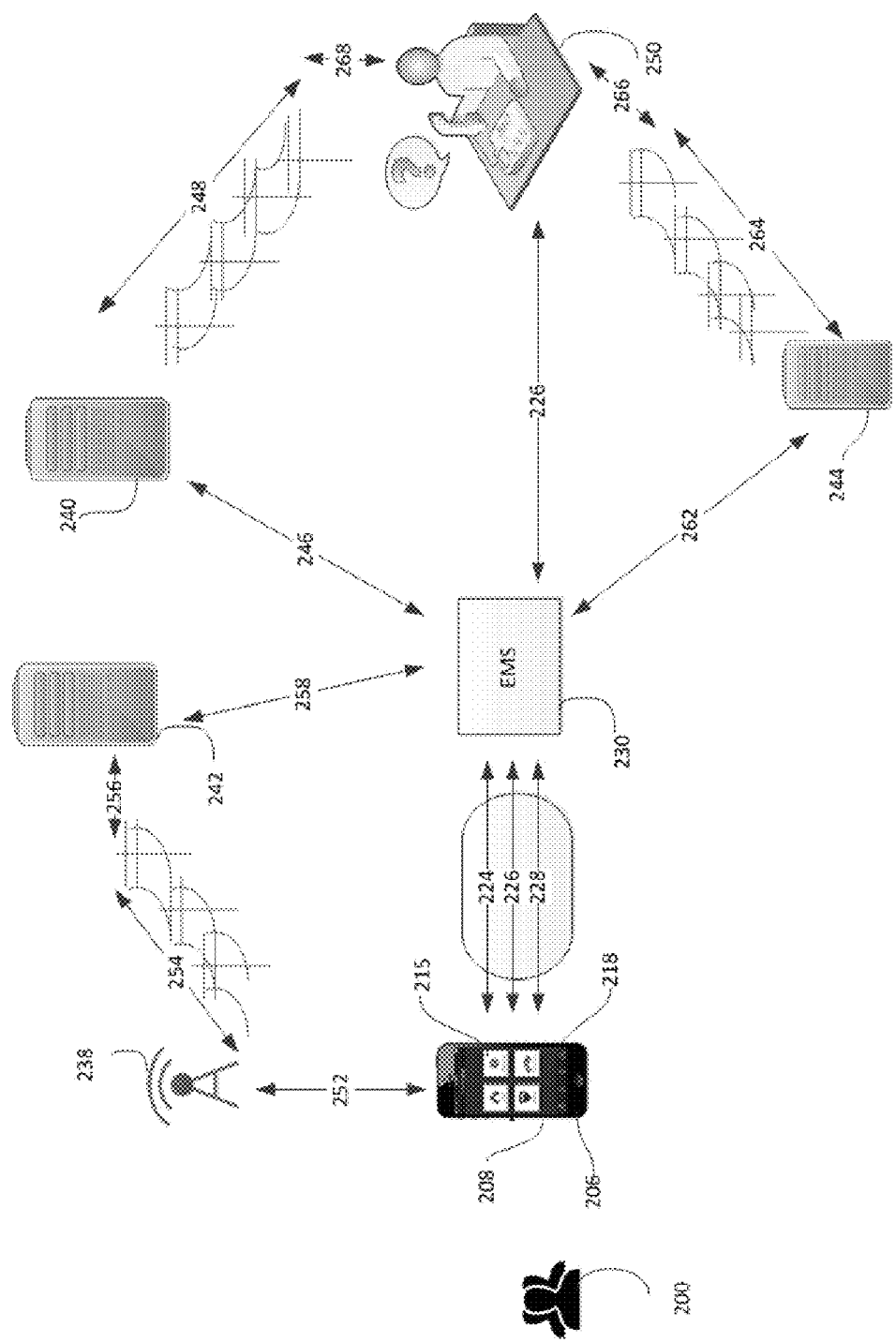
FIG. 2 is a schematic diagram illustrating various routing options and multiple transport layer sessions for communications between a device and an emergency management system (EMS) and an emergency dispatch center (EDC)

FIG. 2 is a schematic diagram of one embodiment illustrating a plurality of routing options between a user communication device 206 and an EMS 230 and between an EMS 230 and an EDC 250. The user communication device 206 and the EMS 230 can initiate or continue an already initiated communication session between the user communication device 206 and the EMS 230. In this embodiment, the EMS 230 acts as an intermediary between the communication device 206 and an EDC 250, wherein the EMS 230 provides relevant or important user information to the EDC 250 to help coordinate an emergency response. As an example, in one embodiment, a user 200 sends an emergency alert using a software application 208 installed on the user communication device 206. Alternatively, in another embodiment, the user communication device 206 detects the need for an emergency assistance to the user 200 without user input (e.g. a wearable sensor sends sensor data indicating a heart attack to the communication device 206). Next, the user communication device 206 scans various connections between the user communication device 206 and the EMS 230 or directly to an EDC 250. Upon detecting an active connection, for example, a TCP 224, UDP 226, SCTP 228 or any other type of a transport layer session, the user communication device 206 chooses one or more of multiple active transport layer sessions between the user communication device 206 and the EMS 230. The multiple active transport layer sessions comprise a TCP 224, a UDP 226, and an SCTP 228 transport layer session. If an active transport layer session is not found between the user communication device 206 and the EMS 230, then the user communication device 206 attempts to establish a communication session with an EMS 230 by establishing one or more of multiple transport layer sessions, for example, a TCP 224, UDP 226, and/or SCTP 228 transport layer session. If a data communication link cannot be established between the user communication device 206 and the EMS 230, the user communication device 206 utilizes a public switched telephone network (PSTN) 254 via a cell tower 238 to place a time-division multiplexing (TDM) call to the EDC 250 via the EMS 230. Upon selecting one or more transport layer sessions to use for the communication session with the EMS 230, the user communication device 206 initiates a request for emergency assistance via the selected transport layer session(s). In some embodiments, one of the transport layer sessions is the primary transport layer session, while the other two are secondary transport layer sessions. Once the request for emergency assistance has been sent, the user communication device 206 determines the quality of the communication session based on various performance benchmark parameters, for example, a received signal strength indicator, channel latency, error-rate, etc. If the user communication device 206 senses the data flow quality of an active transport layer session (e.g. a primary transport layer session) is below an acceptable level, the user communication device 206 transfers the data flow to another transport layer session (e.g. a secondary transport layer session), for example, from a TCP session 224 to a UDP 226 session, or from one TCP 224 session to another TCP session (not shown). The user communication device 206 is capable of communicating with the EMS 230 using a variety of options, for example, via a TCP 224, UDP 226, or SCTP 228 transport layer session or a TDM call 252 through a cell tower 238 to access a PSTN network 254. The EMS 230 is capable of communicating with an EDC 250 using a variety of options, for example, a direct VoIP call 226, a partial SIP call 246, or a partial TDM call 262 via the PSTN network 264 and a gateway 244, or a full cellular/PSTN call 248 via a gateway 240. The EMS 230 then manages the communication session with the user communication device 206 as an intermediary between the device 206 and the EDC 250. The EMS 230 also actively responds to requests from the user communication device 206 to transfer a data flow between transport layer sessions.

Figure 3:
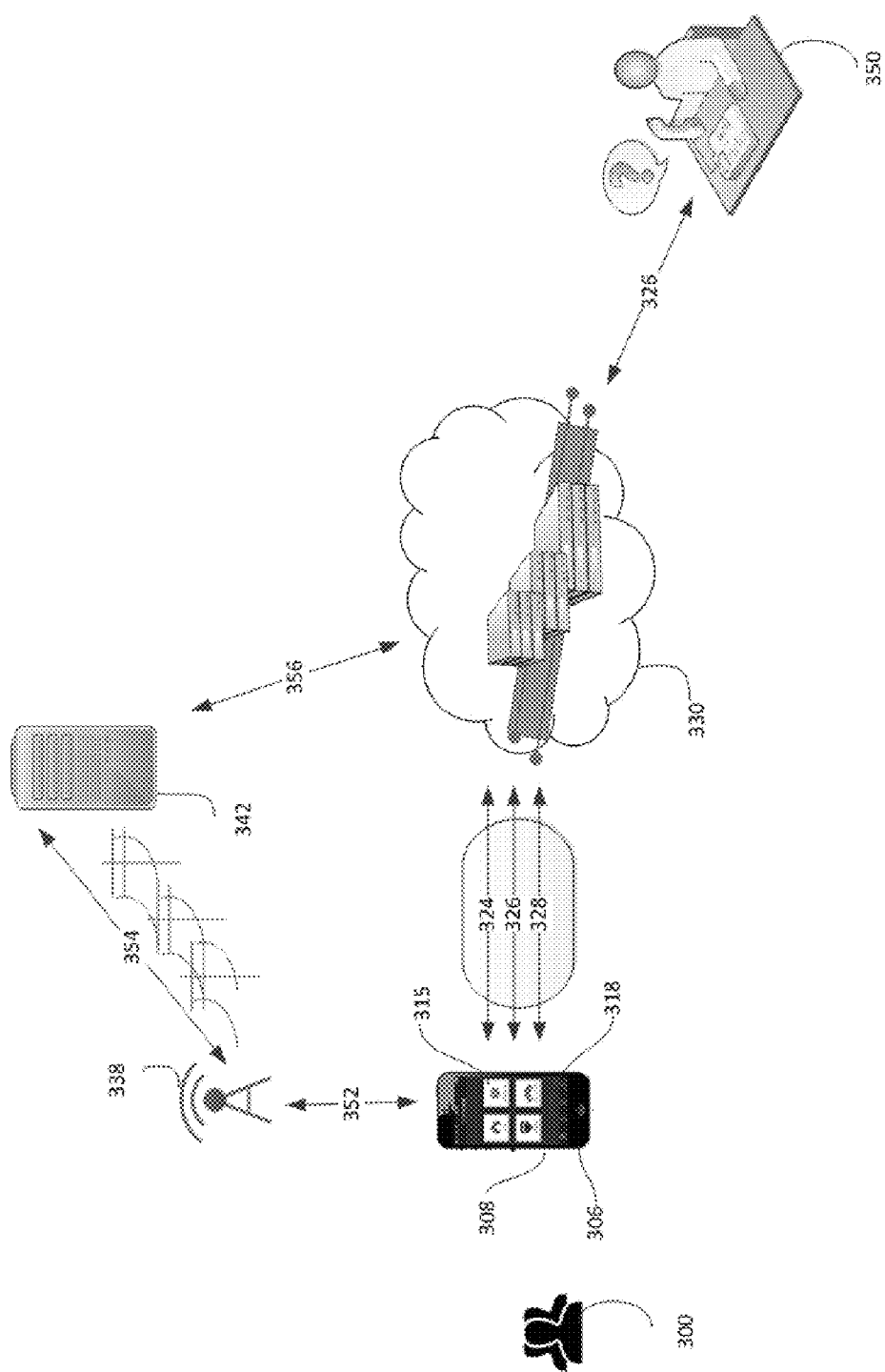
FIG. 3 is a schematic diagram illustrating various routing options and multiple redundant TCP transport layer sessions for communications between a device and an emergency management system (EMS) and an emergency dispatch center (EDC)

FIG. 3 is a schematic diagram of one embodiment illustrating a communication session between a user communication device 306 and an EMS 330 via multiple TCP transport layer sessions 324, 326, 328. In this illustrative embodiment, a user 300 wishes to send an emergency alert using a software application on the user communication device 306. The user communication device 306 scans for active TCP transport layer sessions 324, 326, 328, and if an active TCP transport layer session is not detected, the user communication device 306 establishes a communication session comprising one or more TCP transport layer sessions with the EMS 113. In some embodiments, the communication device 306 comprises a session detection module that scans for active transport layer sessions. If the communication device 306 detects one or more active transport layer sessions, it continues the communication session using those transport layer sessions 324, 326, 328. Once the one or more TCP transport layer sessions are active, the user communication device 306 sends an emergency alert or request for emergency assistance to the EDC 350 via the EMS 330.

Next, the user communication device 306 determines the quality of the communication session based on various performance benchmark parameters, for example, a received signal strength indicator, channel latency, error-rate, etc. If the user communication device 306 senses the data flow quality of an active TCP transport layer session (e.g. a primary transport layer session) is below an acceptable level, the user communication device 306 transfers the data flow to another TCP transport layer session (e.g. a secondary transport layer session), for example, from TCP transport layer session 324 to TCP transport session 326 or TCP transport layer session 328. For example, if the first TCP transport layer session 324 (at a specific port) is not able to deliver data from the software application 308 on the user communication device 306, the user communication device 306 uses another TCP transport layer session 326. In some embodiments, if the TCP transport layer session 326 is not available, the user communication device establishes the TCP transport layer session 326. In some embodiments, the user communication device 306 sets up multiple TCP transport layer sessions 324, 326, 328, each using a different port number at the user communication device 306 for communicating with the EMS 330. In some embodiments, each TCP transport layer session 324, 326, 328 also uses a different routing path from the user communication device 306 to the EMS 330. By doing so, the TCP transport layer sessions 324, 326, 328 allow for different end-to-end data flow quality for each of the TCP transport layer sessions. This results in a difference in the performance amongst the TCP transport layer sessions. In some embodiments, the user communication device 306 uses this information to choose a single TCP transport layer session 324 as a primary transport layer session. Alternatively, the user communication device 306 uses this information to choose multiple redundant TCP transport layer sessions 324, 326, 328 for sending and/or receiving information with the EMS 330. In this embodiment, the EMS 330 discards redundant information/data received from the user communication device 306. In some embodiments, the EMS 330 mitigates redundant data transmission by harmonizing the data received. In some embodiments, the user communication device 306 then actively manages the multiple TCP transport layer sessions 324, 326, 328 and periodically evaluates the quality of these sessions. In some embodiments, when none of the TCP transport layer sessions 324, 326, 328 are responsive (which also means the sessions would all fail one or more performance benchmarks), the user communication device 306 connects with the EMS 330 using a TDM call 352 via a cellular phone base station 338 for example, and over a PSTN network 354 and a gateway 342.

Figure 4:
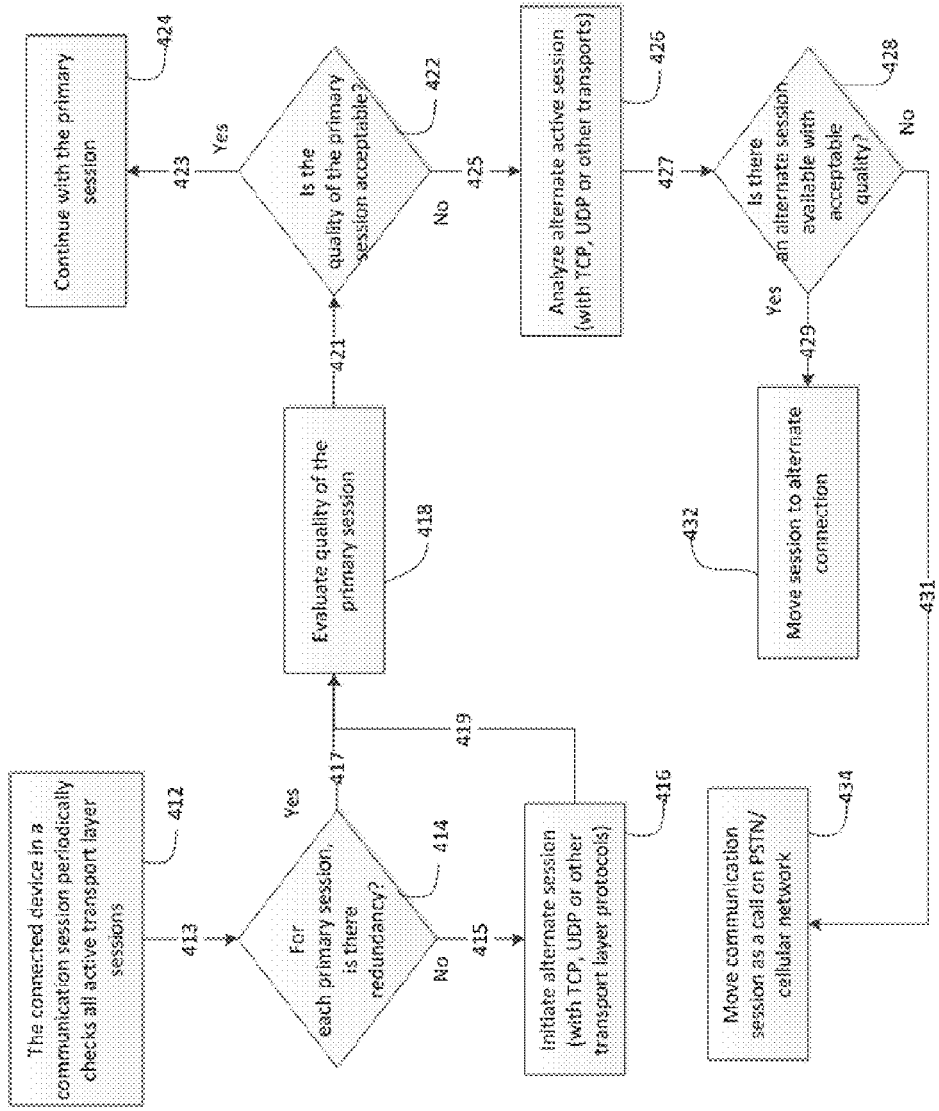
FIG. 4 is a flow chart illustrating one embodiment of how a device or server (e.g. EMS server) application manages a communication session.

FIG. 4 is a flow chart of one embodiment of a process by which a communication device or a system (e.g. EMS, EMS server, EDC, or EDC server) transfers data flow between multiple transport layer sessions. As used herein, transport layer session can be abbreviated as TLS. The user communication device or system periodically checks all active transport layer sessions 412. The next step depends on whether there is redundancy for each primary transport layer session 414. In some embodiments, the device or system determines redundancy is needed for each primary transport layer session. In other embodiments, the device or system determines redundancy is needed for important information. In this embodiment, if there is no redundancy 415, then the device or system initiates one or more secondary transport layer sessions such as, for example, TCP or UDP sessions 416. Once there is redundancy 417, 419, then the primary transport layer session data flow quality is evaluated 418. The next step depends on whether the quality of the primary transport layer session is acceptable 422. If the quality of the primary transport layer session is acceptable 423, then the device or system continues the communication session using the current primary transport layer session 424. Alternatively, if the quality of the primary transport layer session is not acceptable 425 (e.g. fails one or more performance benchmarks), then the device or system evaluates the quality (e.g. data flow quality) of the one or more secondary transport layer sessions 426. Next, the device or system evaluates whether there is a secondary transport layer session available of acceptable quality 428. If there is a secondary transport layer session available of acceptable quality, then the device or system transfers data flow from the primary transport layer session to the secondary transport layer session. In some embodiments, the secondary transport layer session now becomes the primary transport layer session, and the original primary transport layer session becomes a secondary transport layer session or is disconnected. Alternatively, in some embodiments, if there is no secondary transport layer session of acceptable quality 431 (e.g. every secondary transport layer session fails one or more performance benchmarks), then the device or system initiates a call on a PSTN or cellular network 434.

Figure 5:
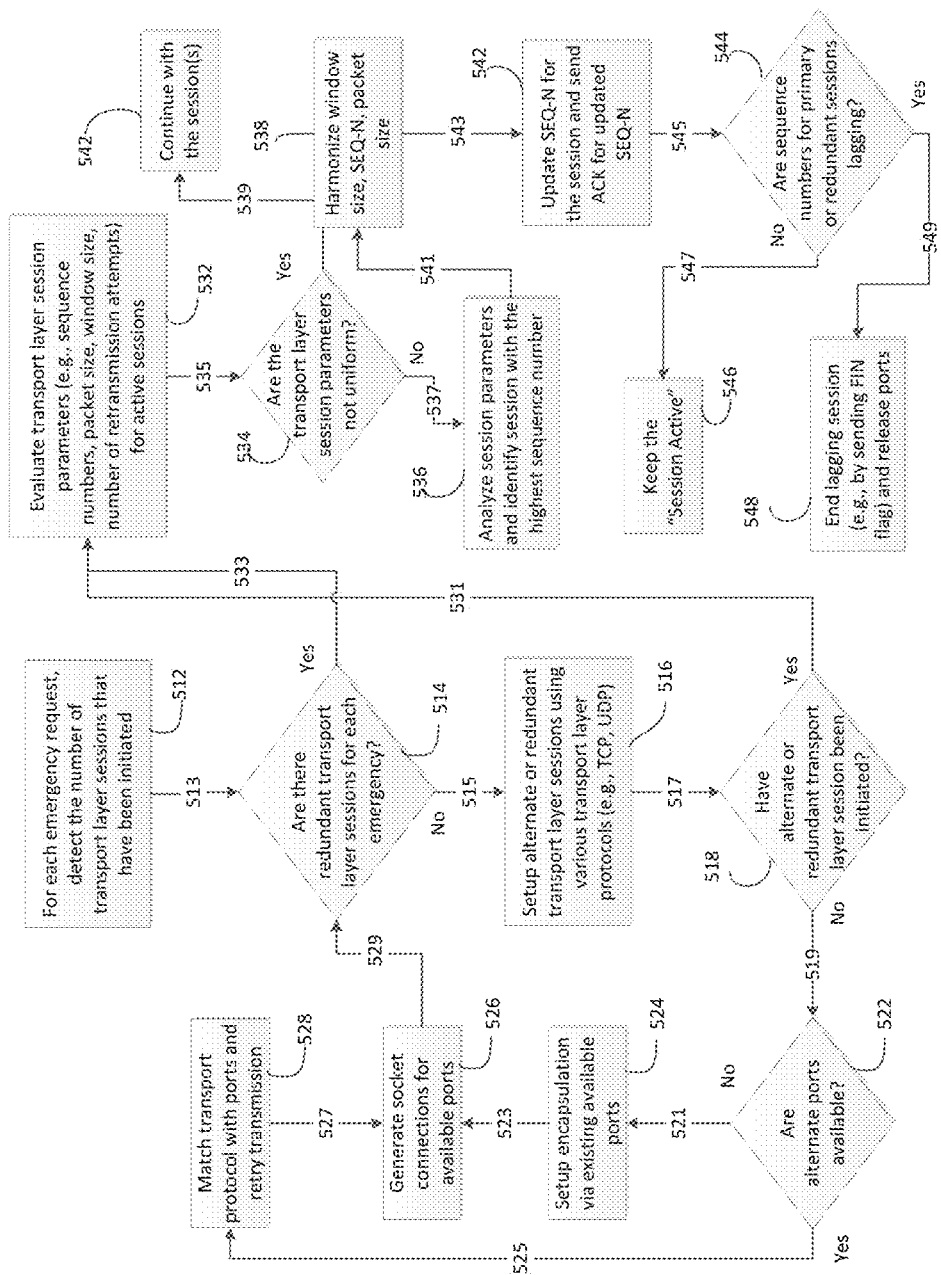
FIG. 5 is a flow chart illustrating another embodiment of how a device or server (e.g. EMS server) application manages a communication session.

FIG. 5 is a schematic of one embodiment of the software application 108 on the communication device 106 or the EMS software application 180 on the EMS 130 (See FIGS. 1A-1D). In this particular embodiment, when a user sends a request for emergency assistance, the software application 108, 180 creates redundant transport layer sessions and maintains "session active" status to ensure that the request is transmitted quickly and efficiently. For example, in some embodiments, the application attempts to send the request via redundant transport layer sessions 516, harmonize session parameters 538 and end lagging sessions 548. In some embodiments, when the user sends the request for emergency assistance, a communication module 143 (see FIG. 1B) establishes a communication session at an application layer with an end device or system (such as an EMS or an EDC). In some embodiments, the EMS communication module 183 (see FIG. 1D) establishes an emergency communication session at an application layer with a first communication device upon receiving an user emergency request from the first device.

In some embodiments, the communication device (or the EMS) detects the number of transport layer sessions serving each request for emergency assistance 512. In some embodiments, the flow evaluation module 141 (see FIG. 1B) and EMS flow evaluation module 181 includes instructions for this function. In particular, in some embodiments, standard protocols for the transport layer (e.g., TCP, UDP or other transport layer protocols) or other modified protocols are detected. It is understood that, in some embodiments, the transport layer session utilizes one of the standard protocols with default values or range of values for session parameters (e.g., RTT, time-to-live (TTL) for packet size, re-transmission timeouts, clear channel assessment (CCA) delay, re-transmission counts, jitter buffer length, window size, number of retransmission attempts). In some embodiments, the values for the session parameters have been set by the operating system or the software application 108, 180 on the communication device or the EMS.

In some embodiments, once the application detects that there are no redundant transport layer sessions serving an active application layer request 514, the application sets up alternate or redundant connections 516. In some embodiments, the application verifies if these sessions have been successfully initiated 518. In some embodiments, if redundant sessions have been established, the session parameters for the primary and redundant sessions are evaluated 532.

In particular, in some embodiments, the sequence numbers (SEQ-N), packet size, window size and number of re-transmission attempts are evaluated for these sessions. In some embodiments, these functions are included in the flow evaluation module 141 (see FIG. 1B) or the EMS flow evaluation module 181 (see FIG. 1D). In particular, in some embodiments, the flow transfer module evaluates data flow transmitted over each of transport layer sessions against one or more performance benchmarks (such as responsiveness) for specific session parameters.

In some embodiments, if the transport layer session parameters between the primary and redundant sessions (or between the redundant sessions) are not uniform 534, the application attempts to harmonize specific session parameters to optimize the benefit from redundancy while keeping the session alive. In some embodiments, these functions are included in the flow transfer module 145 (see FIG. 1B) or the EMS flow transfer module 185 (see FIG. 1D). In some embodiments, the flow transfer modules dynamically transfers data flow from any transport layer session failing the one or more performance benchmarks to another transport layer session of the plurality of transport layer sessions during the communication session.

In some embodiments, the primary session is designated as the first session to be initiated. However, in some embodiments, the primary session is used to designate the fastest session or the session that has progressed further in transmitting data. In some embodiments, the uniformity of any given session parameter does not have to be absolute and is within some acceptable ranges for that particular parameter. In some embodiments, if the session parameters are generally uniform 532, then the one or more primary and redundant sessions will be maintained 542. In some embodiments, the application returns to detecting transport layer sessions 512 or checking redundancy 514.

In some embodiments, if the sessions are found to be not uniform or not within an acceptable range, the application analyzes the parameters across the various sessions and identifies which session has reached the highest sequence number 536. In the transport layer, the information from the emergency request is typically broken up into smaller collection of bytes or packets by the sending side and assigned sequence numbers. On the receiving side, the packets are typically re-assembled together based on these sequence numbers to re-create the file (e.g. a file containing an emergency request sent by a user communication device). In some situations, there will be congestion or noise in the transport layer session, which can cause some sessions to progress slowly, which may be indicated by a lower sequence number (SEQ-N) relative to other one or more other transport layer session(s). In some embodiments, the application identifies one or more session that have progressed to the highest sequence number.

In some embodiments, the application obtains the benefit of redundancy by identifying the session that has reached the highest sequence number (Hi-SEQ-N) and harmonizing one or more session parameters (e.g., the sequence numbers, packet size, window size) of the other sessions with the Hi-SEQ-N session 536. In further embodiments, if the sequence numbers and packet size are harmonized at the sending end 538, then the receiving end also benefits from the redundant or parallel connections by taking the latest packets from the Hi-SEQ-N session to re-create the emergency request. In other embodiments, other session parameters are harmonized as needed for quick and efficient transmission with minimal error. For example, in further embodiments, session parameters such as window size, SEQ-N, or packet size are harmonized to serve the Hi-SEQ-N session 538.

In some embodiments, the application obtains the benefit of redundancy by updating the sequence number (SEQ-N) to the highest sequence number 542. In some embodiments involving sessions utilizing reliable protocols such as TCP, the application requests the receiving end to send an acknowledgement (ACK) for the updated sequence number to all the sessions 542 to skip the sequence numbers that are in-between. In other embodiments utilizing other real-time protocols such as UDP, no acknowledgement is needed to update the sequence number. In some embodiments, the functions associated with the identifying, harmonizing and updating of the sequence numbers are incorporated into the update sequence number module 155 (see FIG. 1B) and EMS update sequence number module 199 (see FIG. 1D).

In some embodiments, the sequence numbers for some sessions are lagging because of congestion or noise in the session and harmonization and updating the sequence numbers have not been successful. As a result, in some embodiments, the application checks to see if any primary or redundant sessions are lagging 544. In some embodiments, if there is no significant lag (e.g., less than 1000 sequence numbers per minute), then the session is kept alive 546 via the session-stay-alive module 151 (see FIG. 1B) or the EMS-session-stay-alive module 197 (see FIG. 1D). In some embodiments, the session-stay-alive (SSA) module modifies one or more session parameters (e.g., increasing number of retransmission attempts) for one or more of the transport layer sessions to maintain connection with the emergency management system or emergency dispatch center when data flow is degraded sufficiently to result in disconnection under one or more performance benchmarks corresponding to industry standard acceptable limits.

Subsequently, in some embodiments, the application returns to detecting transport layer sessions 512 or checking redundancy 514 periodically. In some embodiments, lag or latency is significant if it is above about 10, 100, 1000, 2000, 3000, 4000, or above about 5000 SEQ-N per minute. In some embodiments, the lag or latency is significant if it crosses a particular value or threshold for a specific number of times (e.g., greater than 100 sequence numbers per minute three times).

In some embodiments, lagging sessions are terminated and their ports released 548. In some embodiments, if some transport layer sessions are lagging behind other sessions by a significant lag, the sessions are reset and the ports used by those connections released, e.g., by sending FIN flags. By terminating lagging sessions and releasing associated ports, slow sessions are removed and ports become available for establishing new transport layer sessions.

On the other hand, in other embodiments, if redundant sessions have not been successfully setup 518, the availability of alternate ports for setting up transport layer sessions will be evaluated 522. For example, one or more ports may become available after they are enabled. In some embodiments, if ports are not available, the ports are engaged via encapsulation 524 for setting up additional transport layer sessions. In some embodiments, after encapsulation of the ports, one or more socket connections for the available ports are generated 526 for the new transport layer sessions. In some embodiments, after a transport layer session has been successfully setup (or not), the application returns to detecting transport layer sessions 512 or checking redundancy 514 periodically.

In some embodiments, during an emergency situation, the application periodically checks for redundancy 514 after the emergency request has been sent and before the user or the EMS has canceled the emergency request. In some embodiments, the time period for the cycle is increased when the quality of the session is low (such as by evaluating performance benchmarks such as session time-outs, ACK failures, retransmission time-outs, out-of-sequence packets, excessive jitter between consecutive packet reception, CRC or checksum failures, frame errors, bit errors, SNR fluctuations, or any combination thereof and comparing to thresholds). In some embodiments, the period of the cycle is decreased when the quality of the session is good based on performance benchmarks.

Figure 6:
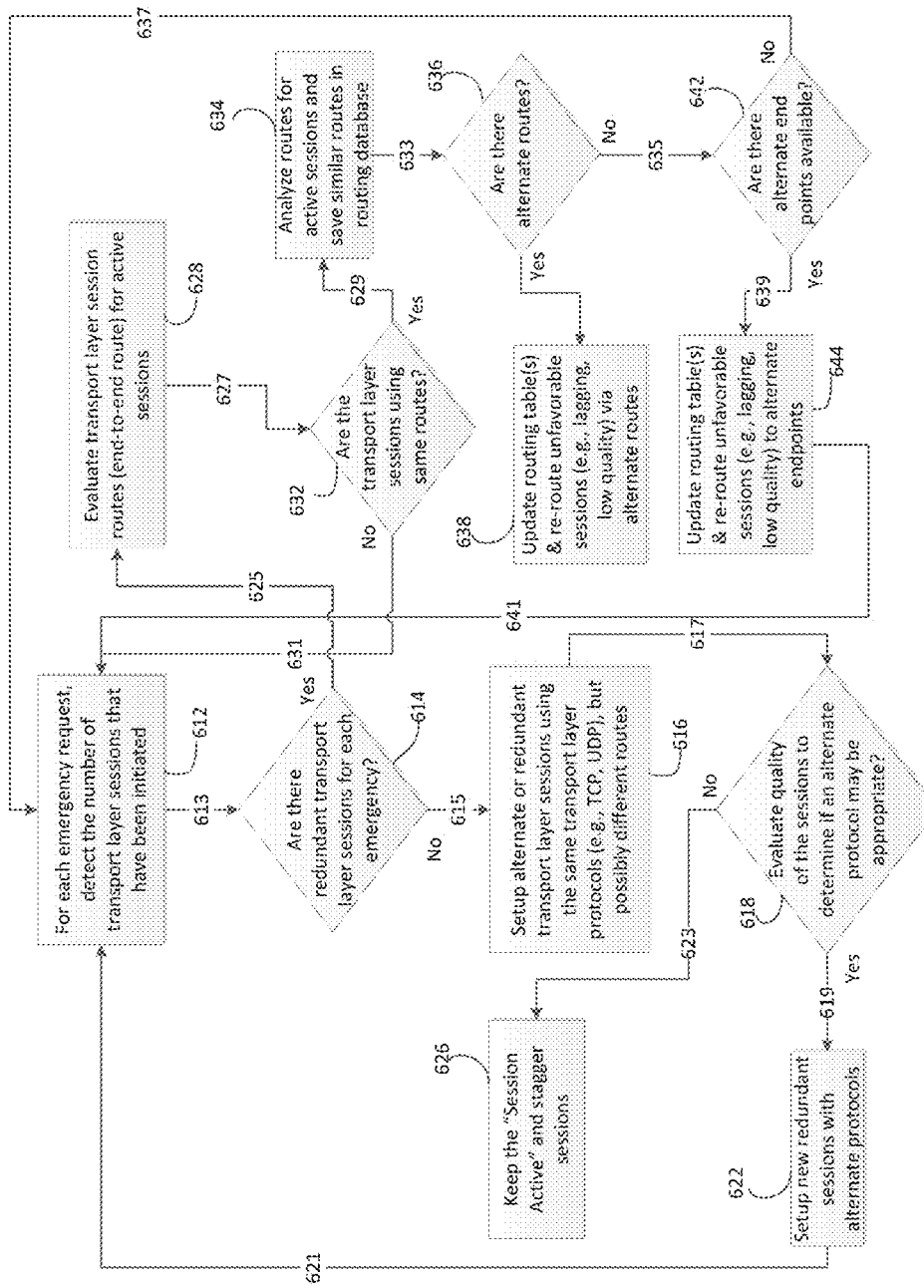
FIG. 6 is a flow chart illustrating yet another embodiment of how a device or server (e.g. EMS server) application manages a communication session.

FIG. 6 is a schematic of one embodiment of the software application 108 on the communication device 106 or the EMS software application 180 on the EMS 130 (See FIGS. 1A-1D). In some embodiments, when a user sends a request for emergency assistance, the software application 108, 180 creates redundant transport layer sessions 614 and analyzes routes or routing paths for those sessions 634 to transmit the request quickly and efficiently. For example, in some embodiments, the application attempts to re-route via alternate or secondary transport layer sessions 622, alternate routes 638 and alternate connections to the end point 644.

In some embodiments, redundant transport layer sessions use different routes or routing paths so that the application can identify and utilize the more advantageous routes (e.g. a route that has less latency than the alternate routes). As used herein, a route refers to a pathway for communication from one device or system (e.g., a communication device, EMS) to another device or system (e.g., communication device, EMS). In some embodiments, a route comprises one or more routers between one device or system to another device or system. One end that sends the communication, data or file may be referred to as the "sending end" and the other end that receives the communication data or file may be referred to as the "receiving end."

In some embodiments, the communication device (or the EMS) detects the number of transport layer sessions serving each request for emergency assistance 612. In some embodiments, the flow evaluation module 141 (see FIG. 1B) and EMS flow evaluation module 181 includes instructions for this function. In particular, in some embodiments, the standard protocols for the transport layer (e.g., TCP, UDP or other transport layer protocols) or other modified protocols are detected.

In some embodiments, once the application detects that there are no redundant transport layer sessions serving an active application layer request 614, the application sets up alternate or redundant connections 616 using the same protocol as the primary session (which is the original session sending the emergency request). In some embodiments, the alternate or redundant sessions utilize different routes in search of a more favorable route.

In some embodiments, if redundant sessions have been established, the quality of the sessions are evaluated 618 to determine if an alternate protocol is appropriate or serves the application faster or more efficiently. In some embodiments, performance benchmarks for responsiveness, quality, reliability or a combination are used to evaluate the quality of a transport layer session. In some embodiments, performance benchmarks includes evaluation of one or more factors such as session time-outs, ACK failures, retransmission time-outs, out-of-sequence packets, excessive jitter between consecutive packet reception, CRC or checksum failures, frame errors, bit errors, SNR fluctuations, or any combination. In some embodiments, if alternate protocols are not appropriate 618, the application keeps the "session alive" 626 via the session-stay-alive module 151 (see FIG. 1B) or the EMS-session-stay-alive module 197 (see FIG. 1D). In some embodiments, the application staggers the sessions along the route or attempts to find different routes 626.

In some embodiments, if another protocol may be appropriate (e.g., TCP, UDP, ATP, CUDP, DCCP, FCP, IL, MPTCP, RDP, RUDP, SCTP, SPX, and SST), the application sets up new redundant sessions with one or more alternate protocols 622. Subsequently, in some embodiments, the application periodically detects redundancy 612, 613 and evaluates routes 628.

In some embodiments, if redundant sessions have already been established, the application evaluates the transport layer session routes for active sessions. In further embodiments, active sessions comprise primary and redundant sessions 628. In some embodiments, the specific routing path for the sending device or system through various routers or other devices to the receiving device are detected and compared to each other to see if the active sessions are using same routes 632. In some embodiments, if different routes are being used, the application periodically detects redundancy 612, 613 and evaluates routes 628.

If the active sessions are using the different routes or routing paths 632, it is advantageous to find alternate routing paths that are more favorable. In some embodiments, the application analyzes the routes for active sessions and save similar routes in one or more routing databases. In some embodiments, the application modifies the "IP Tables" within a device or on one or more servers of the EMS. In other embodiments, the application requests the gateway serving the device or system to route the session through though alternate routes 636, 638 and re-route unfavorable sessions.

In some embodiments, there are alternate end points available that provide advantageous routes 642, 644. For example, in some embodiments, if the receiving end is an EMS, there is another EMS available. In some embodiments, if the receiving end is one server of an EMS and the response of the server is slow, there are one or more other servers of the EMS that are available for setting up redundant sessions. In some embodiments, if the receiving end is a user's communication device, there are other devices in the same location that are available for setting up redundant transport layer sessions.

Figure 7:
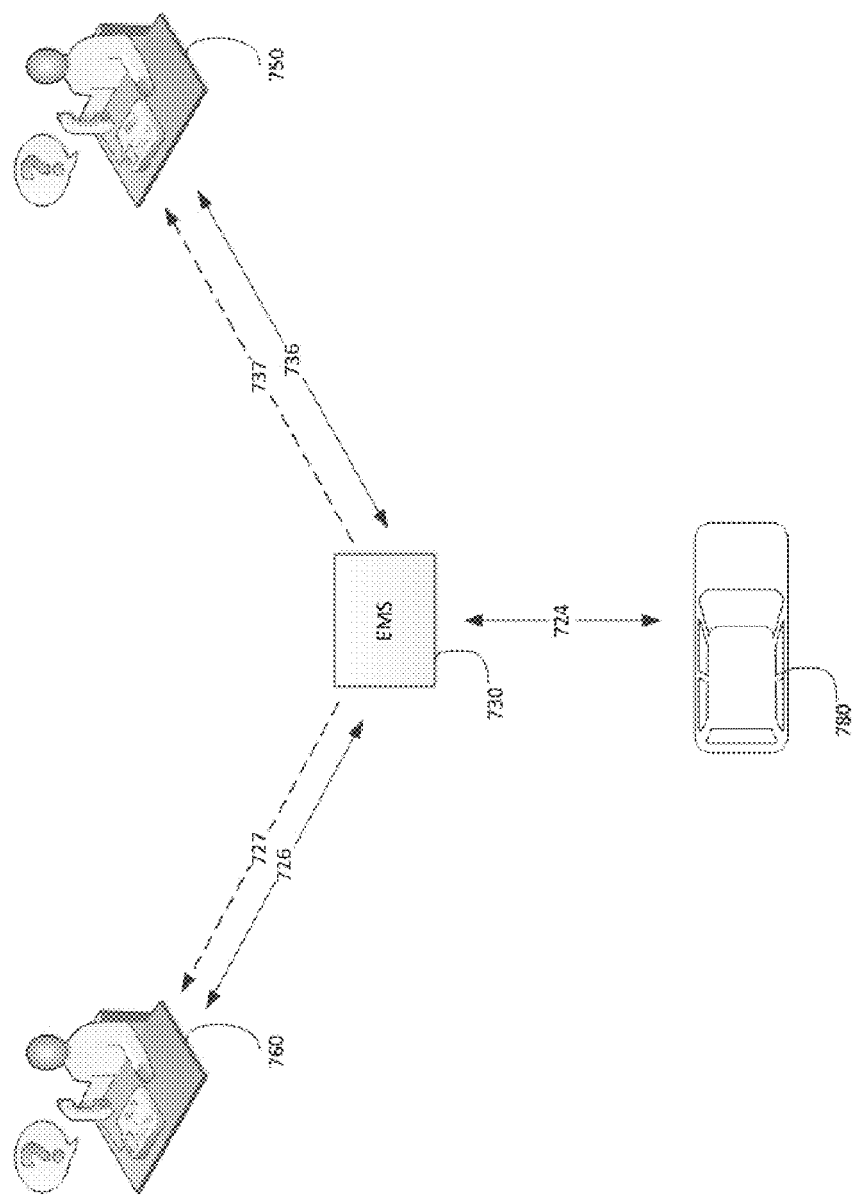
FIG. 7 is a schematic diagram illustrating a communications being transferred from a first EDC to a second EDC by an EMS as the device travels from the jurisdiction of the first EDC into the jurisdiction of the second EDC.

FIG. 7 is a schematic diagram illustrating one embodiment of a communication session being transferred from a first EDC to a second EDC by an EMS as the device travels from the jurisdiction of the first EDC into the jurisdiction of the second EDC. In this embodiment, a user traveling in a vehicle 780 is experiencing an emergency and decides to send an emergency alert or request to an EMS 730 using his communication device. An emergency communication session 724 is established between the user communication device and the EMS 730. In some embodiments, the communication session 724 comprises multiple transport layer sessions. When the EMS first receives the emergency alert, the emergency alert comprises location information (e.g. GPS coordinates from the communication device). Using this information, the EMS acts as an intermediary between the user communication device and a local EDC 760 that is responsible for the jurisdiction in which the communication device is located based on the location information included in the emergency alert. The EMS forwards the emergency alert and relevant information 727 to the EDC 760, and then establishes two-way communications 726 with the EDC to keep the EDC apprised of the emergency situation. The vehicle 780 continues moving during the course of the emergency communication session and eventually exits the jurisdiction of the first EDC 760 and enters the jurisdiction of a second EDC 750. The EMS is periodically requesting and/or receiving location information from the user communication device via the emergency communication session 724 and determines that the user communication device has changed jurisdictions from the first EDC 760 to the second EDC 750. Accordingly, the EMS transfers communications 726 with the first EDC 760 to the second EDC 750 by first forwarding the emergency alert 737 to the second EDC 750. Next, the EMS and EDC establish two-way communications 736 to keep the EDC up-to-date with the developing emergency situation. In some embodiments, the EMS 530 sends the EDC 560, 550 all relevant information collected during the emergency communication session and dynamically sends additional information as it is obtained (e.g. sends in real-time).

Figure 8:
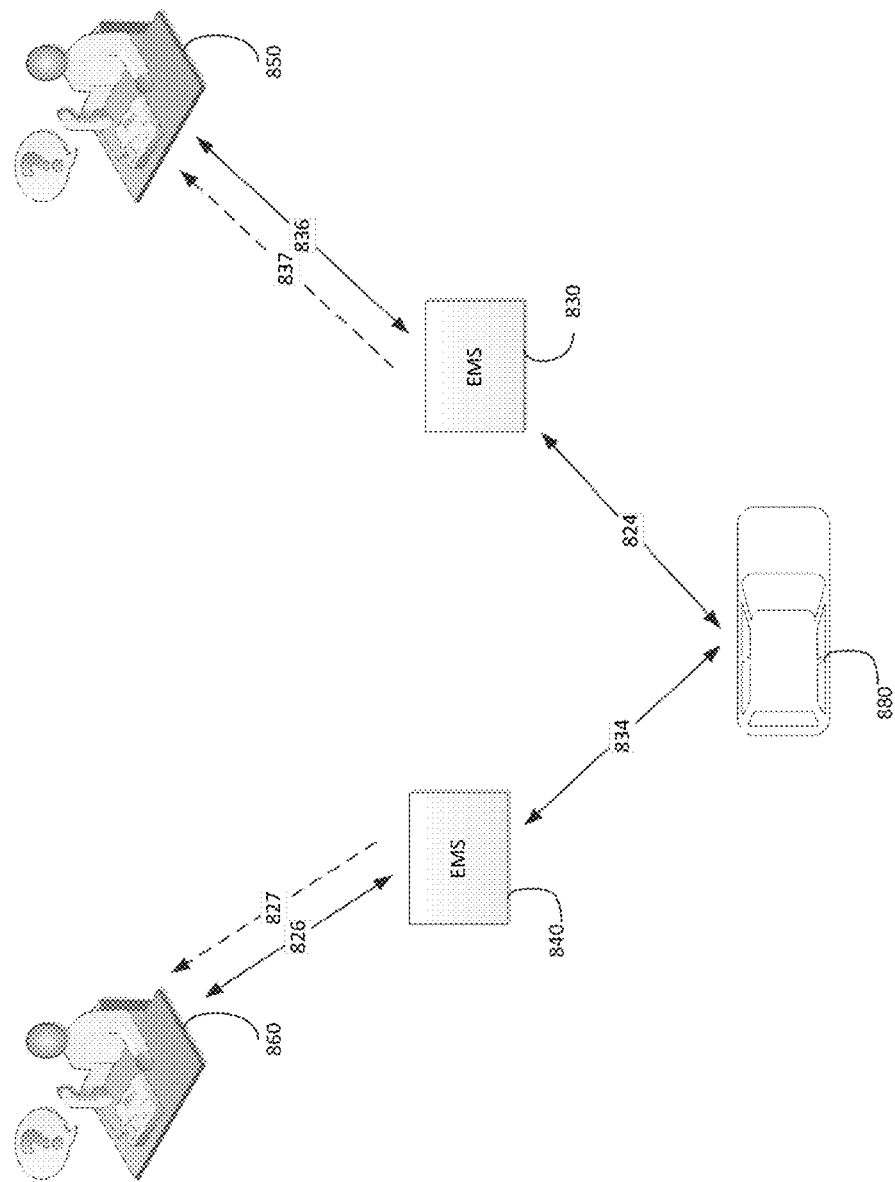
FIG. 8 is a schematic diagram illustrating a communication session being transferred from a first EMS server associated with a first EDC to a second EMS server associated with a second EDC as the device travels from the jurisdiction of the first EMS and EDC into the jurisdiction of the second EMS and EDC.

FIG. 8 is a schematic diagram illustrating one embodiment of a communication session being transferred from a first EMS 840 to a second EMS 830, each of which is associated with a different EDC 860, 850, as the device travels from the jurisdiction of the first EMS 840 and EDC 860 into the jurisdiction of the second EMS 830 and EDC 850. In this embodiment, a user traveling in a vehicle 880 is experiencing an emergency and decides to send an emergency alert or request to an EMS 840 using his communication device. An emergency communication session 834 is established between the user communication device and the EMS 840. In some embodiments, the communication session 834 comprises multiple transport layer sessions. When the EMS 840 first receives the emergency alert, the emergency alert comprises location information (e.g. GPS coordinates from the communication device). Using this information, the EMS 840 acts as an intermediary between the user communication device and a local EDC 860 that is responsible for the jurisdiction in which the communication device is located based on the location information included in the emergency alert. The EMS 840 forwards the emergency alert and relevant information 827 to the EDC 860, and then establishes two-way communications 826 with the EDC 860 to keep the EDC apprised of the emergency situation. The vehicle 880 continues moving during the course of the emergency communication session and eventually exits the jurisdiction of the first EMS 840 and its associated EDC 860, and enters the jurisdiction of a second EMS 830 and its associated EDC 850. The first EMS 840 is periodically requesting and/or receiving location information from the user communication device via the emergency communication session 834 and determines that the user communication device has changed jurisdictions from the first EMS 840 to the second EMS 830. Accordingly, the EMS 840 transfers the communication session to the second EMS 830. Next, the second EMS 830 forwards the emergency alert 837 to the associated EDC 850. The second EMS 830 then establishes two-way communications 836 with the second EDC 850 to keep the EDC 850 up-to-date with the developing emergency situation. In some embodiments, the second EMS 830 sends the second EDC 850 all relevant information collected during the emergency communication session and dynamically sends (e.g. sends in real-time) additional information as it is obtained via the two-way communication link 836.

Figure 9:
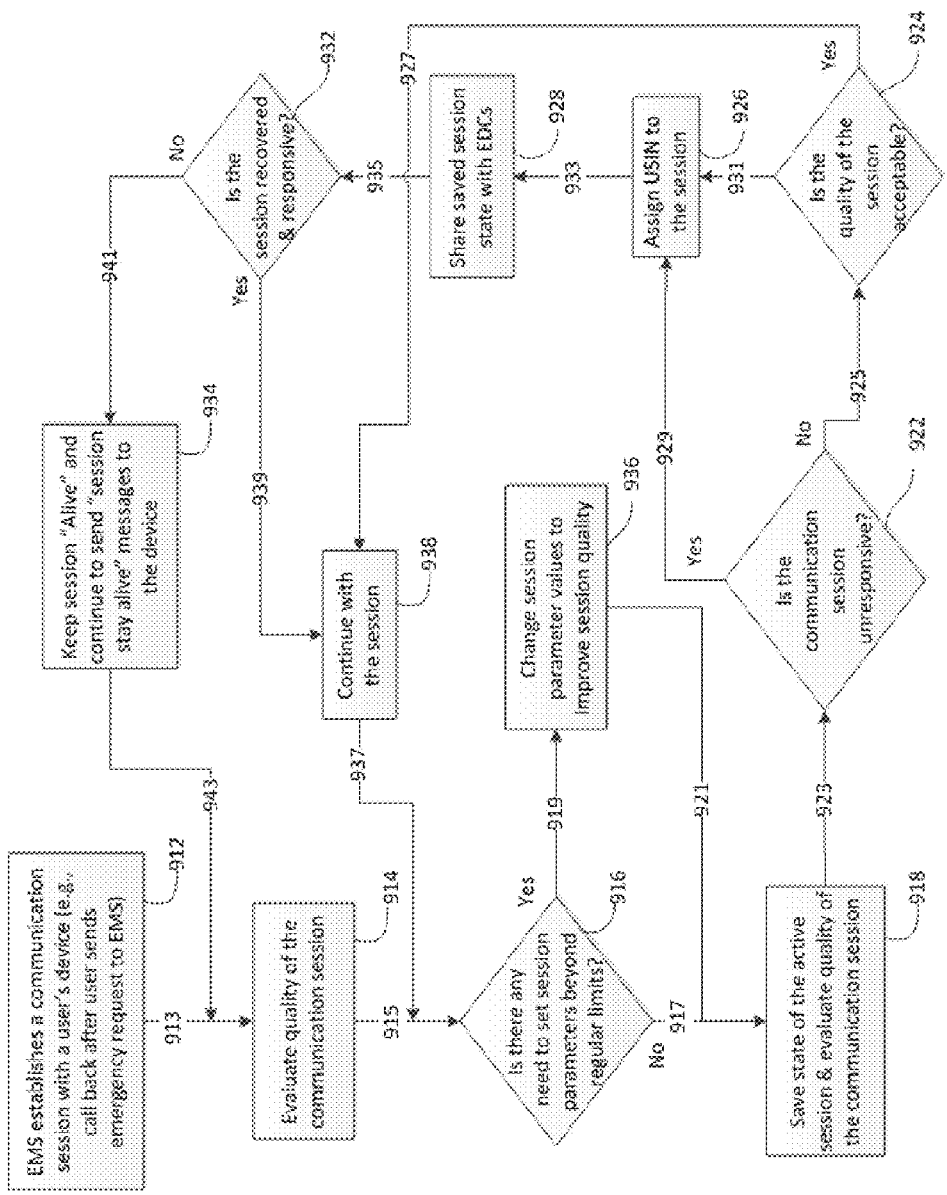
FIG. 9 is a flow chart illustrating one embodiment of how a device or server (e.g. EMS server) maintains a communication session by changing session parameter values.

FIG. 9 is a flow chart illustrating one embodiment of a device or system (e.g. EMS or EMS server) maintaining a persistent communication session by keeping it "alive" through periods of poor data flow quality. In this embodiment, the device or EMS establishes a communication session with an end device or system 912. In some embodiments, the communication session 912 comprises one transport layer session. In other embodiments, the communication session 912 comprises multiple transport layer sessions. The device or EMS then evaluates the quality of the communication session 914, for example, by evaluating each transport layer session in the communication session against one or more performance benchmarks. The device or EMS next determines whether session parameters need to be set beyond regular limits (e.g. industry standard parameter settings) 916. In some embodiments, the device or EMS determines session parameters need to be set beyond regular limits when the data flow quality fails one or more performance benchmarks. As an example, in one embodiment, the device or EMS determines session parameters need to be set beyond regular limits when the data flow quality fails a performance benchmark comprising a retransmission timeout threshold of about 10% for at least 100 segments or packets. If the device or system determines session parameters need to be modified 919, then the session parameters are set beyond the regular limits (e.g. retransmission timeout threshold is changed from 5 to 50) to improve session persistence 936 (e.g. avoid disconnection due to low data flow quality). Next, the session state of the communication session is saved, and the quality of the communication session (e.g. data flow quality) is evaluated 918. If the communication session is responsive 925, then the device or EMS determines whether the quality of the communication session is acceptable 924. If the quality of the communication session is acceptable 927, then the communication session continues, and the process repeats starting with again evaluating the need for setting session parameters beyond regular limits 916. Conversely, if the quality of the communication session is not acceptable 931, then the communication session is assigned a USIN 926. In some embodiments, a USIN is assigned to the communication session at the beginning when the communication session is established. Next, the saved session state is shared with at least one other device or EMS 928. In some embodiments, in the case of a device, the device attempts to share the saved session state with another device, for example, another communication device in physical proximity. In other embodiments, in the case of a EMS (e.g. EMS or EMS server), the EMS attempts to share the saved session state with another system such as an EMS server or EDC to ensure the session state is available and ready to be used if and when the end device becomes responsive and/or recovers from the low data flow quality. If the communication session becomes responsive again and/or has acceptable quality 939, then the communication session continues 638. Conversely, if the session has not recovered 941, then the device or system maintains the communication session (e.g. does not disconnect the session because the session parameters have already been modified to prevent disconnection during periods of poor data flow) and periodically sends session stay alive messages to the end device or system 934. The process then repeats as the device or EMS evaluates the quality of the communication session 914.

In some embodiments, the device or EMS determines the quality of the communication session is acceptable 927 even when the data flow quality is low. For example, in some embodiments, a user is requesting emergency assistance via a communication device while located far from the nearest cell tower. As a result, the user communication device has low data flow quality. Because there is no alternative routing path (e.g. no other cell towers around), it is better to maintain the communication session despite high latency, percentage of lost packets, or retransmission timeouts than to disconnect the communication session altogether. Accordingly, in some embodiments, the device or EMS determines that the quality of the communication session is acceptable 927 even though the data flow quality is low.

Figure 10:
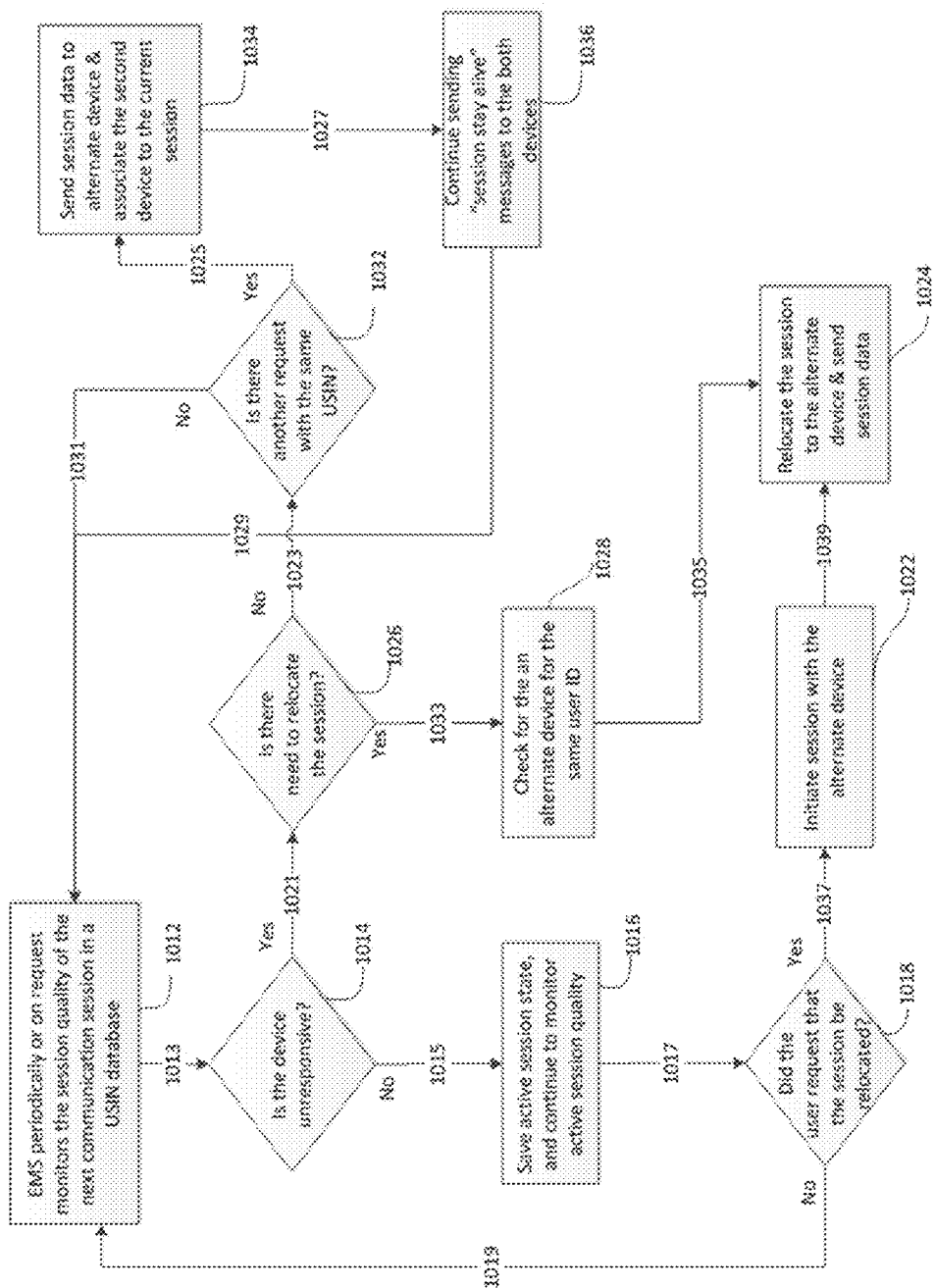
FIG. 10 is a flow chart of an embodiment of a process by which an EMS is able to successfully able to transfer an active Transport layer session to another device serving the same request for emergency assistance.

FIG. 10 is a schematic diagram of one embodiment of an EMS software application 180 of an EMS 130 (See FIGS. 1C, 1D & 1E). In some embodiments, when a user sends a request for emergency assistance, the software application 180 initiates a communication session between the EMS and the communication device (also referred to as the first device). In further embodiments, if the first device becomes unresponsive during the emergency, the application relocates the session to an alternate device 1024 (also referred to as the second device).

In some embodiments, the EMS periodically monitors the session quality of a particular communication session 1012. In other embodiments, the EMS monitors the session quality of a particular communication session 1012 upon specific request by a communication device or the EDC. In some embodiments, communication sessions are collected in a USIN database. In further embodiments, the USIN database comprises a database of active communication sessions being served by one or more servers of the EMS.

In some embodiments, the application checks if the first device participating in the communication session is unresponsive 1014. If the first device is responsive, the active session state is saved and the quality of the active sessions is monitored 1016.

In some embodiments, the application checks for a request from the user of the communication device to transfer the session to an alternate device 1018. In further embodiments, if there is no such request, the EMS waits for a predefined period of time before again checking the session state of the next session in the USIN database 1012.

In some embodiments, if there is a request from the user of the communication device to move the session to a second device 1018 then the EMS adds the second device to the communication session 1022. In some embodiments, a USIN or user ID is used as a search query to locate a communication session. In some embodiments, the session is relocated to the second device 1024. In some embodiments, the second device is associated with the user prior to the establishment of a communication session. In other embodiments, the second device is not associated with the user prior to establishment of a communication session.

In some embodiments, if the device is unresponsive 1014, then the EMS checks to see if there is need to transfer the session because of the session conditions 1026. In further embodiments, if the EMS decides the session needs to be transferred, then the EMS looks for an alternate device to move the session to 1028 and, after locating an alternate device, the EMS relocates the session to the alternate device 1024.

In some embodiments, if there is no need to transfer the session 1026, the EMS checks to see if there is a request from another device that is associated with the same USIN 1032. In some embodiments, if there is no such request, then the EMS waits for a predefined period of time and return to checking the session state of the next session in the USIN database 1012.

In some embodiments, if there is another session with the same USIN 1032, the EMS sends the saved session data to the alternate or second device. In some embodiments, the application associates the meta-data from the second device to the meta-data from the original or first session assigned the same USIN 1034.

In some embodiments, the sessions with the first and second devices are kept "Alive" via the keep session alive module. In some embodiment, the application keeps the sessions associated with the same USIN by sending periodic "keep session stay alive" messages 1036 and then the returns to checking the session state of the next session in the USIN database 1012.

Figure 11:
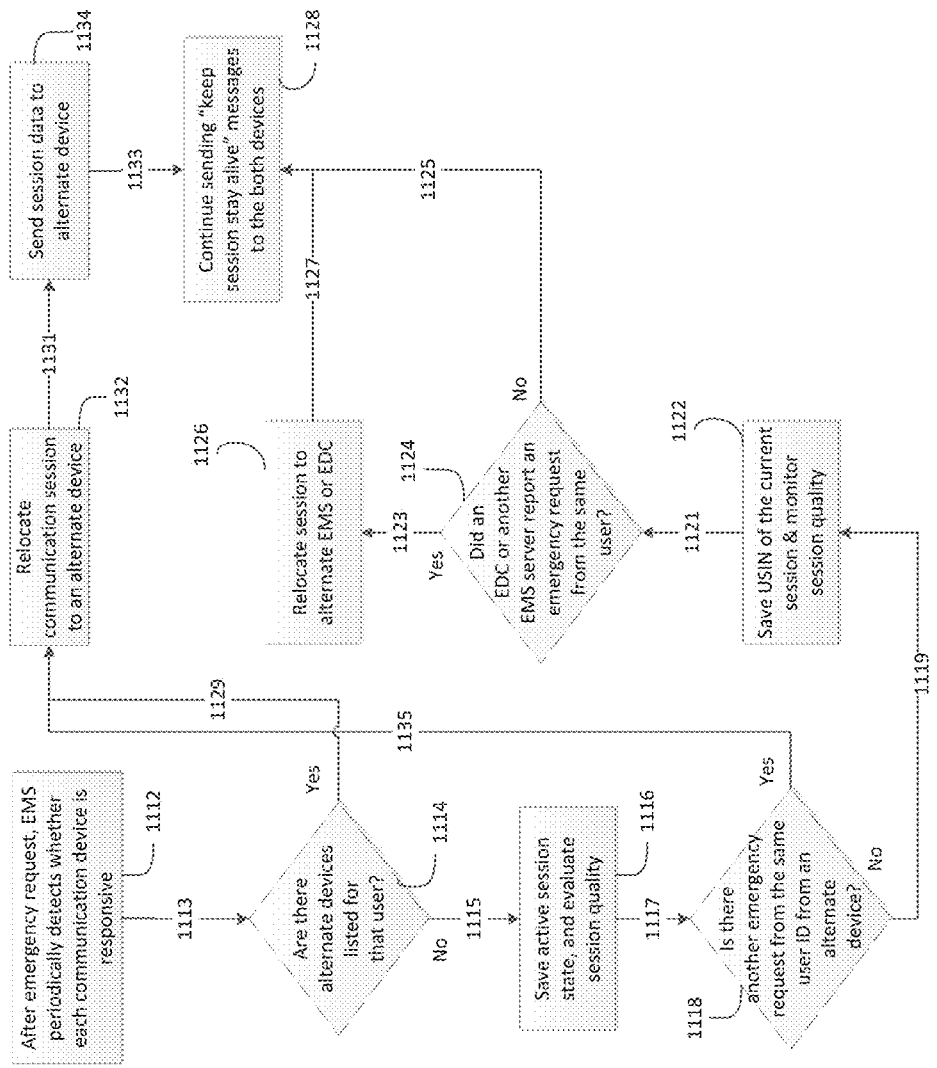
FIG. 11 is a flow chart illustrating one embodiment of a process by which an EMS is able to successfully transfer an active Transport layer session to another device using the User ID as the identifier of the sessions.

FIG. 11 is a schematic diagram of one embodiment of an EMS software application 180 of an EMS 130 (See FIGS. 1C, 1D & 1E). In some embodiments, when a user sends a request for emergency assistance, the software application 180 initiates a communication session between the EMS and the communication device (also referred to as the first device). In further embodiments, if the first device becomes unresponsive during the emergency, the application relocates the session to an alternate device 1132 (also referred to as the second device). In some embodiments, the EMS is able to successfully transfer an active transport layer session to another device using the User ID as the identifier of the sessions.

In some embodiments, after emergency requests are sent and communication sessions are initiated by the emergency module, the application 180 periodically monitors the active sessions. In some embodiments, the application checks if each communication device which is participating in a communication session is responsive 1112. In further embodiments, if the device is not unresponsive, the application checks for alternate devices such as mobile phones, laptops, etc., that are listed for that user or user ID 1114. In yet further embodiments, if an alternate device is listed, the application initiates a communication session with that alternate or second device and relocates the session to that device 1132. In still yet further embodiments, the application sends the session data or the session state to the alternate or second device (act 1134).

In some embodiments, the EMS periodically checks for responsiveness of the sessions that are actively in progress, by checking for ACK time-outs, retransmission tries, packets in error and so on, and detects if a certain session has a communication device that is not responding, and not sending messages or providing responses to packets sent to the device 1112. In some embodiments, the EMS checks for an alternate device, for example a laptop or a tablet, listed for the user in the user profile at a database at the EMS 1114, 1116. In some embodiments, if there is an alternate or second device, then the EMS sets up a communication session with the second device 1132 and assigns session settings to the new session, for example transmission window size, packet size, sequence number being served, TTL, and whether the TLS was being employed. In some embodiments, the EMS sends the session settings to the secondary device 1134 while sending "keep-alive" messages to the first and second device on a periodic basis 1128. In some embodiments, the application saves the current session state (e.g., window size, packet size, sequence numbers currently being served, highest sequence number for which an ACK packet was sent and other session parameters).

In some embodiments, if no alternate or second device is listed 1114, then the EMS saves the active session state and continues to sense the transport layer session quality 1116. In some embodiments, the EMS checks if there is a new session from a different device but with the same User ID 1118. In some embodiments, the EMS sets up a transport layer session with the second device, assigns the session settings to the new session, and sends the session settings to the second device 1132, 1134 while sending "keep-alive" messages to the first and second device on a periodic basis 1128.

In some embodiments, if there is no communication session associated with the same User ID, the EMS saves the unique USIN of the session 1122 and shares the session USIN with other EMSs and EDCs. In some embodiments, the application checks to see if other EMS or EDC have reported a session from the same User ID 1118. In further embodiments, if another EMS or EDC reports the call, then the EMS relocates the session to the EMS or EDC that reports the call 1126. In some embodiments, if there is no communication session associated with the same User ID (e.g. user login) reported by another EMS or EDC 1126, then the application sends the session settings to the second device 1126 while continuing to send "keep session alive" messages to the second device on a periodic basis 1128. In some embodiments, the application periodically monitors the devices that have initiated emergency requests until the emergency situation is resolved. In some embodiments, an emergency situation is resolved when emergency response personnel arrive at the emergency site and make contact with a user who is party to an emergency communication session.

TABLE 1

| Exemplary TCP session parameters | | | | |
|---|---|---|---|---|
| Number of retries | Window size (bytes) | Packet size (bytes) | Time-to-live TTL (hops) | Time-out (seconds) |
| Min 3 | 2 | 25 | 1 | 0.3 |
| Max 15 | 65,535 | 65,535 | 255 | 3 |
| Typical 5 | 250 | 1500 | 64 | 240 |

Table 1 shows exemplary Transmission Control Protocol (TCP) session parameters for a communication session. In some embodiments, TCP session parameters are a part of session data sent to a second device by a session data module. In some embodiments, the session parameter values are set to remain between an industry-accepted range, such as the IETF standards. As shown, in some embodiments, the session parameters include number of retries, window size, packet size, time-to-live (TTL) and time-out. In other embodiments, the session parameters comprise RTT, time-to-live (TTL) for packet size, re-transmission timeouts, clear channel assessment (CCA) delay, re-transmission counts, jitter buffer length, or any combination thereof.

Typically, values are set by default by the transport protocol and are used as initial settings. For example, in some embodiments, a TCP implementation comprises initiating a session using default values and tune the parameters as the session progresses. The TCP implementation generally tunes the session parameters to the quality of the route that is being used by the transport layer session. In some embodiments, when an EMS is connected to a communication device via a route, the protocol saves the session settings (e.g. as part of a session state) in a database in a first device. In further embodiments, if the session is transferred from a first device to a second device, the EMS sends the saved session settings to the second device, which enables a session to be setup with initial settings that are much closer to the optimal conditions for the likely route from the second device to the EMS, thereby allowing for quicker session tuning and lower probability of a session disruption because of TCP session tuning during the setup.

Additional Embodiments for Robust Communication

In one aspect, provided herein is a method for facilitating a robust communication link between a user communication device and a communication device of an EMS, the method comprising: (a) establishing a multitude of data communication links, defined at one of an application layer of the user communication device or at a Transport layer of the user communication device, between the user communication device and a first communication device of a EMS, the user communication device and the first communication device being capable of setting up and receiving data communication connections including one or more of a packet switched connection, an analog communication connection, or a circuit switched connection, the first communication device being able to host the multitude of data communication links at one of an application layer or a Transport layer, one of multiple data communication links having a same Transport layer protocol or multiple data communication links having different Transport layer protocols; (b) responsive to detection that a primary data communication link established between the user communication device and the first communication device is not responsive to messages from the user communication device, utilizing a second data communication link that is pre-established with the first communication device for continuing communication between the user communication device and the first communication device; (c) periodically checking status values of key channel parameters of the data communication links including one or more of throughput, goodput, latency of sent messages between end devices, probability of transmission error, or congestion on the end-to-end pathway, and reporting the status values of the key channel parameters to the application layer of the user communication device and/or first communication device; (d) based on the status values of the key channel parameters, making a decision whether to continue communication between the user communication device and the first communication device on the primary data communication link or to move the communication to the second data communication link; and (e) actively monitoring status values of the key channel parameters of the multitude of data communication links and reporting these values to the application layer of the user communication device and/or first communication device. In further embodiments, the multitude of data communication links are established via setting up of multiple sockets, each socket with a unique port address, and each socket being from one of the same Transport layer protocol or a different Transport layer protocol as each other socket of the multiple sockets. In further embodiments, the user communication device is one of a mobile wireless device and a tablet computer.

In another aspect, provided herein is a method for selecting a communication channel at a user communication device, the method comprising: (a) maintaining a list of possible communication mediums available to the user communication device and statuses of the possible communication mediums, the statuses of the possible communication mediums being one of active and able to send messages or in-active and unable to send messages; (b) based on values of channel parameters of the possible communication mediums, the channel parameters being one or more of throughput, goodput, latency of sent messages between end devices, probability of transmission error including one of a packet error on a digital channel or the probability of a analog signal being distorted in transmission on an analog channel, congestion on the end-to-end pathway, and a received signal strength indicator (RSSI), determining a one of the possible communication mediums to be used as a primary communication channel to be used for initializing and maintaining a multimedia call between the user communication device and a first communication server of a emergency management system (EMS); (c) maintaining a priority list of the possible communication mediums; (d) keeping a set of the possible communication mediums alive in as secondary communication channels for communication between the user communication device and the emergency management system and maintaining a list of the secondary communication channels; (e) responsive to detecting that the primary communication channel is unresponsive to messages being sent between the user communication device and the first communication server, choosing a secondary communication channel as a new primary communication channel and continuing communication between the user communication device and the first communication server over the new primary communication channel; (f) making the primary communication channel one of the secondary communication channels in the list of secondary communication channels; (g) periodically sensing and reporting the values of the channel parameters to the user communication device and to the first communication device; and (h) updating the list of possible communication mediums based on values of the channel parameters and prioritizing the list based on the values of the channel parameters. In further embodiments, the messages include one of multimedia messages including one or more video, pictures, voice over Internet Protocol, and MMS, or non-multimedia messages including one or more of voice over analog channel or SMS messages In another aspect, provided herein is a user mobile communications device configured to detect an indication for emergency assistance from a user, the user communications device comprising: a user interface, a communications module configured to send and receive messages over a multitude of communication channels and networks, a location determination module, a processor, and instructions executable by the at least one processor to create a software application for managing emergency communications comprising: (a) a location determination module receiving an indication of the location of a user communications device; (b) a communication module establishing a communication session comprising: generating a primary data communications link to an emergency dispatch center via an emergency management system and generating multiple secondary data communication links to the emergency management system; transferring an active call from a primary data communication link to a secondary data communication link if such a need arises; and receiving a real-time response from the emergency management system to a request for emergency response.

In another aspect, provided herein is an emergency management system (EMS) containing a communications system comprising: at least one first input/output (I/O) system configured to receive a request for assistance from a user communication device over a multitude of data communication links being one of a same or a different transport protocol; a communications module configured to send and receive messages over a multitude of communication channels and networks; and at least one processing unit in communication with the at least one first I/O system and configured to: (a) receive an indication of the request from the at least one first I/O system and interpret meta-data transmitted from the user communication device; (b) establish a primary data communications link to the user communication device using preferred transport protocols; (c) establish a multitude of secondary data communication links to the user communication device; (d) detect individual messages out of a sequence of messages sent over a multitude of transport layer connections from the user communication device and combine them into a single message for the emergency dispatch center; (e) transfer an active call from a primary data communication channel to a secondary data communication link if such a need arises; (f) determine, based upon knowledge of capabilities of a plurality of emergency dispatch centers and based upon a location of the user communication device, an emergency dispatch center that is equipped to receive the alert and communicate the alert to the emergency dispatch center in a format the emergency dispatch center is capable of receiving the alert in; and (g) actively manage the data communication links between the emergency dispatch center and the user communication device.

In another aspect, provided herein is a method for facilitating reliable and persistent communication between a user of a wireless or wired user communication device, for example, a cellular phone, and an Emergency Management System (EMS), which in turn communicates said information from the user communication device with the communication device of an emergency dispatch center (EDC), for example, a server, a public call exchange, or a wired or wireless communication device, placed at the EDC, either via one end-to-end data communication channel or analog channel or multiple simultaneous channels. The method comprises setup and maintenance of multiple data communication links between the user communication device and the emergency management system (EMS) via setting up a multitude of socket connections at the Transport layer of the communication devices, for example, by setting up multiple TCP socket connections between the communication devices or by setting up multiple UDP connections between the two devices. These connections each use a different port at each of the communication devices and hence are identifiable at each device as a separate connection. The user communication device is able to detect if one main Transport layer connection is being non-responsive, and responsive to detecting the one main Transport layer connection being non-responsive, to move the packet flow between the communication devices to a second Transport connection. Upon detecting that the second Transport connection is not being responsive the user device is configured to move the packet flow to a third connection and so on until all available Transport layer connections are tried to send packets between the end devices. Further, the method includes periodically checking quality or reliability parameters of each Transport connection, for example, round-trip delay (RTT) or throughput (S), and based on measurement of these parameters making a decision regarding which of the Transport layer connections is more suited for sending of the packets between the end devices. In some embodiments, the end devices employ hypertext transfer protocol (HTTP) to generate and transmit messages to instruct the Transport layers in sending various emergency response messages between the end devices. In some embodiments, the end devices employ real-time protocol (RTP) to generate and transmit messages to instruct the Transport layers in sending various emergency response messages between the end devices. In some embodiments, the communication channel between the end devices is a digital packet only channel. In some embodiments, the communication channel between the end devices is an analog circuit switched channel. In some embodiments, the communication channel between the end devices employs both digital packet channels and analog channels.

In another aspect, provided herein is a method for selecting a communication medium, either as a primary communication channel, or as an alternate secondary communication channel when the primary channel is unresponsive to providing communication connection between the end devices, and associated algorithms for sending digital data packets, or analog signals, between the end communication devices. The selection includes the selection of the physical medium, whether the medium be a wired or wireless medium or a digital channel or analog channel. The selection is performed based on channel parameters such as throughput, goodput, latency of sent messages between end devices, probability of transmission error, for example, a packet error on a digital channel or the probability of a analog signal being distorted in transmission on an analog channel, congestion on the end-to-end pathway and other such parameters of the communication channels. Based on the selection, the appropriate medium is chosen for sending analog signals, for analog communication systems, or digital packets, for data communication channels, between the two end communication devices. The method further includes periodically reporting the channel parameters of the primary channel and all other secondary channels, and a list of channels that are setup for communication but are not in active communication, to the end devices so that a decision can be made before or during the active communication session to change the primary communication channel to one of the secondary channels whose instantaneous channel parameters are most suited for the end-to-end communication between the communication devices. In some embodiments the primary communication channel is a data communication channel, for example, a packet switched channel and the secondary communication channel is one of a analog communication channel or a digital communication channel that is not packet switched, for example, a circuit switched communication channel or any other type of communication channel or a combination of secondary communication channels. In some embodiments the primary communication channel is a digital communication channel, for example, a circuit switched communication channel and the secondary communication channel is one of a analog communication channel or a digital communication channel that is not packet switched channel, for example, a circuit switched communication channel or a combination of secondary communication channels. In some embodiments the primary communication channel is an analog communication channel and the secondary communication channel is one of a data communication channel, for example, a packet switched channel or a digital communication channel that is not packet switched, for example, a circuit switched communication channel or any other type of communication channel or a combination of secondary communication channels.

Additional Embodiments for Session Persistence 1

Modern user communication devices, for example, smart phones, are often equipped with a variety of capabilities providing for communicating over voice and data communication channels. Many modern user communication devices can use VoIP technology to make voice calls over data channels including calls made to a dispatcher at an EDC in case of an emergency situation. When a mobile user communication device, for example, a cellular phone, makes a VoIP call to an EDC, for example, a public safety answering point (PSAP), there are sometimes changes in the channel condition while the call is in progress, especially as the mobile communication device moves from one location to another, and resultant changes in call quality and device responsiveness, both at the mobile user communication device and EDC. This can result in session management signals, for example, an acknowledgement "ACK" to be delayed beyond a certain time-interval, and hence the session to be discarded. There are mechanisms in communication protocols, for example, TCP, to allow several attempts for devices to ACK reception of a packet or packets, aka "retransmissions," and there are provisions to allow each of these to be over a certain time-interval, aka "time-outs". However, in many instances, these mechanisms are not sufficient, either because of the configuration values, for example, the session time-outs interval, or because of the abilities provided by the algorithm in the protocol itself to keep a data communication session active when faced with adverse channel conditions. Further, in certain instances, users, using their user communication devices, who are calling to report an emergency situation may be in areas with low wireless signal power, i.e., signal to noise ratio (SNR), and hence the time-intervals for ACKs and retransmissions of data packets may be longer and, in some instances, greater than the allowable times as defined by the session management parameters of the Transport layer protocol, for example, TCP, that is managing the data communication session. Similar situations exists for a vast majority of data channels where the SNR fluctuates, and hence where there may be a high level of signal for some data packets and a low SNR for others, resulting in retransmissions of those packets and, in some instances, disconnection of a communication session when too many retransmissions occur. Instances are prevalent where for a short period of time a data channel exhibits low SNR and for other times, and in many instances, a vast majority of times, the data channel exhibits high SNR. Due to the times when SNR value is low, the session management protocol may believe the session to be non-responsive and hence disconnect the session between the user communication device and an EDC or an EMS.

Historically, if a user wanted to place a request for emergency assistance from an EDC, in some instances via an EMS, the user would place a call using a land-line, for example, PSTN, and be connected to the EDC through analog channels. This is the traditional method of requesting emergency assistance. This traditional method does not allow the user to share meta-data, for example, the user's health status, location of the communication device of the user, and any other meta-data that may identify user status directly with the EDC or EMS without having to manually share this information with the EDC. Many modern user communication devices are equipped with an ability to communicate over data communication channels and send and receive multi-media data, for example, image, videos, GPS data, and other multi-media data. As a result, if a user wishes to request emergency assistance, it would be desirable for the user to have the ability to request the emergency assistance via data communication channels where the full abilities of the user communication device, for example, a mobile cellular phone may be utilized and multi-media information, for example, videos, pictures, and/or GPS data, may be shared with the EDC to facilitate a more effective and faster emergency response than when the call is placed with an analog phone. Secondly, it is desirable that there be provided an effective session management protocol to ensure that the data communication sessions stay "alive" and do not abruptly terminate due to a burst of low SNR in the channel and/or due to congestion in the data channel. Therefore, there is a need for an effective session management protocol to effectively manage data communication sessions, including data communication sessions hosting VoIP calls for emergency response, and to maintain the data communication session over an unresponsive channel resulting from channel errors, channel congestion, low SNR or any other reason, and to keep the data communication session parameters active to immediately start the data transfer, without user input, when the channel becomes responsive again.

Given the ability of modern user communication devices, for example, smart phones, tablets, and wearable devices, to communicate over data communication channels that may be wired or wireless and that may be point-to-point or be end-to-end channels, given that the signal quality and/or RTT of the data communication channels may fluctuate, given the desire of users to use these data communication channels to send requests for emergency assistance, including messages containing the current geographic location and meta-data about the user's health status, to an EDC, in some instances via an EMS, and to share multi-media information, for example, videos, images, GPS location, and other pertinent multi-media information, and given the increasingly widespread use of modern user communication devices, provided herein is a method and a system to effectively manage these data communication sessions such that the sessions stays "alive" over temporary degradations in channel quality and that session parameters, for example, session time-outs, retransmission timers, RTT, re-sequencing of packets and frames at the receiver, jitter buffer, and/or other session parameters, are adjusted to suit the current channel conditions of the data channel over which the request for emergency communication is sent and the session state is maintained until the devices are in communication again or until the need for communication between the user communication device and the EDC or EMS is no longer required. Further, provided herein is a system and method wherein an EDC and/or EMS maintains the identity, authenticating status including login information about a user communication device, meta-data identifying the home location of a user, user health information, GPS location information, GPS location of last contact, movement pattern and direction information, location information manually input by the user in the user communication device and/or any other form of location information, and has the ability to share this information with other EDCs and/or EMS on a periodic basis such that when the user communication device is again in communication with the EDC a data communication session does need to be established with the user communication device. This sharing of information between EDCs and/or EMSs would also provide for a user communication device establishing communication with another EDC or EMS that was not serving an original or most recent request for emergency assistance to be able to immediately transfer data packets to the EDC or EMS, without the need to first establish a data communication session. Further, in case of an emergency situation, provided herein is a method for providing access to the time-stamps of all the times the data communication session underwent a distortion in quality of the session such that the data communication session would have been discontinued if an algorithm was not in place to persist the session over a distorted channel, for example, with standard industry session management parameters, and this information be stored on one or more servers hosted at one or more EDCs and/or EMSs that were part of the response to the request for emergency assistance received from a user communication device. Various aspects and embodiments disclosed herein include methods and systems which fulfill one or more of these needs and desires.

In accordance with one aspect, provided herein is a method referred to herein as session stay alive (SSA) for a user communication device. The user communication device may be either a client device, for example, a mobile cellular device, or a server device, for example, a telephone exchange or a VoIP server, for example, a SIP Proxy or a communication router. The method provides for the user communication device to change the settings of a data communication session by changing values of session parameters, for example, RTT, time-to-live (TTL) for data packets, re-transmission timeouts, clear channel assessment (CCA) delay, re-transmission counts, jitter buffer length, and/or any other session state variable in a data communication session to values that are beyond the standard acceptable limits for industry designed equipment, or to change these values on an as-needed basis at a router, server, and/or end device in a fashion that is normally not acceptable or allowed in an industry standard communication device, for example, by not decrementing the TTL value for a data packet at a communication router, to enable the communication session to persist over a temporary degradation in channel quality in a scenario where otherwise the communication session would be disconnected in an industry standard communication device with industry allowable communication session settings. In some embodiments, when a user communication device requests emergency assistance from an EDC, in some instances via an EMS, the EDC and/or the EMS maintains the identity information of the user of the user communication device, authenticating status of the device including any authentication information including login information or identifying keys, for example, encryption keys for public key private key infrastructure (PKI) or SSA or RSA hash keys, meta-data identifying the home location of the user communication device, user health information, and/or any other form of location information. The EDC and/or EMS maintains the session with this identifying information about the user, such that as the user communication device reestablishes communication with the EDC, a data communication session does need to be established for transfer of data packets between the devices, and the user communication device is able to immediately transfer data packets to the EDC and/or EMS. In some embodiments the EDC and/or EMS maintains a database of the time-stamps of when the data channel quality, for example, SNR levels or RTT delays due to congestion, reached an unacceptable value, also referred to as unacceptable channel quality level (UCQL), and as a result the times the data communication session underwent an associated distortion in quality that would have resulted in termination of the session under standard and permissible session operation settings, as defined by industry accepted standards for communication devices, i.e., with standard industry session management parameters, and where an algorithm, for example, SSA, was not in place to persist the session over a temporary distortion in the channel. This time-stamp information may be stored on one or more servers hosted at any one or more EDCs and/or EMSs that took part in a response to the request for emergency assistance received from the user communication device.

In some embodiments the user communication device and/or the servers at the EDC and/or EMS host an application client and send and receive data packets via this application client, including requests for emergency assistance to an EDC and/or an EMS. The application client manages the connection between the user communication device and the EDC and/or EMS, including maintaining the communication session over UCQL time-intervals. In some embodiments, the EDC and/or EMS shares the identity information, authenticating information, meta-data identifying the home location, user health information, and/or any other form of location information of the user and/or the user communication device, and may also share the UCQL time-stamp information with other EDCs and/or EMSs on a periodic basis such that if the device establishes communication, after an UCQO interval, with another EDC and/or EMS not currently serving the request for emergency assistance the another EDC and/or EMS is able to immediately communicate with the user communication device without having to set up a data communication session. The other EDCs and/or EMSs may be selected based on location information about the user communication device. on a periodic basis, such that if the device comes back in communication, after an UCQO interval, with another EDC, or EMS, not currently serving the request for emergency assistance, the EDC, or EMS, is able to immediately communicate with the user communication device without having to setup a data communication session. In certain embodiments, the EDC and/or EMS, shares with other EDCs and/or EMSs values of session parameters, for example, RTT, TTL for data packets, re-transmission timeouts, CCA delay, re-transmission counts, jitter buffer length, and/or any other session state variable in a data communication session, that the EDC and/or EMS used to have an effective session management with the user communication device such that the data communication session did not disconnect with the device over UCQL time-intervals, and the channel quality interval for the associated session parameter settings. In some embodiments, an EDC and/or EMS assigns a unique session identification number (USIN) to the data communication session between the EDC and/or EMS and a user communication device such that the USIN can uniquely and over various EDCs and/or EMSs identify the communication session, and if a data packet is received at any EDCs and/or EMS associated with a particular USIN, the respective EDC and/or EMS is capable of continuing the communication session without having to re-authenticate or re-associate with the user communication device. In some embodiments, an EDC and/or EMS involved in providing emergency assistance for the user of a user communication device also shares various forms of user data, for example, multimedia data, including location data, videos, images, MMS, and even voice recordings and text-messages received from the user communication device in the communication session established for purpose of emergency response for the user of the user communication device. In some embodiments, the data channel between the user communication device and the EDC and/or EMS, is established and maintained using session initiation protocol (SIP) or using H.323 data channel management protocol.

In another aspect, provided herein is a method of facilitating a persistent communication session between a user communication device and a communication device of an EMS or EDC, the method comprising: (a) establishing a data communication links and a communication session including a request for emergency assistance between the user communication device and a first communication device of a EMS and/or EDC, at least one communication session parameter of the communication session defined over a range beyond a general allowable industry standard limit for the at least one communication session parameter so that the communication session is a persistent session that remains active if either of the respective communication devices or the communication channel becomes unresponsive such that a standard industry communication device or router would terminate the session; (b) responsive to determining, at one of the user communication device, a server at the EMS, a server at the EDC, or a communication router, that another communication device, communication channel, and/or communication route is being unresponsive, and that with current communication session parameter settings the communication session will be terminated, changing one or more of the communication session parameters so that the communication session persists and resumes communication responsive to the unresponsiveness of the one of the other communication device, communication channel, and/or communication route being rectified; (c) preserving a session state of the communication session and sharing information regarding the session state with another EMS and/or EDC selected by the EMS and/or EDC that is currently serving the request for emergency assistance; (d) responsive to communication between the user communication device and the EMS and/or EDC that is currently serving the request for emergency assistance being disrupted, maintaining the communication session in an active state until one of a user of the user communication device terminates the communication session or communication between the user communication device and one of the EMS and/or EDC that is currently serving the request for emergency assistance being re-established or communication between the user communication device and another EMS and/or EDC being established; (e) responsive to the user communication device one of re-establishing communication with the EMS and/or EDC currently serving the request for emergency assistance, or establishing communication with another EMS or EDC with which the values of this session parameters were shared, the user communication device resumes communicate with the respective EMS and/or EDC without having to re-authenticate or re-associate and form a new session for purpose of communication; (f) establishing a USIN uniquely identifying the communication session; (g) sharing the USIN with one or more EDCs and/or EMSs; and (h) responsive to a data packet being received from the user communication device at one of the one or more EDCs and/or EMSs with which the USIN has been shared enabling the user communication device to directly communicate with one of the one or more EDCs and/or EMSs, without first requesting that a session be established via exchange of multiple control packets. In some embodiments, the data communication links are defined at one of an application layer or at a Transport layer of one of the user communication device, a server at an EMS, a server at an EDC, or a communication router between the user communication device and a first communication device of the EMS and/or EDC. In some embodiments, the at least one session parameter includes one or more of RTT, TTL for data packets, re-transmission timeouts, CCA delay, re-transmission counts, jitter buffer length, quality of service indicator at a router, or any other session state variable in a data communication session that can be set by a communication or a routing device to effectively manage a data communication session. In some embodiments, keeping the session active keeps the session active if either of the respective communication devices is turned OFF, an UCQL of the channel fluctuates and causes packet errors, a router becomes unresponsive due to congestion and hence longer queues and packet Time-outs, communication router fails, or any other reason resulting in larger response delays, which in a standard industry communication device or router would terminate the session. In further embodiments, the UCQL includes SNR. In some embodiments, preserving the session state of the communication session includes one or more of saving the values of session parameters including one or more of RTT, TTL for data packets, re-transmission timeouts, CCA delay, re-transmission counts, jitter buffer length, quality of service indicator at a router, saving user identity information, authentication status of the user communication device including login information and any authentication information, the authentication information including one or more of encryption keys for PKI and/or SSA or RSA hash keys, or saving meta-data identifying the home location, or saving user health information. In some embodiments, the EMS and/or EDC that is currently responding to the emergency alert selects the other EMS and/or EDC based on or more of the best estimated location of user communication device, or whether or not the user communication device is unresponsive, whether or not the communication device at the EMS and/or EDC is unable to reach the user communication device. In some embodiments, the data communication session is managed by an industry defined and accepted protocol, and the control signals and session handshaking signals are defined by this industry defined protocol. In further embodiments, the data communication session is managed by one of a SIP or H 3.23 protocol. In some embodiments, the respective communication devices host an application client and communicate over data communication channels using data packets via the application client, communications sent via the application client including a request for emergency assistance sent to the EDC and/or EMS from the user communication device, the application client managing data connections between the respective communication devices and maintaining the communication session over UCQL time-intervals. In some embodiments, the EMS and/or EDC currently serving the request for emergency assistance shares UCQL time-stamp information on a periodic basis with other EDCs and/or EMSs selected based on location information about the user communication device, any EDC or EMS receiving the UCQL utilizing it to better understand the channel characteristics with the user communication device and adjust session parameters accordingly if the user communication device sends data packets to the EDC or EMS receiving the UCQL. In some embodiments, the user communication device shares multi-media information with the EMS and/or EDC currently serving the request for emergency assistance, and the EMS and/or EDC shares the multi-media information with other EMSs and/or EDCs selected based on location information about the user communication device, any EDC or EMS receiving the multi-media information utilizing it to better serve the request for emergency assistance, including pre-serving time and bandwidth by eliminating a need for the user communication device to repeat information already shared with the EMS and/or EDC currently serving the request for emergency assistance.

In another aspect, provided herein is a communication device configured to communicate over data communication channels, the communications device comprising a user interface, physical interaction components, a communications module configured to send and receive messages over a communications network, and at least one processor, and a computer program including instructions executable by the at least one processor to create a software application for managing emergency communications comprising: (a) a module keeping a communication session alive over one of time-periods when the channel is inactive or time periods when a channel and/or device is unresponsive, by changing session state variables such that interaction over the communication session can be carried out without session setup or maintenance work required to be performed when the channel becomes active or the channel and/or device becomes responsive; (b) a module preserving a session state of the communication session, save identity information of a user of the communication device, save authentication status of the communication device, and sharing information regarding the session state, user identity, and authentication status with other communication devices so the other communication devices can recreate the session state and immediately start transferring data packets with the communication device if the communication device sends data packets to the other communication devices; and (c) a module continuing an established data communication session with another communication device that is in communication with a processor of a device with which the communication session is established, the another communication device being in possession of a USIN that provides information about the session state of the established communication session, the another communication device using this USIN to continue the established data communication session without having to set up a new communication session or perform other session management activity. In some embodiments, the device establishes a communication session with one of a mobile user communications device, a server at an EMS, a server at an EDC, or a communication router. In some embodiments, the session state variables include one or more of RTT, TTL for data packets, re-transmission timeouts, CCA delay, re-transmission counts, jitter buffer length, or quality of service indicator at a router. In some embodiments, preserving the session state of the communication session includes saving the values of session parameters including one or more of RTT, TTL for data packets, re-transmission timeouts, CCA delay, re-transmission counts, jitter buffer length, or quality of service indicator at a router. In some embodiments, the authentication status includes one or more of login information, authentication information including one or more of encryption keys for PKI or SSA or RSA hash keys, or meta-data identifying the home location and/or user health information. In some embodiments, the communication device is a user communication device including one of a mobile communication device, a tablet computer, a smart phone, a laptop computer, a wearable device, or any other form of end-device used by a user. In some embodiments, the communication device is an intermediate Internet device including one of a router, a bridge, an edge router, a Gateway, a Hub, a Wi-Fi router, or any other form of a data transfer device in an Internet or an intranet or another communication network or network of communication networks. In some embodiments, the communication device is a server including one of a SIP proxy, a H.323 server, an Asterix server, a PBX device, a PSTN exchange server, or any other form of end-device that is used for responding to analog or data based calls via the Internet or an intranet or another communication network or network of communication networks. In some embodiments, the communication device hosts an application client, the processor interacts with the user of the device using the application client, the application client translates commands from the processor into user recognizable actions including one of a display on a user interface, a voice command, video data, or any other form of user-machine interaction format that is understandable by a user, and the application client translates user input into machine code and/or commands the processor of the device can understand and sends them to the processor.

Additional Embodiments for Session Persistence 2

In accordance with one aspect of the present invention, there is provided a method, referred to herein as active session transfer (AST), to be processed at an EMS and/or EDC, to change, add, or remove a user communication device or a client device, for example, a mobile cellular device, from a data communication session such that as the end devices are added or changed in the communication session individual devices do not have to re-negotiate an entire data session, including negotiating the settings of the session parameters, for example RTT, Time-to-live (TTL) for data packets, re-transmission timeouts, clear channel assessment (CCA) delay, re-transmission counts, jitter buffer length, and any other session state variable in a data communication session, and the EDC and/or the EMS maintains the authenticating status of the device including any login information of the user of the user communication device, any meta-data identifying the home location of the user communication device, user health information, and any other form of location information, such that as another user communication device, as indicated by the previous user communication device, is brought in communication with the EDC, a data communication session does need to be established, and the user communication device that is just added to the session is able to immediately transfer data packets to the EDC and/or EMS. Further, in such an embodiment, a user communication device may also request addition of user communication devices that have a different primary user than the user requesting emergency assistance and the EDC and/or the EMS either performs no or minimal authentication of the user communication device or allows the user communication device sending the request for emergency assistance to authenticate the additional user communication devices so that as the additional user communication device is brought in communication with the EDC and/or the EMS, a separate data communication session does need to be established, and the additional user communication device is able to immediately transfer and receive data packets to and from the EDC and/or EMS using the existing data communication session between the user communication device sending the request for emergency assistance and the EDC or/and the EMS. Further, in such an embodiment, the EDC and/or EMS maintains a signal distribution map by location (SDML) of the latest location of the user communication device wherein the SDML maintains a database of the signal quality, from a cellular base station or a Wi-Fi router, serving the area where the user communication device is currently located, this information derived by interaction with the cellular network providers and Wi-Fi routers in the same area, and the EDC and/or the EMS, shares this information with the user communication device, and uses this information to guide the user of the user communication device from where the request for emergency assistance was received to relocate in case the received signals from the user communication device are not of acceptable quality and there is indication that the user communication device is also unable to decode the received signals from the EDC and/or the EMS, the EDC and/or the EMS further updates this SDML as new updated location information is received from the user communication device. In some embodiments the user communication devices and/or the servers at the EDC and/or EMS host an application client and send and receive data packets via this application client, including a request for emergency assistance, request for addition of another user communication device to the communication session, request to transfer the communication session to another user communication device, or any other request regarding the emergency situation, to an EDC and/or an EMS, and the application client manages the connection between the user communication device and the EDC and/or EMS, including sending and receiving information from the SDML from the EDC and/or EMS to the user communication device. In some embodiments, the EDC and/or EMS authenticates additional user communication devices using the information received from the user communication device from which the request for emergency assistance is received, this information including identifying details about the additional user communication device that is being added to the communication session, so that the device can be pre-authenticated and pre-associated and the device is able to immediately communicate with the user communication device without having to set up a data communication session. In some embodiments, the EDC and/or the EMS shares with additional user communication devices values of session parameters, for example RTT, TTL for data packets, re-transmission timeouts, CCA delay, re-transmission counts, jitter buffer length, and any other session state variable in a data communication session, that the EDC and/or EMS used to have an effective session management with the user communication device from which the request for emergency assistance was received at the EDC and/or EMS, that allowed the data communication session to not disconnect with the device even over unacceptable channel quality levels and/or UCQLs time-intervals, and also shares the channel quality interval for the associated session parameter settings, so that the additional user communication devices can immediately set up the communication session for best communication quality over the communication session. In some embodiments, channel errors and channel congestion result in distorting the quality of a communication session by causing the session parameters to fall out of range, for example, by resulting in session Time-outs, ACK failures, retransmission Time-outs, out-of-sequence packets, excessive jitter between consecutive packet reception, CRC or checksum failures, frame errors, bit errors, SNR fluctuations, and other impacts on the data session that negatively affect the communication between the user communication device and the EDC, or EMS. In some embodiments, the EDC and/or EMS involved in the emergency assistance for the user communication device also shares various forms of user data, for example, multimedia data, including location data, videos, images, MMS, and even voice recordings and text-messages received from the user communication device in the communication session established for purpose of emergency response for the user of the user communication device with the additional user communication devices so that the devices are able to use this information and access it for the purpose of continued emergency response using the same data communication session. In some embodiments, the data channel between the user communication devices and the EDC, or EMS, is established and maintained using session initiation protocol (SIP) or using H.323 data channel management protocol.

Digital Processing Device

In some embodiments, the platforms, media, methods and applications described herein include a digital processing device, a processor, or use of the same. In further embodiments, the digital processing device includes one or more hardware central processing units (CPU) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In some embodiments, the non-volatile memory comprises magnetoresistive random-access memory (MRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a subject. In some embodiments, the display is a cathode ray tube (CRT). In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In some embodiments, the display is E-paper or E ink. In other embodiments, the display is a video projector. In still further embodiments, the display is a combination of devices such as those disclosed herein.

In some embodiments, the digital processing device includes an input device to receive information from a subject. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, media, methods and applications described herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, media, methods and applications described herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous Javascript and XML (AJAX), Flash® Actionscript, Javascript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft Silverlight®, Java™, and Unity®.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Android™ Market, BlackBerry® App World, App Store for Palm devices, App Catalog for webOS, Windows® Marketplace for Mobile, Ovi Store for Nokia® devices, Samsung® Apps, and Nintendo® DSi Shop.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, media, methods and applications described herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of barcode, route, parcel, subject, or network information. In various embodiments, suitable databases include, by way of non-limiting examples, relational databases, non-relational databases, object oriented databases, object databases, entity-relationship model databases, associative databases, and XML databases. In some embodiments, a database is internet-based. In further embodiments, a database is web-based. In still further embodiments, a database is cloud computing-based. In other embodiments, a database is based on one or more local computer storage devices.

Web Browser Plug-in

In some embodiments, the computer program includes a web browser plug-in. In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected digital processing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called mircrobrowsers, mini-browsers, and wireless browsers) are designed for use on mobile digital processing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony PSP™ browser.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

Example 1

Mr. James Bond is working in his office in downtown Manhattan late at night on a very important assignment. Because of the nature of the assignment he suspects suspicious activities from people who will like to jeopardize his assignment success. Therefore, Mr. Bond installs software on his smartphone device, which allows one to have Robust Communication with another end device, prior to initiating the work on the assignment that particular evening. The way the software allows for Robust Communication is by providing many Transport Layer Sessions to the application on the device providing the call and hence is able to use multiple options of receiving the packets at the EMS, or another receiving device with the same software.

While Mr. Bond is late at night working he detects some suspicious activities in the back part of the office where the fire exit is situated. Mr. Bond realizes that this is a burglary attempt to sabotage his assignment and quickly hides in one of the closets. While there he tries to initiate a call from his Smart Phone device to emergency services in order to get assistance to diffuse the situation. However since the closet is in the inner part of the office away from the Wi-Fi of the Office and not in current line-of-sight the cellular tower that Mr. Bond's Smart Phone device is connected to, the primary Transport Layer session that is formed to connect Mr. Bond's call to the EMS is not of high quality. However soon the software installed by Mr. Bond forms alternate secondary Transport Layer sessions with the EMS. This allows Mr. Bond to send his request for emergency assistance in terms of backup personnel to stop the burglars from sabotaging his important assignment.

As the call progresses on the primary Transport layer session from Mr. Bond's phone to the EMS, the software on Mr. Bond's phone detects that the end-to-end route quality of the primary route is less than acceptable, and quickly it detects a secondary Transport layer session, out of the ones that are setup, that is able to serve the application on Mr. Bond's phone for call for emergency assistance better. Since the session parameters such as window size, packet size, sequence number being served etc., are harmonized across the various Transport Layer sessions by the software, the sessions can continue from the point the primary Transport layer session was able to successfully serve the application.

During the course of the setup and use of the secondary Transport Layer sessions, as the software detects that the end-to-end routes used by one or more of the secondary Transport layer sessions are the same as the primary Transport layer session or other secondary Transport layer sessions, the software starts to discover alternate end-to-end routes and uses these end-to-end routes for the secondary Transport Layer sessions. The Smart device uses alternate cellular network towers, alternate routers, or even alternate servers at the EMS or different EMS to re-form these routes as well. This allows Mr. Bond to send his request for emergency assistance in terms of backup personnel to stop the burglars from sabotaging his important assignment.

Because of Mr. Bond's quick response and installing a Robust Communication software on the Smart Phone device he is able to seek assistance and stop the burglars from stealing his important work, and finish this assignment on time.

Example 2

Miss Jane Bond is driving on national highway 1 in California with her best friend Mrs. M. As they are driving on the highway Mrs. M. feels some discomfort in her chest and informs Miss Bond about this discomfort. Upon inquiry Miss Bond detects that Mrs. M. might be going through a heart condition, possible a cardiac arrest. Luckily for Mrs. M., Miss Bond has installed a software on her device that allows her to keep alive a Transport layer session with an EMS even when the session parameters, such as Session Timeout, Retransmission count, etc. have exceeded the maximum IETF standard defined limits. This software is also mirrored at the servers at the EMS.

As they drive on the highway due to mountains and other terrain, the signal strength on their cellular communication devices fluctuates from 'Good' quality to 'poor' at times. Miss Bond quickly retrieves her cellular device, stops the car at an emergency stopping, and calls for emergency assistance for Mrs. M. However because of the signal strength from the nearest cellular tower the Miss Bond's phone is associated to being poor, Miss Bond is not able to communicate with the emergency service provides. She decides to drive to another patch of the highway where the signal strength will be good. In the process of driving Miss Bond does not disconnect the communication session, however due to fluctuating signal strength the Transport layer session is not able to send and receive all standard protocol defined packets in time. Under normal operating conditions, the Transport layer session would have been disconnected. However, because Miss Jane Bond has installed this software, it allows both Miss Bond's phone and the EMS to continue the session even under adverse conditions, for example a certain packet is Timed out beyond the 240 second limit imposed by the standard, or a certain packet is retransmitted more than the maximum retries count. Therefore Miss Bond can communicate with the emergency service personnel without having to re-initiate the Transport layer session.

Soon Miss Bond reaches another patch of the highway where the signal strength from the nearest cellular tower is good and Miss Bond is able to connect to the cellular tower and continue the Transport layer session from where the last communication was completed, with the highest sequence number for which an ACK message was received. However, Miss Bond realizes that the Smart Phone device she is using does not have enough battery to complete the communication session without risk of the device turning OFF. Quickly she realizes that she can use Mrs. M's phone and because Mrs. M and Miss Bond have listed each other as an emergency contact, she can use Mrs. M's phone to continue the session. She informs the emergency response personnel about this and they call Mrs. M's phone. However since the User ID's being used with the two devices are connected, the EMS sends the session settings saved for the existing session with Miss Bond to Mrs. M's Smart Phone device. This way there is less chance that the communication session with Mrs. M's phone will get disconnected and that it will take less time to harmonize itself to the channel conditions over which the communication is taking place.

By this quick action and the software algorithm existing on the Smart Phone device of Mrs. M, Miss Bond and the EMS, Miss Bond is able to communicate with the emergency service personnel and complete the instructions given by them to her, and bring Mrs. M to safety by bringing her to the nearest hospital and giving her the appropriate medical assistance she needs. This way Miss Bond is able to save her best friend Mrs. M. from a cardiac condition and they continue their journey forward.

Example 3

It is peak business time in the middle of the afternoon in a factory at the outskirts of the city. Mr. James Bond is visiting the factory to check for quality of the electronic motherboard products that the factory is making and Mrs. Jane Bond is working on the factory floor. Both Mr. and Mrs. Bond have software installed on their Smart Phone device that allows them to communicate to the nearest emergency dispatch center about an emergency situation that is underway and associate a unique session identification number (USIN) with this particular Transport layer session serving the application layer communication session.

Unfortunately, because of a jam in the conveyor belt, there is a pile up of the motherboards at a certain location near to Mrs. Bond and the production is disrupted while the conveyor belt continues to function. This causes friction and hence a fire at the factory. There is panic, however Mrs. Bond is quick and takes her Smart Phone device and makes a call for emergency assistance to the factory security and the nearest emergency responders, and both the EMS and Mrs. Bond's device assign a USIN to the Transport layer communication sessions. Because she has the RapidSOS application on her device, she is able to take pictures of the fire and the pileup from here location and send them to the emergency responders. The local EMS that Mrs. Bond's Smart Phone device is connected to, enters the session settings into the USIN database and save this session as an active session.

From the viewpoint of Mrs. Bond, the pictures do not capture the fall of a metal piece into the conveyor belt rotation mechanism that is causing the jam on the other side to the silicon wafer manufacturing. However. Mr. Bond is in the office upstairs and is able to see from his glass windows the metal piece being the problem and cause of the jam. Mr. Bond also initiates a request for emergency assistance simultaneously to the emergency responders. Because the geographic location of the Smart Phone device that Mr. Bond is using to call for emergency assistance is in the vicinity of Mrs. Bond, the EMS verifies with the Smart Phone device of Mr. Bond if this call is for the same emergency situation that Mrs. Bond is calling about currently, and the device shows an alert to Mr. Bond. When Mr. Bond confirms this, the EMS sends the USIN for Mrs. Bond's communication sessions and also the saved session settings to Mr. Bond's device. This allows Mr. Bond's smart phone device to quickly establish a session with the appropriate session parameter settings, and save time in communicating actual information to the EMS.

Further, Mr. Bond sends pictures and other meta-data information to the EMS and the EMS associates this information to the information send by Mrs. Bond. By combining this information the emergency service personnel are able to get a more complete picture of the situation and help the factory workers in dousing out the fire and remove the metal piece that is causing the pile up.

By quick reaction by Mr. and Mrs. Bond and by having a system that saves session states using a USIN and identifies emergency sessions using USIN in order to harmonize session settings and associates meta-data from different sessions about the same emergency situation, the emergency response personnel are able to prevent a calamity and save lives and resources and the world and the universe.

What is claimed is:

1. An emergency management system (EMS) comprising at least one processor, a memory, a network element, and a computer program including instructions executable by the at least one processor to create a server software application for managing emergency communication sessions comprising:

a) a communication module managing an emergency communication session at an application layer with a communication device, the communication session comprising a plurality of communication channels comprising a voice channel between the communication device and an emergency dispatch center (EDC), at least one data channel between the EMS and the communication device, and at least one data channel between the EMS and the EDC, wherein the EMS provides data transfer between the communication device and the EDC during the emergency communication session;

b) a flow evaluation module evaluating data flow transmitted over the plurality of communication channels during the emergency communication session against one or more performance benchmarks;

c) a flow transfer module dynamically transferring data from a communication channel failing the one or more performance benchmarks to a different communication channel without terminating or suspending the emergency communication session; and d) a session-stay-alive (SSA) module maintaining the emergency communication session with at least one of the communication device and the EDC when data flow is degraded sufficiently to result in disconnection of at least one of the plurality of communication channels, wherein the maintaining comprises using the data channels to provide user data from the communication device to the EDC when the voice channel is disconnected or degraded in order to facilitate an emergency response without requiring voice communications, wherein the user data comprises at least one of location information, emergency indication, and user health information.

2. The system of claim 1, wherein maintaining the communication session comprises modifying one or more session parameters for one or more of the plurality of communication channels to maintain connection with the communication device when data flow is degraded sufficiently to result in disconnection under one or more performance benchmarks.

3. The system of claim 1, wherein the plurality of communication channels comprises a primary communication channel and one or more secondary communication channels.

4. The system of claim 3, wherein the flow transfer module directs data flow through the primary communication channel and the one or more secondary communication channels simultaneously to provide data redundancy.

5. The system of claim 4, wherein the flow transfer module provides data redundancy when the primary communication channel is losing data packets beyond a defined threshold.

6. The system of claim 1, wherein the communication module assigns a unique session identification number (USIN) to the emergency communication session, wherein a new communication device obtains authentication to join the emergency communication session by providing the USIN.

7. The system of claim 1, further comprising a session management module saving a session state of the emergency communication session and transmitting the saved session state to the new communication device to enable the emergency communication session to continue with the new communication device using the saved session state.

8. A method for managing emergency communications comprising:

a) managing, by an emergency management system (EMS), an emergency communication session at an application layer with a communication device, the emergency communication session comprising a plurality of communication channels comprising a voice channel between the communication device and an emergency dispatch center (EDC), at least one data channel between the EMS and the communication device, and at least one data channel between the EMS and the EDC, wherein the EMS provides data transfer between the communication device and the EDC during the emergency communication session;

b) evaluating, by the EMS, data flow transmitted over the plurality of communication channels during the emergency communication session against one or more performance benchmarks;

c) dynamically transferring, by the EMS, data from a communication channel failing the one or more performance benchmarks to a different communication channel without terminating or suspending the emergency communication session; and d) maintaining, by the EMS, the emergency communication session with at least one of the communication device and the EDC when data flow is degraded sufficiently to result in disconnection of at least one of the plurality of communication channels, wherein the maintaining comprises using the data channels to provide user data from the communication device to the EDC when the voice channel is disconnected or degraded in order to facilitate an emergency response without requiring voice communications, wherein the user data comprises at least one of location information, emergency indication, and user health information.

9. The method of claim 8, further comprising modifying, by the EMS, one or more session parameters for one or more of the plurality of communication channels to maintain connection with the communication device when data flow is degraded sufficiently to result in disconnection under one or more performance benchmarks.

10. The method of claim 8, wherein the plurality of communication channels comprises a primary communication channel and one or more secondary communication channels.

11. The method of claim 10, further comprising directing, by the EMS, data through the primary communication channel and the one or more secondary communication channels simultaneously to provide data redundancy.

12. The method of claim 11, wherein data redundancy is provided when the primary communication channel is losing data packets beyond a defined threshold.

13. The method of claim 8, further comprising assigning, by the EMS, a unique session identification number (USIN) to the emergency communication session, wherein a new communication device obtains authentication to join the emergency communication session by providing the USIN.

14. The method of claim 8, wherein maintaining the emergency communication session comprises saving a session state of the emergency communication session and transmitting the saved session state to the new communication device to enable the emergency communication session to continue with the new communication device using the saved session state.

15. A communication device comprising at least one processor, a memory, a network element, and a computer program including instructions executable by the at least one processor to create a software application for managing emergency communications comprising:

a) a communication module managing an emergency communication session comprising a plurality of communication channels comprising a voice channel between the communication device and an emergency dispatch center (EDC), at least one data channel between the communication device and an emergency management system (EMS), and at least one data channel between the EMS and the EDC, wherein the EMS provides data transfer between the communication device and the EDC during the emergency communication session;

b) a flow evaluation module evaluating data flow transmitted over the plurality of communication channels during the emergency communication session against one or more performance benchmarks;

c) a flow transfer module dynamically transferring data from a communication channel failing the one or more performance benchmarks to a different communication channel without terminating or suspending the emergency communication session; and d) a session-stay-alive (SSA) module maintaining the emergency communication session with at least one of the EMS and the EDC when data flow is degraded sufficiently to result in disconnection of at least one of the plurality of communication channels, wherein the maintaining comprises using the data channels to provide user data from the communication device to the EMS when the voice channel is disconnected or degraded in order to facilitate an emergency response without requiring voice communications, wherein the user data comprises at least one of location information, emergency indication, and user health information.

16. The device of claim 15, wherein the plurality of communication channels comprises a primary communication channel and one or more secondary communication channels.

17. The device of claim 16, wherein the flow transfer module directs data flow through the primary communication channel and the one or more secondary communication channels simultaneously to provide data redundancy.

18. The device of claim 17, wherein the flow transfer module provides data redundancy when the primary communication channel is losing data packets beyond a defined threshold.

19. The device of claim 17, wherein the communication module harmonizes data received over the primary communication channel and the one or more secondary communication channels.

20. The device of claim 15, wherein the plurality of communication channels comprises a plurality of TCP data sessions, wherein each of the plurality of TCP data sessions uses a different routing path from the communication device and the EMS or EDC.

21. The device of claim 15, wherein the emergency communication session is assigned a unique session identification number (USIN) by the emergency management system or emergency dispatch center.

22. The device of claim 21, wherein the emergency communication session is transferred to a new emergency management system or a new emergency dispatch center, wherein the communication device obtains authentication to join the emergency communication session from the new emergency management system or new emergency dispatch center by providing the USIN assigned to the emergency communication session.

23. A method for managing emergency communications comprising:
   a) managing, by a communication device, an emergency communication session comprising a plurality of communication channels comprising a voice channel between the communication device and an emergency dispatch center (EDC), at least one data channel between the communication device and an emergency management system (EMS), and at least one data channel between the EMS and the EDC, wherein the EMS provides data transfer between the communication device and the EDC during the emergency communication session;
   b) evaluating, by the communication device, data flow transmitted over the plurality of communication channels during the emergency communication session against one or more performance benchmarks;
   c) dynamically transferring, by the communication device, data from a communication channel failing the one or more performance benchmarks to a different communication channel without terminating or suspending the emergency communication session; and
   d) maintaining, by the communication device, the emergency communication session with at least one of the EMS and the EDC when data flow is degraded sufficiently to result in disconnection of at least one of the plurality of communication channels, wherein the maintaining comprises using the data channels to provide user data from the communication device to the EMS when the voice channel is disconnected or degraded in order to facilitate an emergency response without requiring voice communications, wherein the user data comprises at least one of location information, emergency indication, and user health information.

24. The method of claim 23, wherein the plurality of communication channels comprises a primary communication channel and one or more secondary communication channels.

25. The method of claim 24, further comprising directing, by the communication device, data through the primary communication channel and the one or more secondary communication channels simultaneously to provide data redundancy.

26. The method of claim 25, wherein data redundancy is provided when the primary communication channel is losing data packets beyond a defined threshold.

27. The method of claim 25, further comprising harmonizing, by the communication device, data received over the primary communication channel and the one or more secondary communication channels.

28. The method of claim 23, wherein the plurality of communication channels comprises a plurality of TCP data sessions, wherein each of the plurality of TCP data sessions uses a different routing path from the communication device and the EMS or EDC.

29. The method of claim 23, wherein the emergency communication session is assigned a unique session identification number (USIN) by the emergency management system or emergency dispatch center.

30. The method of claim 29, further comprising transferring, by the communication device, to a new emergency management system or new emergency dispatch center, wherein the transferring comprises obtaining authentication to join the emergency communication session from the new emergency management system or new emergency dispatch center by providing the USIN assigned to the emergency communication session.

* * * * *